United States Patent
Nagaya

(10) Patent No.: US 7,306,065 B2
(45) Date of Patent: Dec. 11, 2007

(54) FIXING METHOD OF IN-WHEEL MOTOR AND IN-WHEEL MOTOR SYSTEM

(75) Inventor: Go Nagaya, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 57 days.

(21) Appl. No.: 10/470,307

(22) PCT Filed: Apr. 15, 2002

(86) PCT No.: PCT/JP02/03730

§ 371 (c)(1),
(2), (4) Date: Jul. 29, 2003

(87) PCT Pub. No.: WO02/083446

PCT Pub. Date: Oct. 24, 2002

(65) Prior Publication Data

US 2004/0099455 A1 May 27, 2004

(30) Foreign Application Priority Data

| Apr. 16, 2001 | (JP) | ............................ 2001-117110 |
| Apr. 27, 2001 | (JP) | ............................ 2001-132342 |
| May 29, 2001 | (JP) | ............................ 2001-160686 |
| Oct. 11, 2001 | (JP) | ............................ 2001-314514 |
| Oct. 11, 2001 | (JP) | ............................ 2001-314518 |
| Oct. 11, 2001 | (JP) | ............................ 2001-314522 |

(51) Int. Cl.
*B60K 1/00* (2006.01)

(52) U.S. Cl. .............................. 180/65.5; 280/124.157; 280/124.177; 301/6.91

(58) Field of Classification Search ............... 180/65.5; 280/124.157, 124.177; 105/182.1, 167; 301/6.91, 301/6.1, 6.15
See application file for complete search history.

(56) References Cited

U.S. PATENT DOCUMENTS 2,581,551 A * 1/1952 Myrmirides ............... 310/67 R
2,746,768 A   5/1956 Bowser (Continued)

FOREIGN PATENT DOCUMENTS

DE    41 15 932 A    12/1992

(Continued)

OTHER PUBLICATIONS

Machine-Assisted Translation of Laid-open Kokai Patent (A) JP2000-309269-A, published Nov. 7, 2000; translation dated Aug. 9, 2005, The Thomson Corporation at www.thomsonderwent.com.*

(Continued)

*Primary Examiner*—Christopher Bottorff
*Assistant Examiner*—John D Walters
(74) *Attorney, Agent, or Firm*—Sughrue Mion, PLLC

(57) ABSTRACT

A non-rotary case to which the motor stator of an inwheel motor is fixed is connected to a knuckle which is a part around the wheel of a vehicle by a first elastic member, a rotary case to which the rotor of the motor is fixed and rotatably connected to the non-rotary case through a bearing is connected to the wheel by a second elastic member so as to float-mount the inwheel motor to parts around the wheel.

14 Claims, 65 Drawing Sheets

U.S. PATENT DOCUMENTS

| | | | |
|---|---|---|---|
| 3,566,165 A * | 2/1971 | Lohr | 310/67 R |
| 4,384,859 A | 5/1983 | Teramachi | |
| 4,991,698 A | 2/1991 | Hanson | |
| 5,180,336 A | 1/1993 | Guttinger | |
| 5,327,034 A * | 7/1994 | Couture et al. | 310/67 R |
| 5,438,228 A * | 8/1995 | Couture et al. | 310/67 R |
| 5,509,492 A * | 4/1996 | Pfannschmidt | 180/65.5 |
| 5,848,663 A | 12/1998 | Kuriki | |
| 6,170,838 B1 | 1/2001 | Laurent et al. | |

FOREIGN PATENT DOCUMENTS

| | | |
|---|---|---|
| DE | 42 35 697 A1 | 3/1994 |
| DE | 196 02 119 C | 5/1997 |
| DE | 198 58 395 A | 6/2000 |
| EP | 2 266 114 A | 10/1990 |
| EP | 0 178 139 A | 6/1996 |
| EP | 0 903 835 A1 | 3/1999 |
| EP | 1 065 123 A | 1/2001 |
| GB | 920 586 A | 3/1963 |
| JP | 63 41243 A | 2/1988 |
| JP | 3 31029 A | 2/1991 |
| JP | 7 81430 A | 3/1995 |
| JP | 2000-309269 A | 11/2000 |

OTHER PUBLICATIONS

European Office Action, Dec. 6, 2004.

* cited by examiner

FIG. 11(a)    FIG. 11(b)
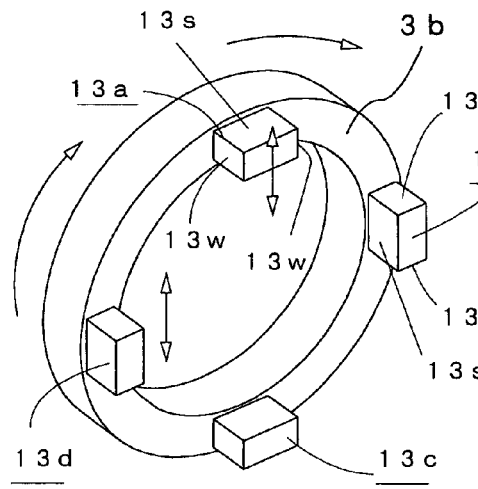 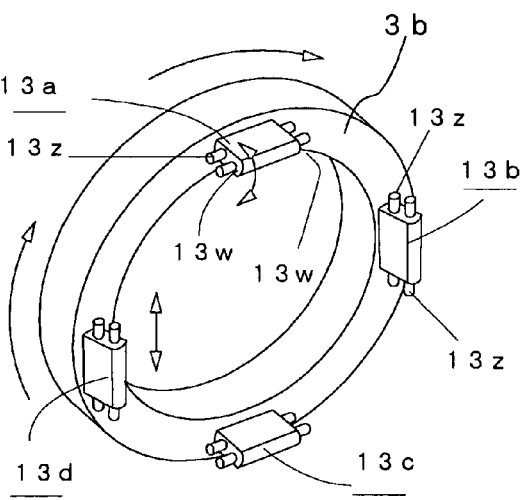
FIG. 12
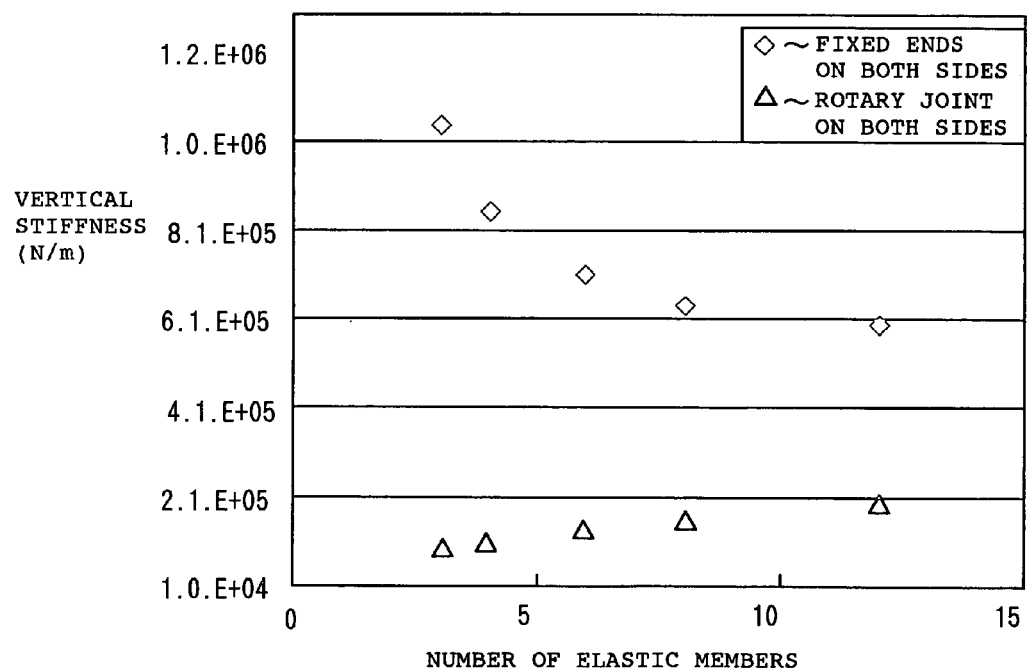

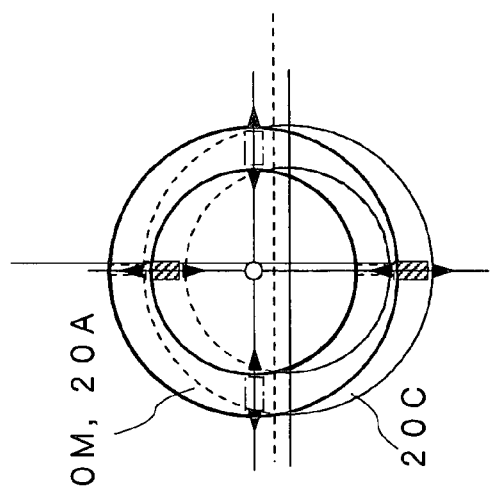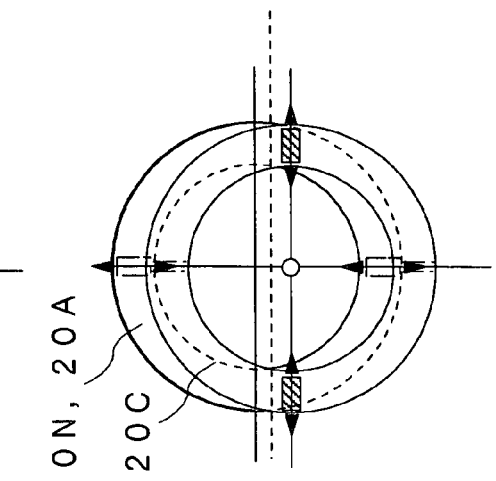
FIG. 28 (c)
(c) 90° WHEEL ROTATION
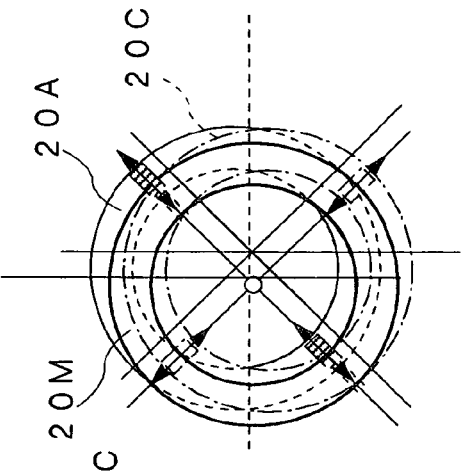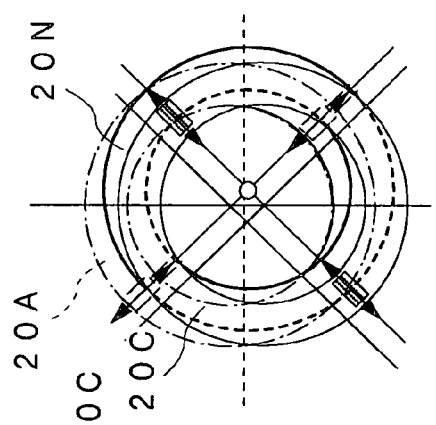
FIG. 28 (b)
(b) 45° WHEEL ROTATION
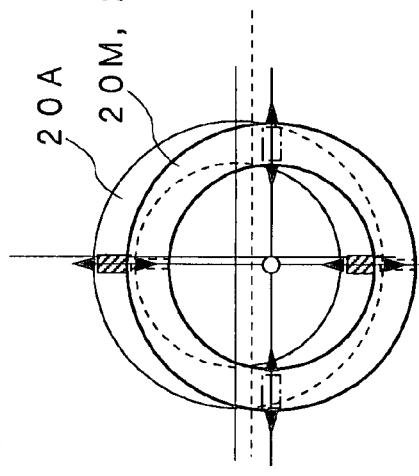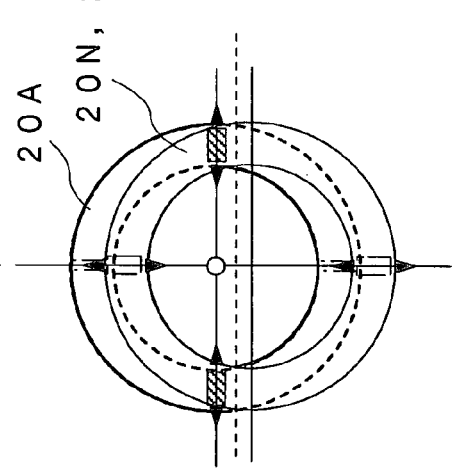
FIG. 28 (a)
(a) 0° WHEEL ROTATION

FIG. 44

| MOTOR MOUNTING PORTION | COMPARATIVE EXAMPLE 1-1 | COMPARATIVE EXAMPLE 1-2 | COMPARATIVE EXAMPLE 1-3 | EXAMPLE 1-1 | EXAMPLE 1-2 | EXAMPLE 1-3 | EXAMPLE 1-4 |
|---|---|---|---|---|---|---|---|
| | | $m_2$ | $m_2$ | $m_3$ | $m_3$ | $m_3$ | $m_3$ |
| WEIGHT OF MOTOR | HEAVY | HEAVY | HEAVY | HEAVY | LIGHT | HEAVY | HEAVY |
| WEIGHT OF PART AROUND WHEEL | HEAVY | HEAVY | HEAVY | HEAVY | LIGHT | HEAVY | LIGHT |
| TYPE OF DYNAMIC DAMPER WEIGHT | — | — | NORMAL WEIGHT | MOTOR | MOTOR | MOTOR | MOTOR |
| WEIGHT OF MOTOR(kg) TO ONE WHEEL | 0 | 25 | 25 | 25 | 15 | 25 | 25 |
| WEIGHT OF PART AROUND WHEEL (kg) TO ONE WHEEL | 40 | 40 | 40 | 40 | 24 | 40 | 24 |
| WEIGHT OF DYNAMIC DAMPER (kg) TO ONE WHEEL | 0 | 0 | 25 | 25 | 15 | 25 | 25 |
| $m_1$(kg) TO TWO WHEELS | 80 | 130 | 80 | 80 | 48 | 80 | 48 |
| $m_2$(kg) TO TWO WHEELS | 470 | 420 | 420 | 420 | 420 | 420 | 420 |
| $m_3$(kg) TO TWO WHEELS | — | — | 50 | 50 | 30 | 50 | 50 |
| $k_1$(N/m) TO TWO WHEELS | 400000 | 400000 | 400000 | 400000 | 400000 | 400000 | 400000 |
| $k_2$(N/m) TO TWO WHEELS | 80000 | 80000 | 80000 | 80000 | 80000 | 80000 | 80000 |
| $k_3$(N/m) TO TWO WHEELS | — | — | 80000 | 80000 | 80000 | 60000 | 60000 |
| $c_1$(N·s/m) TO TWO WHEELS | 100 | 100 | 100 | 100 | 100 | 100 | 100 |
| $c_2$(N·s/m) TO TWO WHEELS | 5000 | 5000 | 5000 | 5000 | 5000 | 5000 | 5000 |
| $c_3$(N·s/m) TO TWO WHEELS | — | — | 1000 | 1000 | 1000 | 1000 | 1000 |

FIG. 55

| | COMPARATIVE EXAMPLE 2-1 | COMPARATIVE EXAMPLE 2-2 | COMPARATIVE EXAMPLE 2-3 | EXAMPLE 2-1 | EXAMPLE 2-2 | EXAMPLE 2-3 |
|---|---|---|---|---|---|---|
| WEIGHT OF MOTOR | HEAVY | HEAVY | LIGHT | HEAVY | HEAVY | HEAVY |
| WEIGHT OF PART AROUND WHEEL | HEAVY | HEAVY | LIGHT | HEAVY | HEAVY | HEAVY |
| $m_1$(kg) | 25 | 25 | 15 | 25 | 25 | 25 |
| PART AROUND WHEEL(kg) | | | | | | |
| $m_2$(kg) | 40 | 40 | 25 | 40 | 40 | 40 |
| | 40 | 65 | 40 | 40 | 40 | 40 |
| $m_3$(kg) | 250 | 225 | 225 | 225 | 225 | 225 |
| | 0 | 0 | 0 | 25 | 25 | 25 |
| $k_1$(N/m) | 220000 | 220000 | 220000 | 220000 | 220000 | 220000 |
| $k_2$(N/m) | 60000 | 60000 | 60000 | 60000 | 60000 | 60000 |
| $k_3$(N/m) | — | — | — | 30000 | 30000 | 10000 |
| $k_4$(N/m) | — | — | — | — | 10000 | 30000 |
| $c_1$(N·s/m) | 50 | 50 | 50 | 50 | 50 | 50 |
| $c_2$(N·s/m) | 3000 | 3000 | 3000 | 3000 | 3000 | 3000 |
| $c_3$(N·s/m) | — | — | — | 1000 | 1000 | 500 |
| $c_4$(N·s/m) | — | — | — | — | 500 | 1000 |

FIG. 63

| | COMPARATIVE EXAMPLE 3-1 | COMPARATIVE EXAMPLE 3-2 | COMPARATIVE EXAMPLE 3-3 | EXAMPLE 3-1 | EXAMPLE 3-2 | EXAMPLE 3-3 | EXAMPLE 3-4 |
|---|---|---|---|---|---|---|---|
| MOTOR MOUNTING PORTION | — | $m_1$ | $m_1$ | $m_3$ | $m_3$ | $m_3$ | $m_3$ |
| WEIGHT OF MOTOR | HEAVY | HEAVY | HEAVY | HEAVY | LIGHT | HEAVY | HEAVY |
| WEIGHT OF PART AROUND WHEEL | — | HEAVY | HEAVY | HEAVY | LIGHT | HEAVY | LIGHT |
| DYNAMIC DAMPER | — | — | NORMAL WEIGHT | MOTOR | MOTOR | MOTOR | MOTOR |
| MOTOR (kg) | 40 | 25 | 25 | 25 | 15 | 25 | 25 |
| PART AROUND WHEEL (kg) | 0 | 40 | 40 | 40 | 24 | 40 | 24 |
| DAMPER WEIGHT (kg) | — | 0 | 25 | 25 | 15 | 25 | 25 |
| $m_1$ (kg) | 80 | 130 | 80 | 80 | 48 | 80 | 48 |
| $m_2$ (kg) | 470 | 420 | 420 | 420 | 420 | 420 | 420 |
| $m_3$ (kg) | — | — | 50 | 50 | 30 | 50 | 50 |
| $k_1$ (N/m) | 400000 | 400000 | 400000 | 400000 | 400000 | 400000 | 400000 |
| $k_2$ (N/m) | 80000 | 80000 | 80000 | 80000 | 80000 | 80000 | 80000 |
| $k_3$ (N/m) | — | — | 80000 | 80000 | 80000 | 60000 | 60000 |
| $c_1$ (N·s/m) | 100 | 100 | 100 | 100 | 100 | 100 | 100 |
| $c_2$ (N·s/m) | 5000 | 5000 | 5000 | 5000 | 5000 | 5000 | 5000 |
| $c_3$ (N·s/m) | — | — | 1000 | 1000 | 1000 | 1000 | 1000 |

SPRUNG MASS (CAR BODY)

UNSPRUNG MASS (WHEEL, MOTOR)

INPUT OF ROAD SURFACE (TIRE CONTACT FACE)

SPRUNG MASS (CAR BODY)

UNSPRUNG MASS (WHEEL, MOTOR)

INPUT OF ROAD SURFACE (TIRE CONTACT FACE)

FIG. 75

| | COMPARATIVE EXAMPLE 4-1 | COMPARATIVE EXAMPLE 4-2 | COMPARATIVE EXAMPLE 4-3 | COMPARATIVE EXAMPLE 4-4 | COMPARATIVE EXAMPLE 4-5 | EXAMPLE 4-1 | EXAMPLE 4-2 | EXAMPLE 4-3 |
|---|---|---|---|---|---|---|---|---|
| | ORDINARY EV1 | ORDINARY EV1 | ORDINARY EV1 | CONVENTIONAL IWM | DYNAMIC DAMPER | INVENTED IWM1 | INVENTED IWM2 | INVENTED IWM3 |
| UNSPRUNG MASS $m_1$ (kg) | 45 | 30 | 45 | 70 | 70 | 45 | 45 | 45 |
| SPRUNG MASS $m_2$ (kg) | 300 | 300 | 300 | 230 | 230 | 230 | 220 | 230 |
| DYNAMIC DAMPER $m_3$ (kg) | — | — | — | — | 50 | 25 | 35 | 25 |
| LONGITUDINAL SPRING OF TIRE $k_1$ (N/m) | 190000 | 190000 | 190000 | 190000 | 190000 | 190000 | 190000 | 190000 |
| VERTICAL STIFFNESS OF SUSPENSION $k_2$ (N/m) | 27000 | 27000 | 27000 | 27000 | 27000 | 27000 | 27000 | 27000 |
| STIFFNESS OF MOTOR VERTICAL SUPPORT SPRING $k_3$ (N/m) | — | — | — | — | 40000 | 40000 | 40000 | 60000 |
| VERTICAL ATTENUATION OF TIRE $c_1$ (N·s/m) | 50 | 50 | 50 | 50 | 50 | 50 | 50 | 50 |
| VERTICAL ATTENUATION OF SUSPENSION $c_2$ (N·s/m) | 1000 | 1000 | 1000 | 1000 | 1000 | 1000 | 1000 | 1000 |
| MOTOR VERTICAL SUPPORT ATTENUATION $c_3$ (N·s/m) | — | — | — | — | 1000 | 1000 | 1000 | 1000 |
| HOLIZONTAL SPRING OF TIRE $k_1'$ (N/m) | 1900000 | 1900000 | 1900000 | 1900000 | 1900000 | 1900000 | 1900000 | 1900000 |
| LONGITUDINAL STIFFNESS OF SUSPENSION $k_2'$ (N/m) | 200000 | 200000 | 300000 | 200000 | 200000 | 200000 | 200000 | 200000 |
| STIFFNESS OF MOTOR HORIZONTAL SUPPORT SPRING $k_3'$ (N/m) | — | — | — | — | 400000 | 400000 | 400000 | 500000 |
| HORIZONTAL ATTENUATION OF TIRE $c_1'$ (N·s/m) | 50 | 50 | 50 | 50 | 50 | 50 | 50 | 50 |
| HORIZONTAL ATTENUATION OF SUSPENSION $c_2'$ (N·s/m) | 2400 | 2400 | 2400 | 2400 | 2400 | 2400 | 2400 | 2400 |
| HORIZONTAL SUPPORT ATTENUATION $c_3'$ (N·s/m) | — | — | — | 1000 | 1000 | 1000 | 1000 | 1000 |

FIXING METHOD OF IN-WHEEL MOTOR AND IN-WHEEL MOTOR SYSTEM

BACKGROUND OF THE INVENTION

1. Field of the Invention

The present invention relates to an inwheel motor system for use in a vehicle having direct drive wheels as drive wheels and to an inwheel motor mounting method.

2. Description of the Prior Art

Nowadays, an inwheel motor system that a motor is incorporated in each wheel is been adopted in vehicles which are driven by a motor, such as electric cars, to achieve a high space efficiency and high transmission efficiency of driving force.

FIG. 78 shows that a direct drive motor of a hollow outer rotor type (inwheel motor) 70 disclosed by JP 2676025 is mounted. In this inwheel motor 70, a stator 70S is connected to and supported by an upright 71 which is a fixed portion, located on the inner side of the wheel disk 73 of a direct drive wheel 72, and also connected to a rotary shaft 74 coupled to the above wheel disk 73 through a bearing 74J. A rotor 70R around the above stator 70S is supported by a first bracket 75a connected to the above rotary shaft 74 and a second bracket 75b which is rotatably fixed to the upright 71 through a bearing 71J. Since the rotor 70R is thereby rotatably connected to the stator 70S, torque can be transmitted to the wheel 72 by driving the inwheel motor 70 so that the wheel 72 can be directly driven.

There are proposed some methods of mounting an inwheel motor: one shown in FIG. 79 in which a rotor 80R having magnetic means (permanent magnet) 80M is installed in a housing 82 fixed to a wheel 81, a stator 80S having a coil 80C is placed on the inner side of the above magnetic means 80M and fixed to a hollow shaft 84 connected to a knuckle 83, and the inner and outer side walls 82a and 82b of the above housing 82 are connected to the above stator 80S through bearings 84a and 84b to rotatably link the rotor 80R of an inwheel motor 80 to the stator 80S (for example, Japanese Patent Publication No. 9-506236), and one shown in FIG. 80 in which the stator 90S of an inwheel motor 90 is fixed to a steering knuckle 93 connected to a hub portion 92 through a bearing 91 and in which the rim portion 94a of a wheel 94 is used as the rotor of the motor to be rotatably linked to the stator 90S (for example, Japanese Laid-open Patent Application No. 10-305735).

In a vehicle having a suspension unit such as a spring around each wheel, as the mass of an unsprung part such as a wheel, knuckle or suspension arm, so-called "unsprung mass" increases, the contact force of a tire fluctuates when the vehicle runs over a uneven road, resulting in deteriorated road holding properties.

Even when the mass of the body of a vehicle, so-called "sprung mass" is small, the road holding properties also deteriorate. Therefore, to improve the road holding properties, the unsprung mass must be made much smaller than the sprung mass.

However, since the motor stator of the inwheel motor is rotatably fixed to a spindle shaft connected to a part called "upright" or "knuckle" which is one of parts around the wheels of the vehicle, the unsprung mass increases when the above inwheel motor is mounted, thereby deteriorating the road holding properties.

Therefore, the inwheel motor vehicle is rarely used although it is a very attractive electric car having excellent space efficiency and transmission efficiency of driving force.

SUMMARY OF THE INVENTION

It is an object of the present invention which has been made in view of the problems of the prior art to provide a method of mounting an inwheel motor and an inwheel motor system both of which are capable of reducing the tire contact force fluctuation of a vehicle to improve the road holding properties of the vehicle.

According to a first aspect of the present invention, there is provided a method of mounting an inwheel motor to a direct drive wheel, comprising mounting the motor to an unsprung mass corresponding portion of a vehicle by a buffer member or a buffer unit.

The "unsprung mass corresponding portion" as used herein denotes a wheel or a part around the wheel such as a knuckle or suspension arm.

According to a second aspect of the present invention, there is provided a method of mounting an inwheel motor, wherein the non-rotary case of the motor and a knuckle are interconnected by a first elastic member, and the rotary case of the motor and the wheel are interconnected by a second elastic member.

According to a third aspect of the present invention, there is provided a method of mounting an inwheel motor, wherein the non-rotary case of the motor for supporting the stator of the motor and a knuckle which is a part around the wheel of the vehicle are interconnected by a direct-acting guide unit, and the rotary case of the motor for supporting the rotor of the motor and the wheel are interconnected by a driving force transmission unit which can be eccentric from the wheel in the radial direction.

According to a fourth aspect of the present invention, there is provided a method of mounting an inwheel motor, wherein the non-rotary case of the motor and a knuckle are interconnected by a direct-acting guide unit including a damper, and the rotary case of the motor and the wheel are interconnected by a second elastic member.

According to a fifth aspect of the present invention, there is provided a method of mounting an inwheel motor to a direct drive wheel, comprising mounting the non-rotary case of the motor on a car body side by a buffer unit.

According to a sixth aspect of the present invention, there is provided a method of mounting an inwheel motor, wherein the motor is mounted to ensure that the resonance frequency of the mounted motor should become higher than the resonance frequency of sprung mass and lower than the resonance frequency of unsprung mass.

According to a seventh aspect of the present invention, there is provided an inwheel motor system comprising a hollow electric motor in a wheel portion to drive the wheel, wherein the motor is mounted to an unsprung mass corresponding portion of a wheel, a car body side, or both of them, by a buffer member or a buffer unit.

According to an eighth aspect of the present invention, there is provided an inwheel motor system, wherein the motor and the wheel are interconnected by a constant-velocity universal joint or by a driving force transmission unit which can be eccentric from the wheel in the radial direction.

According to a ninth aspect of the present invention, there is provided an inwheel motor system, wherein the driving force transmission unit is a coupling unit which comprises a plurality of hollow disk-like plates and direct-acting guides for interconnecting adjacent plates and for guiding the adjacent plates in the radial direction of the disk.

According to a tenth aspect of the present invention, there is provided an inwheel motor system, wherein the non-rotary case of the motor for supporting the stator of the motor and a knuckle which is a part around the wheel of a vehicle are interconnected by a direct-acting guide unit.

According to an eleventh aspect of the present invention, there is provided an inwheel motor system, wherein a buffer member or a buffer unit is provided between the non-rotary case of the motor and the knuckle or/and between the rotary case and the wheel.

According to a twelfth aspect of the present invention, there is provided an inwheel motor system, wherein the non-rotary case of the motor for supporting the stator of the motor and a knuckle which is a part around the wheel of the vehicle are interconnected by a first elastic member, and the rotary case of the motor for supporting a rotor and the wheel are interconnected by a second elastic member.

According to a thirteenth aspect of the present invention, there is provided an inwheel motor system, wherein at least one or both of the first and second elastic members are an air spring. According to a fourteenth aspect of the present invention, there is provided an inwheel motor system, wherein the second elastic member is cylindrical, one end of this cylinder is connected to the wheel, and the other end is connected to the rotary case.

According to a fifteenth aspect of the present invention, there is provided an inwheel motor system, wherein the wheel and the rotary case are interconnected by 16 or less board-like elastic members disposed at equal intervals in parallel to the tangent direction of the wheel.

According to a sixteenth aspect of the present invention, there is provided an inwheel motor system, wherein rotary joint units whose axes are in the tangent direction of the motor are provided on both end faces in the width direction of the plate-like elastic members.

According to a seventeenth aspect of the present invention, there is provided an inwheel motor system, wherein ribs extending from the rotary case toward the wheel and ribs extending from the wheel toward the rotary case are interconnected by an elastic member at a plurality of sites.

According to an eighteenth aspect of the present invention, there is provided an inwheel motor system, wherein the vertical elastic coefficient of a material constituting the first and second elastic members is 1 to 120 MPa.

According to a nineteenth aspect of the present invention, there is provided an inwheel motor system, wherein the vertical elastic coefficient of a material constituting the first and second elastic members is 10 to 300 GPa.

According to a twentieth aspect of the present invention, there is provided an inwheel motor system, wherein the first elastic member has a lower elastic modulus in the vertical direction of the vehicle than an elastic modulus in the longitudinal direction.

According to a twenty-first aspect of the present invention, there is provided an inwheel motor system, wherein the non-rotary case is connected to the knuckle by a direct-acting guide unit having a spring and a damper in place of the first elastic member.

According to a twenty-second aspect of the present invention, there is provided an inwheel motor system, wherein the rotary case is connected to the wheel by a constant-velocity universal joint.

According to a twenty-third aspect of the present invention, there is provided an inwheel motor system, wherein the second elastic member is mounted at the center position of the mass of the motor in the width direction of the motor.

According to a twenty-fourth aspect of the present invention, there is provided an inwheel motor system, wherein the rotary case is connected to the wheel by a coupling unit comprising a plurality of hollow disk-like plates and direct-acting guides for interconnecting adjacent plates and for guiding the adjacent plates in the radial direction of the disk.

According to a twenty-fifth aspect of the present invention, there is provided an inwheel motor system, wherein the non-rotary case of the motor for supporting the stator of the motor is connected to the knuckle which is a part around the wheel of the vehicle by a buffer member or buffer unit, and the rotary case of the motor is connected to the wheel by a coupling unit comprising a plurality of hollow disk-like plates and direct-acting guides for interconnecting adjacent plates and for guiding the adjacent plates in the radial direction of the disk.

According to a twenty-sixth aspect of the present invention, there is provided an inwheel motor system, wherein the non-rotary case of the motor for supporting the stator of the motor is connected to the knuckle which is a part around the wheel of the vehicle by a buffer member or buffer unit, and the rotary case of the motor is connected to the wheel by a hollow disk-like plate having a plurality of direct-acting guides on the motor side and the wheel side.

According to a twenty-seventh aspect of the present invention, there is provided an inwheel motor system, wherein the direct-acting guides are disposed at the same positions on the front and back sides of the hollow disk-like plate at an interval of 90° or 180° in the circumferential direction of the plate.

According to a twenty-eighth aspect of the present invention, there is provided an inwheel motor system, wherein the working directions of all the direct-acting guides on the motor side are 45° from the radial direction of the hollow disk-like plate, and the working directions of all the direct-acting guides on the wheel side are perpendicular to the working directions of all the direct-acting guides on the motor side.

According to a twenty-ninth aspect of the present invention, there is provided an inwheel motor system, wherein the non-rotary case of the motor for supporting the stator of the motor is connected to the knuckle which is a part around the wheel of the motor by a buffer member or a buffer unit, and the rotary case of the motor is connected to the wheel by a first hollow disk-like plate comprising a plurality of direct-acting guides on the motor side and the wheel side and by a second hollow disk-like plate disposed on the inner side of the first hollow disk-like plate and comprising a plurality of direct-acting guides arranged in an opposite way to that of the first hollow disk-like plate.

According to a thirtieth aspect of the present invention, there is provided an inwheel motor system, wherein the direct-acting guides are disposed at the same positions on the front and back sides of the first and second hollow disk-like plates at an interval of 90° or 180° in the circumferential direction of the first and second hollow disk-like plates, the working directions of all the direct-acting guides on the motor side of the first and second hollow disk-like plates are 45° from the radial direction of the plates, and the working directions of all the direct-acting guides on the wheel side of the plates are perpendicular to the working directions of the direct-acting guides on the motor side.

According to a thirty-first aspect of the present invention, there is provided an inwheel motor system, wherein the mass of the first hollow disk-like plate is made equal to the mass of the second hollow disk-like plate.

According to a thirty-second aspect of the present invention, there is provided an inwheel motor system, wherein each of the direct-acting guides consists of a guide rail having at least one recess or projection extending in the radial direction of the plate and of a guide member to be engaged with the guide rail.

According to a thirty-third aspect of the present invention, there is provided an inwheel motor system, wherein steel balls are placed between the guide rail and the guide member.

According to a thirty-fourth aspect of the present invention, there is provided an inwheel motor system, wherein grooves extending in the radial direction are formed in the opposing sides of the plates, and steel balls which can move along the grooves are placed between the plates to guide the adjacent plates in the radial direction of the disk.

According to a thirty-fifth aspect of the present invention, there is provided an inwheel motor system, wherein when the number of the plates is represented by N, the plates are disposed in such a manner that the angle formed by adjacent direct-acting guides or grooves in the axial direction of the plates is incremented by $180/(N-1)°$ from the end portion.

According to a thirty-sixth aspect of the present invention, there is provided an inwheel motor system, wherein the non-rotary case of the motor for supporting the stator of the motor and a knuckle which is a part around the wheel of the vehicle are interconnected by a buffer member comprising at least one pair of substantially A-shaped or H-shaped link units, each having two arms rotatably interconnected by a spring and a damper, the end of one arm being connected to the non-rotary case and the end of the other arm being connected to the knuckle.

According to a thirty-seventh aspect of the present invention, there is provided an inwheel motor system, wherein a shaft type suspension unit is provided, and the non-rotary case of the motor for supporting the stator of the motor and the shaft are interconnected by a buffer member comprising at least one pair of substantially A-shaped or H-shaped link units, each having two arms rotatably interconnected by a spring and a damper, the end of one arm being connected to the non-rotary case and the end of the other arm being connected to the shaft.

According to a thirty-eighth aspect of the present invention, there is provided an inwheel motor system, wherein the non-rotary case of the motor and a knuckle are interconnected by two plates whose working directions are limited to the vertical direction of the vehicle by direct-acting guides, and the two plates are interconnected by springs and dampers which operate in the vertical direction of the vehicle.

According to a thirty-ninth aspect of the present invention, there is provided an inwheel motor system, wherein the motor is supported to a knuckle which is a part around the wheel by direct-acting guides and a buffer unit in such a manner that it can move in the vertical direction of the vehicle, and the buffer unit has valves between a hydraulic cylinder and a reservoir tank.

According to a fortieth aspect of the present invention, there is provided an inwheel motor system, wherein the piston upper chamber and piston lower chamber of the hydraulic cylinder are each provided with a working oil passage having an independent valve and a reservoir tank.

According to a forty-first aspect of the present invention, there is provided an inwheel motor system, wherein the piston upper chamber and piston lower chamber of the hydraulic cylinder are each provided with a working oil passage having an independent valve, and the two working oil passages are connected to a common reservoir tank.

According to a forty-second aspect of the present invention, there is provided an inwheel motor system, wherein the piston upper chamber and piston lower chamber of the hydraulic cylinder are interconnected by working oil passages, each having an independent valve, and the piston lower chamber is connected to a reservoir tank.

According to a forty-third aspect of the present invention, there is provided an inwheel motor system, wherein the hub portion of the system has a connection unit with the output shaft of the power engine of the vehicle.

According to a forty-fourth aspect of the present invention, there is provided an inwheel motor system, wherein the motor is an outer rotor type motor.

According to a forty-fifth aspect of the present invention, there is provided an inwheel motor system, wherein the motor is an inner rotor type motor.

According to a forty-sixth aspect of the present invention, there is provided an inwheel motor system having an electric motor in a wheel portion to drive a wheel, wherein the motor is a geared motor comprising a hollow inner rotor type motor and a speed reducing gear, the non-rotary case of this geared motor and a knuckle which is a part around the wheel of a vehicle are interconnected by a buffer member, and the output shaft of the speed reducer and the wheel are linked by a shaft having a universal joint.

According to a forty-seventh aspect of the present invention, there is provided an inwheel motor system, wherein a direct-acting guide for guiding the motor in a vertical direction is interposed between the non-rotary case and the knuckle.

According to a forty-eighth aspect of the present invention, there is provided an inwheel motor system, wherein the non-rotary case of the motor for supporting the stator of a hollow outer rotor type motor is connected to a knuckle which is a part around the wheel of a vehicle, the rotary case of the motor for supporting the rotor of the motor is connected to the wheel, and a wheel support unit is provided on the inner side of the motor.

According to a forty-ninth aspect of the present invention, there is provided an inwheel motor system, wherein the rotary case is inscribed in the wheel, and the knuckle and the hub portion of the system connected to the rotation axis of the wheel are interconnected by a hub bearing provided on the inner side of the hollow motor to support the wheel.

According to a fiftieth aspect of the present invention, there is provided an inwheel motor system, wherein the rotary case is connected to the wheel by elastic members.

According to a fifty-first aspect of the present invention, there is provided an inwheel motor system, wherein the vertical elastic coefficient of the material of the elastic members is 1 to 120 MPa.

According to a fifty-second aspect of the present invention, there is provided an inwheel motor system, wherein a brake disk or brake drum is mounted to the hub portion.

According to a fifty-third aspect of the present invention, there is provided an inwheel motor system, wherein the hub portion of the system has a connection unit with the output shaft of the power engine of the vehicle.

According to a fifty-fourth aspect of the present invention, there is provided an inwheel motor system having a hollow electric motor in a wheel portion to drive a wheel, wherein the motor is supported to a knuckle which is a part around the wheel of a vehicle by direct-acting guides and buffer members in the vertical direction of the vehicle and by direct-acting guides and buffer members in the longitudinal direction of the vehicle, and the rotary case of the motor and the wheel are interconnected by a flexible coupling or constant-velocity universal joint in such a manner that they can be eccentric from each other.

According to a fifty-fifth aspect of the present invention, there is provided an inwheel motor system, wherein the motor is an outer rotor type motor.

According to a fifty-sixth aspect of the present invention, there is provided an inwheel motor system, wherein the motor is an inner rotor type motor.

According to a fifty-seventh aspect of the present invention, there is provided an inwheel motor system having an electric motor in a wheel portion to drive a wheel, wherein the motor is a geared motor comprising a hollow inner rotor type motor and a speed reducing gear, the non-rotary case of this geared motor is supported to a knuckle which is a part around the wheel by direct-acting guides and buffer members in the vertical direction and by direct-acting guides and buffer members in the longitudinal direction of the vehicle, and the output shaft of the speed reducer and the wheel are interconnected by a shaft having a universal joint.

According to a fifty-eight aspect of the present invention, there is provided an inwheel motor system having a hollow electric motor in a wheel portion to drive a vehicle, comprising a first annular case inside of which is opened in respect to a radial direction of the same, a second annular case arranged coaxially with the first annular case and placed inner side of the first annular case and outside of which is opened outwardly with respect to a radial direction facing the inner side opened portion, either one of the cases constitutes a rotary case provided with a motor rotor, another case constitutes a non-rotary case provided with a motor stator, the non-rotary case and the rotary case are rotatively coupled through a bearing, wherein the non-rotary case is connected to a knuckle and the rotary case is connected to a wheel.

The above and other objects, features and advantages of the present invention will become apparent from the following description when taken in conjunction with the accompanying drawings.

BRIEF DESCRIPTION OF THE DRAWINGS

FIGS. 11(a) and 11(b) are diagrams showing a method of arranging board-like elastic members according to the present invention;

FIG. 12 is a graph showing the relationship between the number of board-like elastic members and vertical stiffness;

FIGS. 28(a) to 28(c) are diagrams for explaining the operation of the flexible coupling according to Embodiment 5 of the present invention;

FIG. 44 is a table showing mass, spring constant and others in each car vibration model;

FIG. 55 is a table showing mass, spring constant and others in each car vibration model;

FIG. 63 is a table showing mass, spring constant and others in each car vibration model;

FIG. 75 is a table showing mass, spring constant and others in each car vibration model;

DETAILED DESCRIPTION OF THE PREFERRED EMBODIMENTS

Preferred embodiments of the present invention will be described with reference to the accompanying drawings hereinunder.

Embodiment 1

Figure 1:
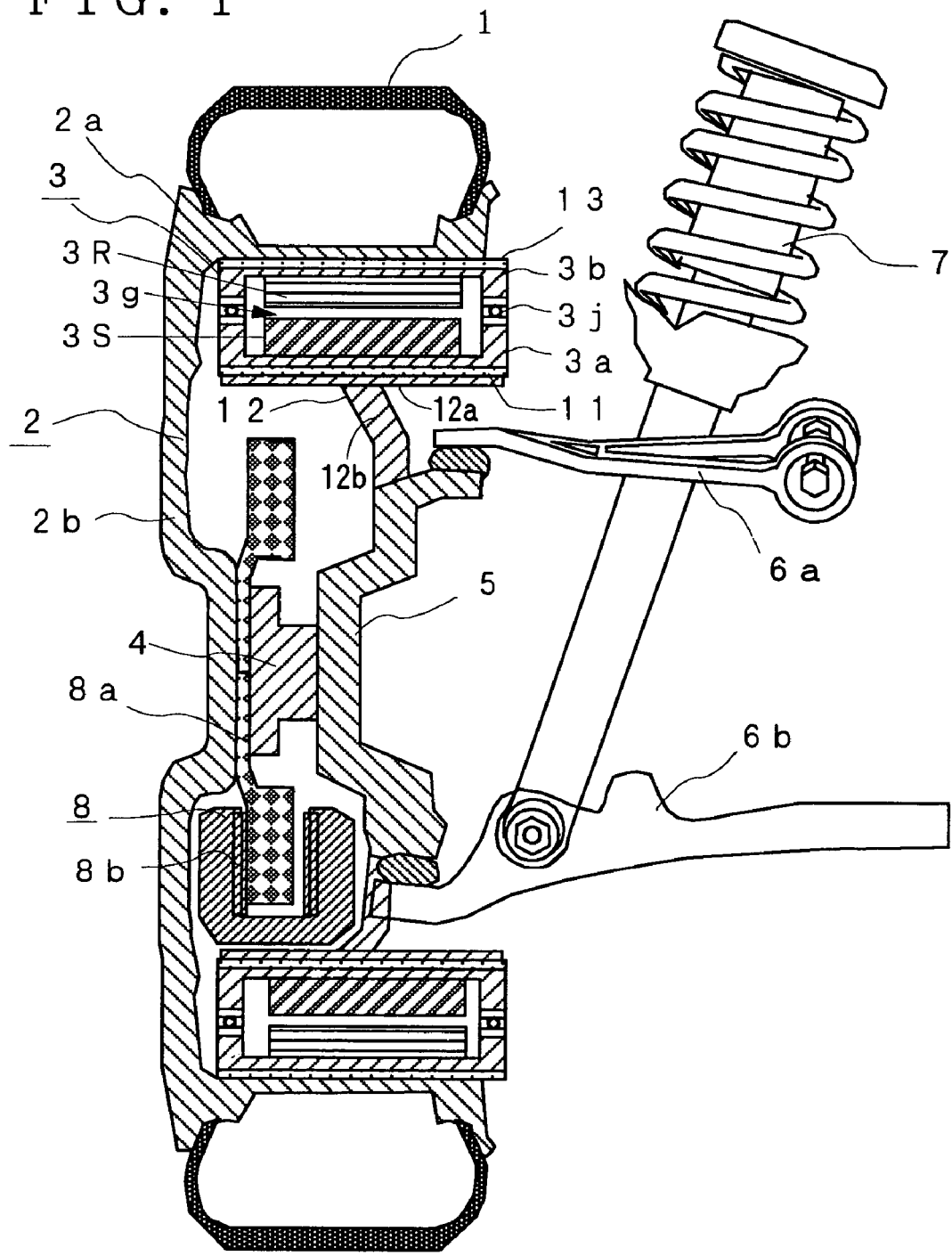
FIG. 1 is a longitudinal sectional view showing the constitution of an inwheel motor system according to Embodiment 1 of the present invention.
Figure 2:
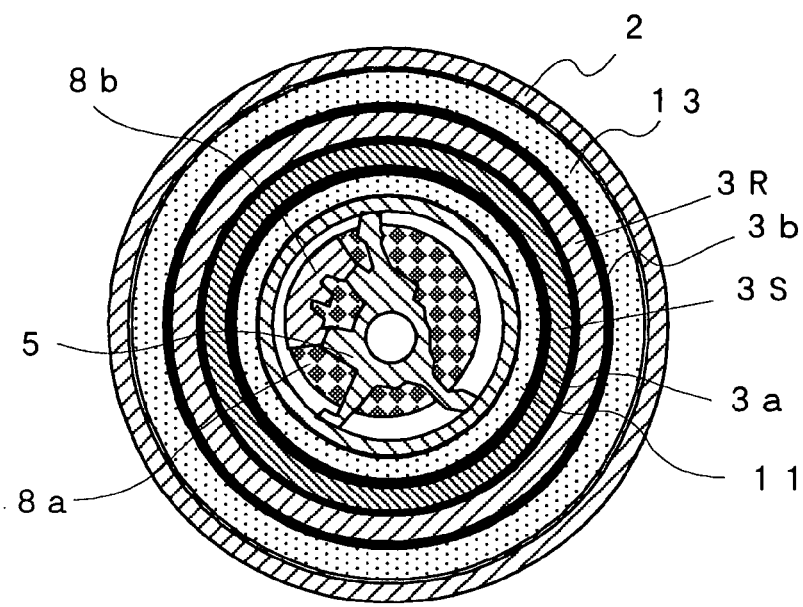
FIG. 2 is a front sectional view showing the constitution of the inwheel motor system according to Embodiment 1 of the present invention.

FIG. 1 and FIG. 2 are diagrams showing the constitution of an inwheel motor system according to Embodiment 1 of the present invention. FIG. 1 is a longitudinal sectional view and FIG. 2 is a front sectional view of the inwheel motor system. In these figures, reference numeral 1 denotes a tire, 2 denotes a wheel consisting of a rim 2*a* and a wheel disk 2*b*, and 3 denotes an inwheel motor of an outer rotor type comprising a motor stator (to be simply referred to as "stator" hereinafter) 3S fixed to a non-rotary case 3*a* provided on the inner side in a radial direction and a motor rotor (to be simply referred to as "rotor" hereinafter) 3R fixed to a rotary case 3*b* rotatably fixed to the above non-rotary case 3*a* through a bearing 3*j* and provided on the outer side in the radial direction. An air gap 3*g* is formed between the above rotor 3R and the above stator 3S. Reference numeral 4 represents a hub portion connected to the rotation axis of the above wheel 2, 5 represents a knuckle coupled to upper and lower suspension arms 6*a* and 6*b*, 7 represents a suspension member which is a shock absorber or the like, and 8 represents a brake which is a brake disk comprising a brake rotor 8a mounted to the hub portion 4 and a brake caliper 8b. Another type of brake such as a brake drum may be used as the brake 8.

In this embodiment, the non-rotary case 3a to which the stator 3S of the above inwheel motor 3 is fixed is connected to the knuckle 5 which is a part around the wheel of the vehicle through a first elastic member 11 which is made from an elastic material such as rubber and through a connection member 12 having a support member 12a for supporting the above first elastic member 11 from the inner side in the radial direction and a plurality of arm portions 12b extending toward the knuckle 5 from the above support member 12a, and the rotary case 3b to which the rotor 3R is fixed and which is rotatably connected to the above non-rotary case 3a through the bearing 3j is connected to the wheel 2 through a second elastic member 13 in order to float-mount the inwheel motor 3 to a part around each wheel such as the knuckle 5.

Figure 3:
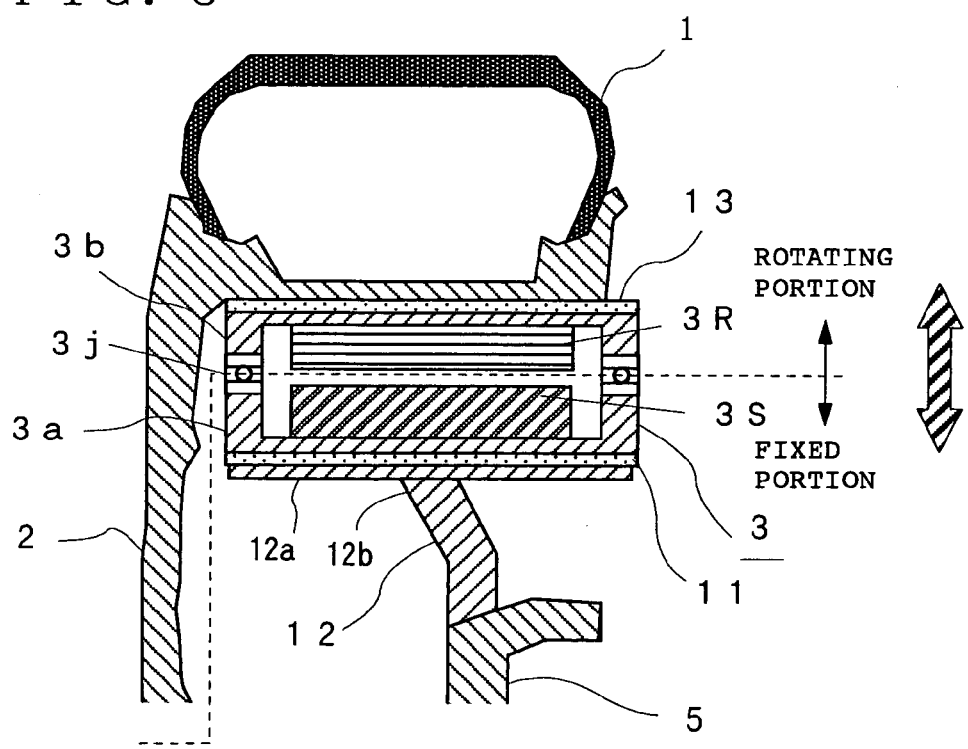
FIG. 3 is a diagram showing the moving state of an inwheel motor according to Embodiment 1 of the present invention.

Therefore, the rotation axis of the above inwheel motor 3 can move in the radial direction independently of the rotation axis of the wheel 2. That is, since the inwheel motor 3 is rotatably divided into an outer section and an inner section in the radical direction with the bearing 3j as the boundary therebetween as shown in FIG. 3, the above rotary case 3b to which the rotor 3R is fixed rotates and transmits its torque to the wheel 2 to which the tire 1 is mounted while the rotation axis of the above inwheel motor 3 moves in the radial direction independently of the shaft.

In the above constitution, the mass of the inwheel motor 3 is separated from an unsprung mass corresponding portion of the vehicle, such as the wheel 2 or the knuckle 5, and functions as the mass of a so-called dynamic damper. Therefore, the above dynamic damper serves to reduce a tire contact force fluctuation (to be abbreviated as TCFF hereinafter) when the vehicle runs over an uneven road, thereby improving the road holding properties of the vehicle. Even when the vehicle runs over a bad road, as vibration is not directly transmitted to the above inwheel motor 3, a load on the inwheel motor 3 imposed by vibration is reduced.

At this point, the above motor 3 is mounted by suitably selecting the mass of the above motor 3 and the elastic constants of the first and second elastic members 11 and 13 which are buffer members to ensure that the resonance frequency of a motor section including the above mounted inwheel motor 3 should become higher than the resonance frequency of the sprung mass (car body) of the vehicle and lower than the resonance frequency of the unsprung mass including the wheel 2 and the knuckle 5, thereby making it possible to effectively reduce the level of TCFF when the vehicle runs over an uneven road.

Since the mass of the vehicle to be applied to each wheel is supported by the above hub portion 4 due to the adoption of this constitution, a load on the inwheel motor 3 becomes small with the result that a change in the air gap 3g formed between the stator 3S and the rotor 3R is reduced. Therefore, as the stiffness of the above non-rotary case 3a and the stiffness of the rotary case 3b can be reduced, the mass of the inwheel motor 3 can be reduced.

The spring constant in the radial direction of the above first elastic member 11 is set to a lower level in the vertical direction of the vehicle than that in the longitudinal direction, whereby the inwheel motor 3 can be moved only in substantially the vertical direction, thereby making it possible to suppress the co-rotation of the wheel 2 and the inwheel motor 3 and to improve the rotation drive efficiency of the wheel.

Figure 4:
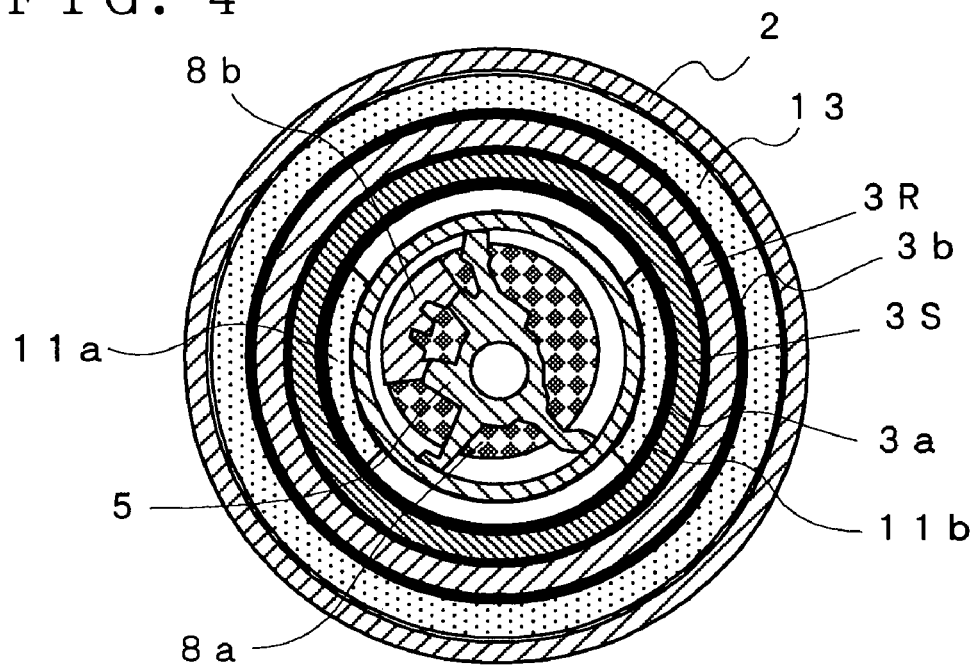
FIG. 4 is a diagram of another inwheel motor system according to Embodiment 1 of the present invention.
Figure 5:
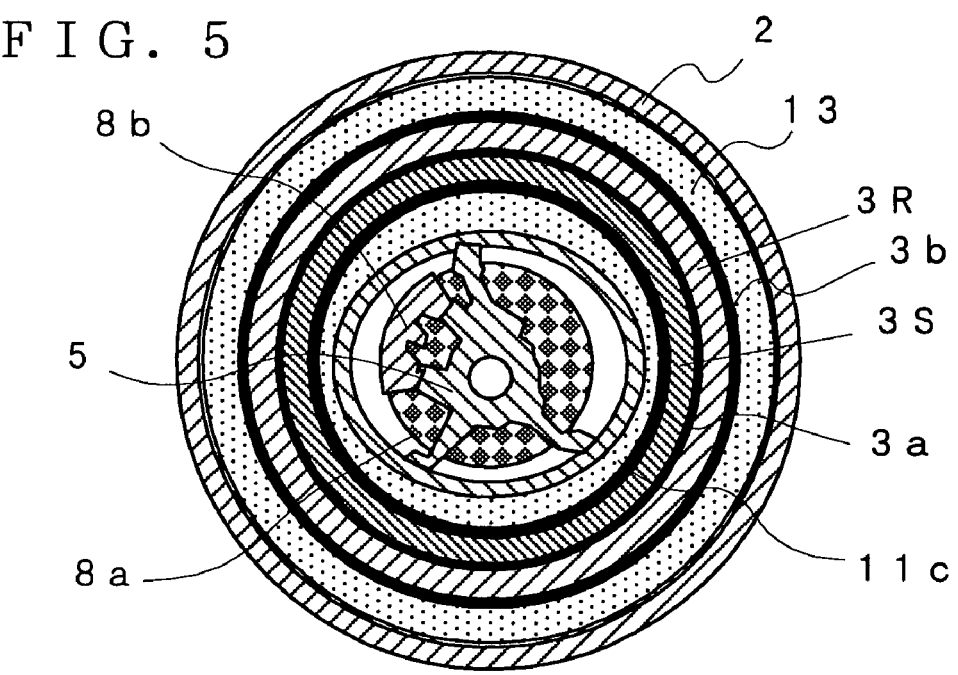
FIG. 5 is a diagram of still another inwheel motor system according to Embodiment 1 of the present invention.

In order to adjust the spring constant of the above first elastic member 11 to a low level in the vertical direction of the vehicle and to a high level in the longitudinal direction, elastic members 11a and 11b are provided only in the longitudinal direction as shown in FIG. 4, or an oval elastic member 11c having a long axis in the longitudinal direction is used as the first elastic members 11 as shown in FIG. 5. When the above oval elastic member 11c is used, as shown in FIG. 5, the knuckle 5 must conform to the shape of the above elastic member 11c.

In order to adjust stiffness to a low level in the vertical direction and to a high level in the rotation direction, it is important to balance material stiffness with shape stiffness. When the first elastic member 11 and the second elastic member 13 are made from an elastic material such as rubber as in this embodiment, to obtain predetermined stiffness, a material having a vertical elastic coefficient of 1 to 120 MPa is preferably used as the material of the above first and second elastic members 11 and 13. The above elastic coefficient is more preferably 1 to 40 MPa.

When a spring member such as a metal spring is used as the first and second elastic members 11 and 13, the vertical elastic coefficient of the material of the above first and second elastic members 11 and 13 is preferably set to 10 to 300 GPa.

In this Embodiment 1, the non-rotary case 3a to which the stator 3S of the inwheel motor 3 is fixed is connected to the knuckle 5 which is a part around the wheel of the vehicle through the first elastic member 11 mounted to the connection member 12 extending from the knuckle 5, and the rotary case 3b to which the rotor 3R is fixed is connected to the wheel 2 through the second elastic member 13 so that the inwheel motor 3 serves as the weight of a dynamic damper for the unsprung mass, thereby making it possible to reduce the level of TCFF when the vehicle runs over an uneven road, to improve the road holding properties of the vehicle and to reduce a load on the inwheel motor 3 imposed by vibration.

By adopting the inwheel motor system of the present invention, an inwheel motor car which has excellent space efficiency, excellent transmission efficiency of driving force and high road holding properties can be realized.

Figure 6:
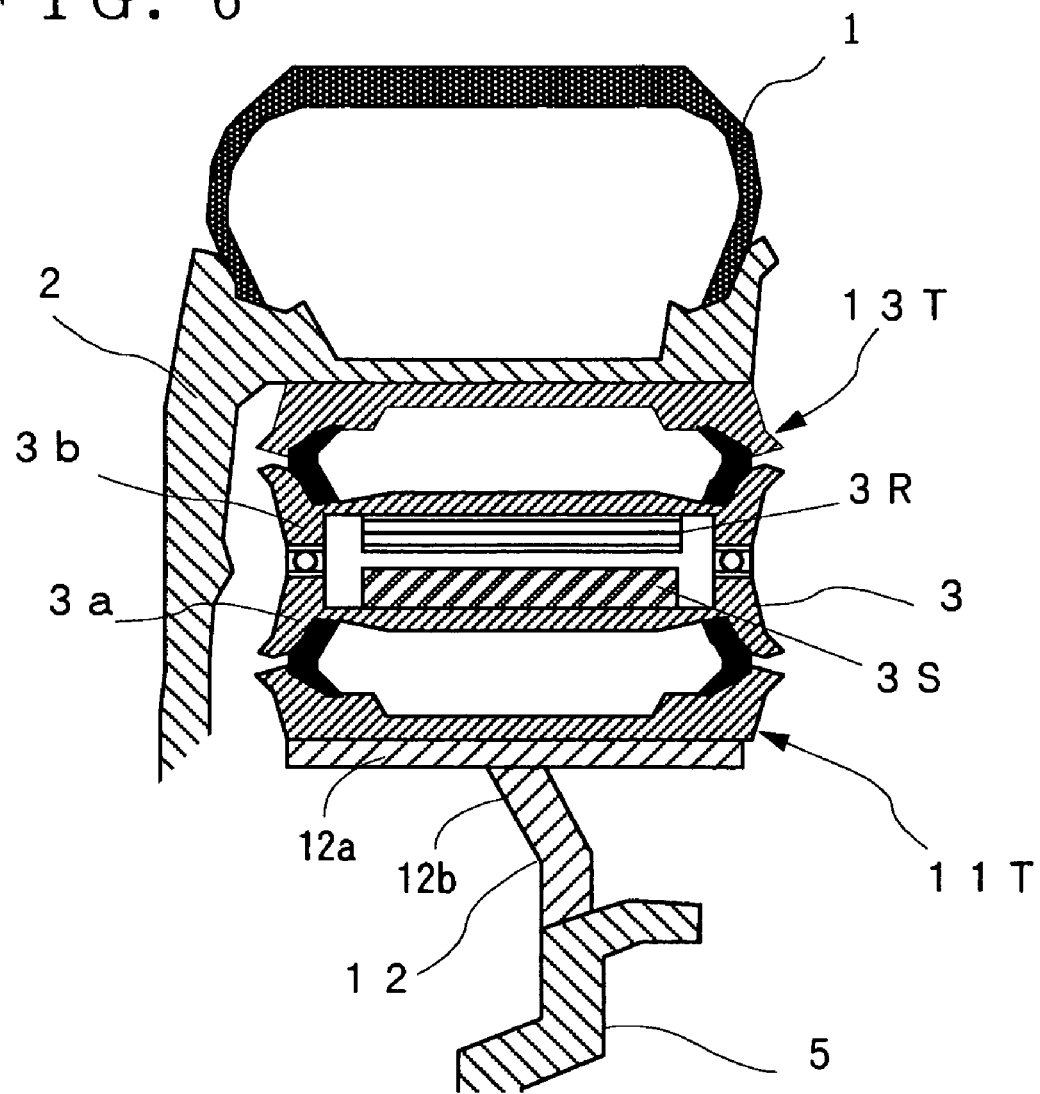
FIG. 6 is a diagram showing the constitution of an inwheel motor system comprising an air spring according to the present invention.

In the above Embodiment 1, the non-rotary case 3a of the inwheel motor 3 is mounted to the knuckle 5 through the first elastic member 11, and the rotary case 3b is mounted to the wheel 2 through the second elastic member 13. When tire-like ring air springs 11T and 13T as shown in FIG. 6 are used in place of the above first and second elastic members 11 and 13, respectively, a spring constant in a shearing direction can be made high in spite of a low spring constant in the radial direction, thereby making it possible to constitute lightweight and highly elastic members.

Figure 7:
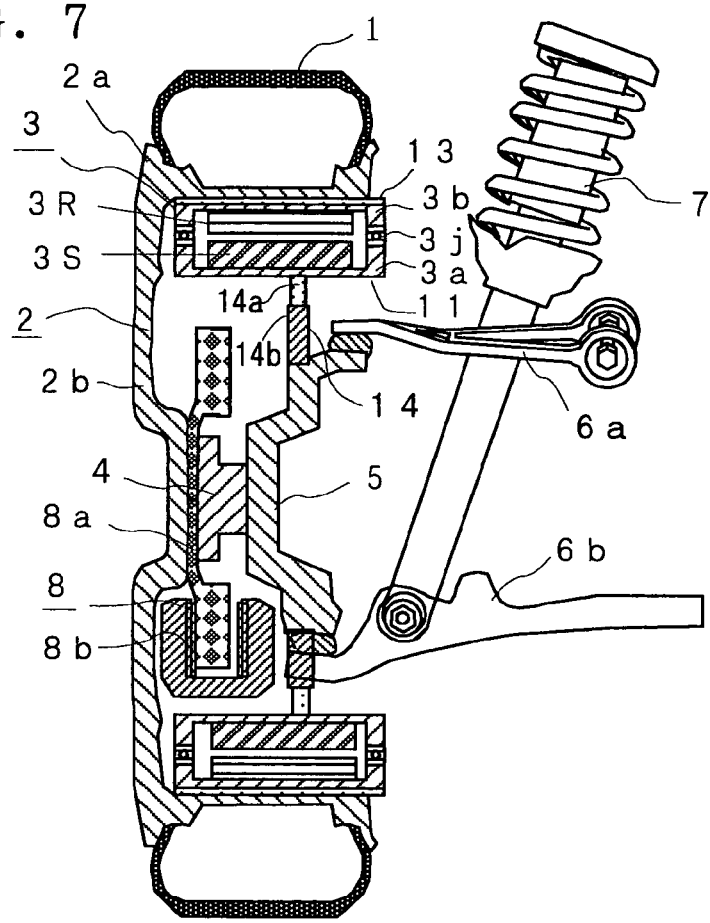
FIG. 7 is a diagram showing the constitution of an inwheel motor system comprising a direct-acting guide unit including a damper according to the present invention.
Figure 8:
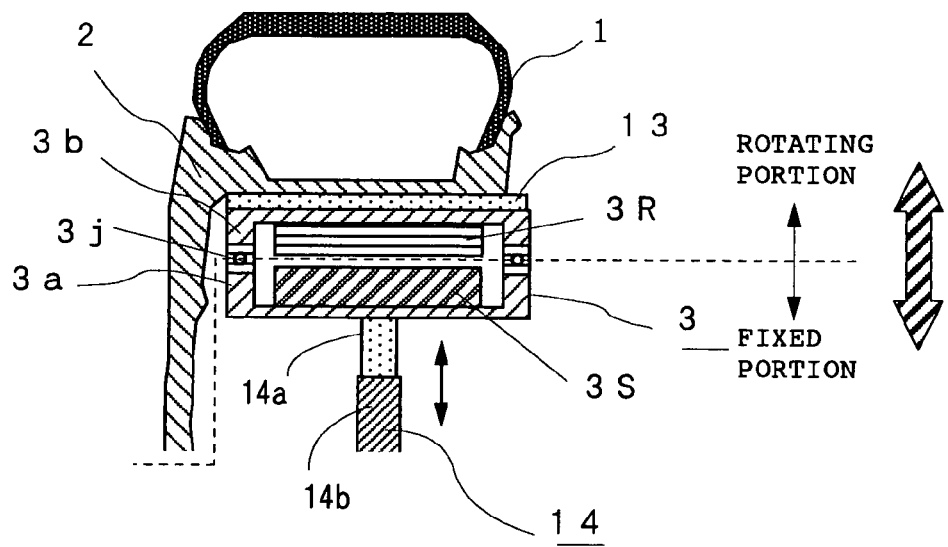
FIG. 8 is a diagram showing the moving state of the inwheel motor of FIG. 7.

As shown in FIG. 7 and FIG. 8, the non-rotary case 3a and the knuckle 5 may be connected by a direct-acting guide unit 14 which comprises a damper 14a and a support member 14b for supporting the damper 14a in the vertical direction of the vehicle in place of the above first elastic member 11 and the above connection member 12. Thereby, the inwheel motor 3 can be confined to vertical movement while generating attenuation force with the result that the co-rotation of the wheel 2 and the inwheel motor 3 can be suppressed and rotation drive efficiency can be improved.

Figure 9:
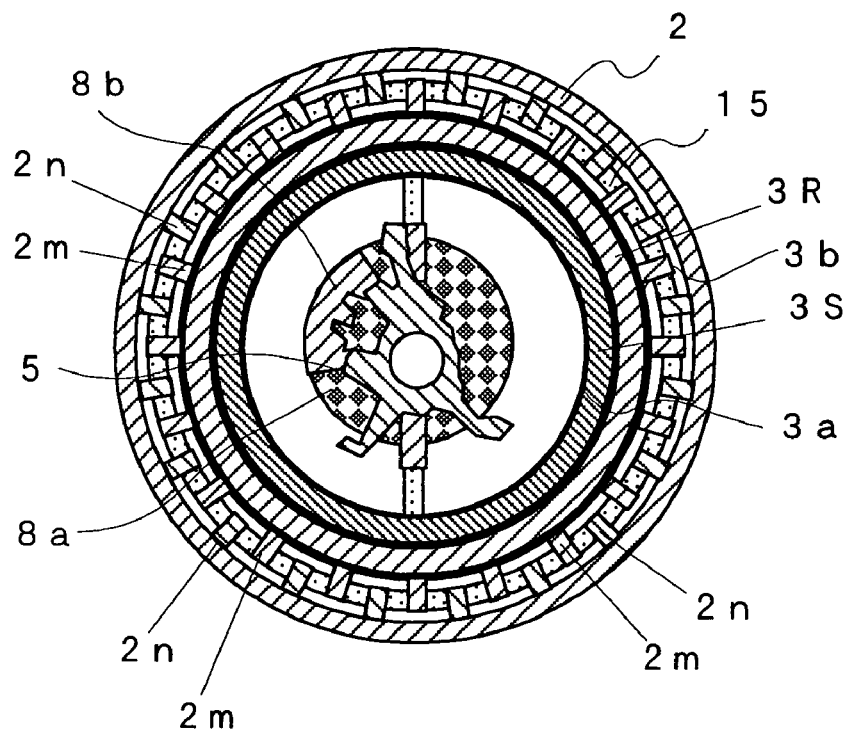
FIG. 9 is a diagram showing the constitution of an inwheel motor system comprising a damper unit for interconnecting ribs by an elastic member according to the present invention.

As shown in FIG. 9, rotor-side ribs 2m extending from the rotary case 3b toward the wheel 2 and wheel-side ribs 2n extending from the wheel 2 toward the above rotary case 3b are interconnected by an elastic member 15 at equal intervals in the circumferential direction of the wheel 2 so that a shear spring having low stiffness in the vertical direction or a compression tension spring having high stiffness in the rotation direction can be used as a spring for interconnecting the wheel 2 and the inwheel motor 3. Therefore, the inwheel motor 3 can move only in substantially the vertical direction, and the co-rotation of the inwheel motor 3 and the wheel 2 can be further suppressed.

Figure 10:
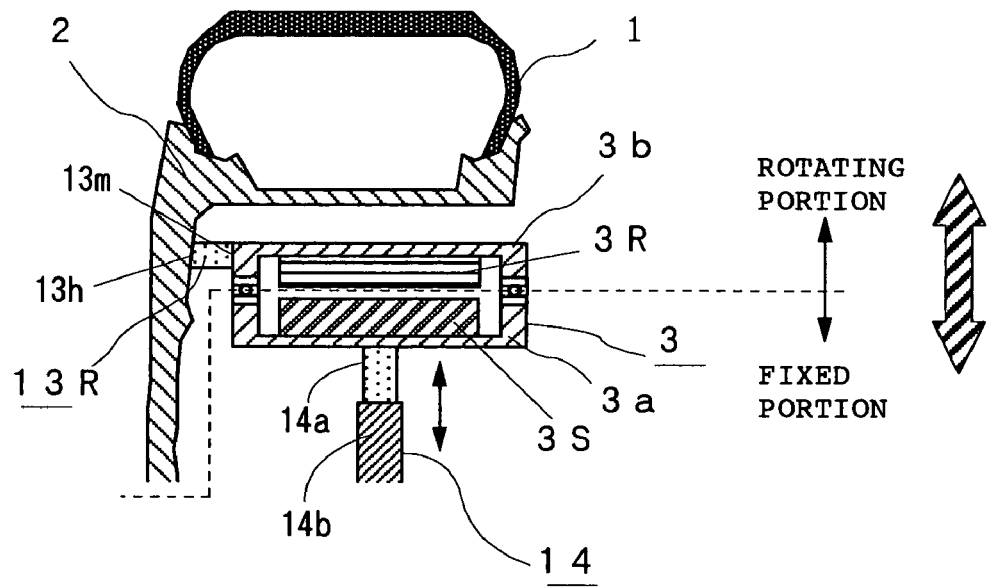
FIG. 10 is a diagram showing the moving state of the inwheel motor when a cylindrical elastic member is used.

Alternatively, as shown in FIG. 10, a cylindrical elastic member 13R may be used as the elastic member for interconnecting the wheel 2 and the rotary case 3b in place of the above second elastic member 13, one side 13h of the above elastic member 13R may be connected to the wheel 2, and the other side 13m may be connected to the rotary case 3b. Since the above cylindrical elastic member 13R functions as a shear spring which is deformed in a shearing direction when it transmits the vertical movement and torque of the inwheel motor 3, it has high stiffness in the rotation direction and low stiffness in the radial direction, thereby making it possible to improve rotation drive efficiency.

As shown in FIG. 11(*a*), the wheel 2 and the rotary case 3b are interconnected by a plurality of substantially board-like elastic members 13a to 13d arranged at equal intervals in parallel to the tangent direction of the wheel 2, whereby stiffness in the vertical direction can be made low and stiffness in the rotation direction can be made high. That is, when the end faces 13w and 13w in the width direction of the above board-like elastic members 13a to 13d are mounted to the wheel 2 to connect the wheel 2 to the rotary case 3b, the board-like faces 13s (faces perpendicular to the radial direction) of the above board-like elastic members 13a to 13d become parallel to the rotation direction of the inwheel motor 3 or the wheel 2 so that stiffness in the radial direction can be made low and stiffness in the rotation direction can be made high. When the number of the above board-like elastic members 13a to 13d is increased while their sizes are adjusted to maintain stiffness in the rotation direction, as shown in the graph of FIG. 12, stiffness in the vertical direction can be reduced.

The above stiffness in the vertical direction can be decomposed into a vertical component of stiffness in the radial direction and a vertical component of stiffness in the rotation direction. Therefore, to reduce stiffness in the vertical direction, the vertical component of stiffness in the radial direction and the vertical component of stiffness in the rotation direction should be reduced. However, stiffness in the rotation direction cannot be reduced in order to transmit the torque of the motor without a phase difference. Then, when rotary joint units 13z and 13z are provided on both end faces 13w and 13w in the width direction of the board-like elastic members 13a to 13d with the tangent direction of the motor as the axis to mount the above board-like elastic members 13a to 13d to the wheel 2, stiffness in the radial direction is eliminated and stiffness in the vertical direction can be reduced without reducing stiffness in the rotation direction.

When the number of the above board-like elastic members 13a to 13d is increased to maintain stiffness in the rotation direction, as shown in the graph of FIG. 12, stiffness in the vertical direction also increases. Therefore, the number of the above board-like elastic members 13a to 13d is preferably 16 or less.

When the cylindrical elastic member 13R shown in FIG. 10 is used, stiffness in the vertical direction can also be reduced by providing the above rotary joint units likewise to connect one end of the above elastic member 13R to the wheel 2.

Figure 13:
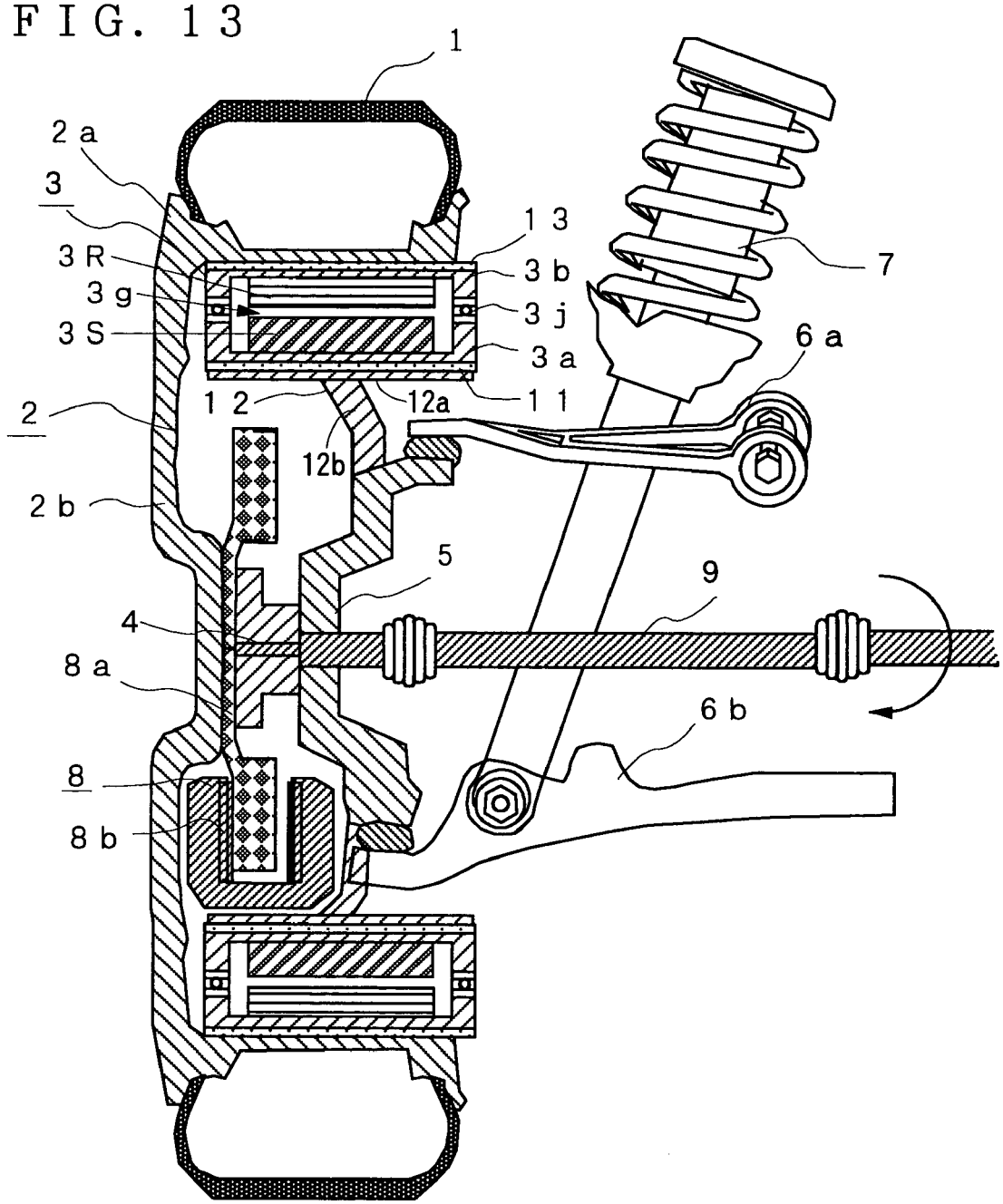
FIG. 13 is diagram showing the constitution of a hybrid type inwheel motor system according to the present invention.

As shown in FIG. 13, a connection portion with a drive shaft 9 may be formed in the hub portion 4 connected to the wheel 2 at its rotation axis like a normal automobile to connect the hub portion 4 to the drive shaft 9. Thereby, power from a car power engine or motor other than the inwheel motor 3 can be transmitted to the wheel 2 by the above drive shaft 9 so that a hybrid car can be constructed by connecting the output shaft of a gasoline engine vehicle to the hub portion 4 of the inwheel motor system of the present invention.

Embodiment 2

Figure 14:
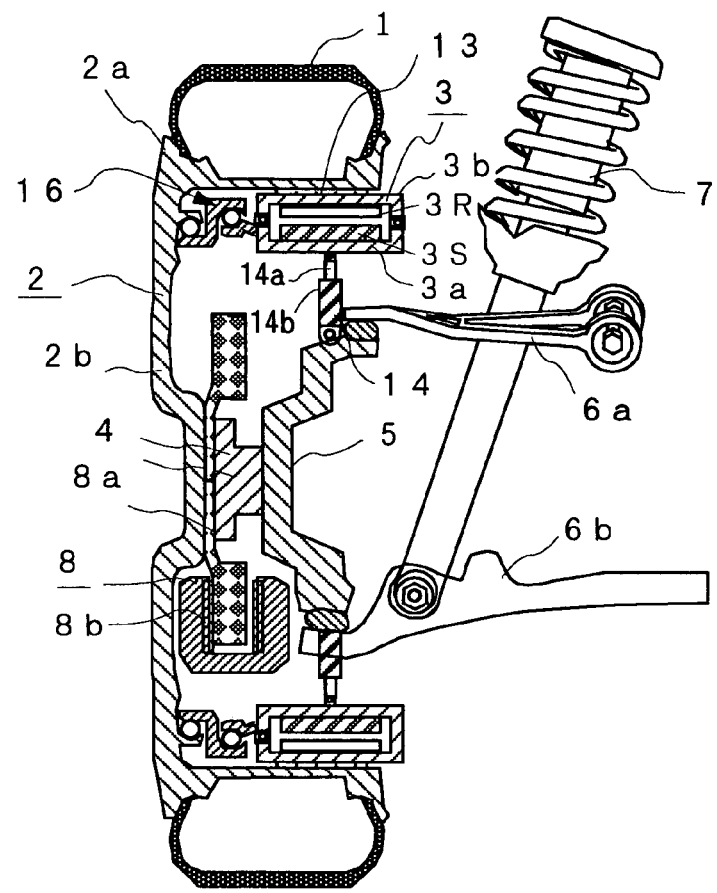
FIG. 14 is a diagram showing the constitution of an inwheel motor system comprising a constant-velocity universal joint according to Embodiment 2 of the present invention.
Figure 15:
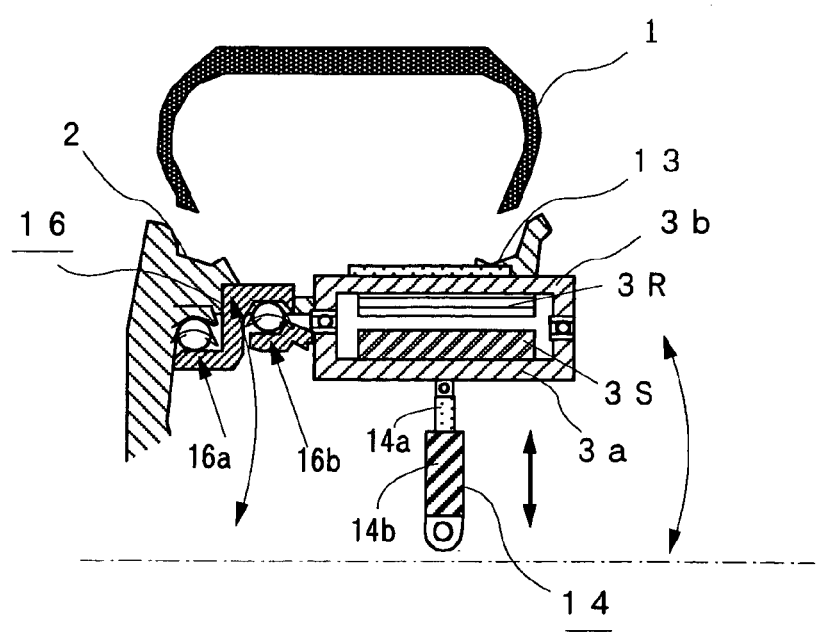
FIG. 15 is a diagram for explaining the operation of the constant-velocity universal joint.

In the above Embodiment 1, the rotary case 3b and the wheel 2 are interconnected by the second elastic member 13. As shown in FIG. 14 and FIG. 15, the above rotary case 3b may be connected to the wheel 2 by the second elastic member 13 and a constant-velocity universal joint 16.

That is, when the rotary case 3b and the wheel 2 are interconnected by an elastic member as in the above Embodiment, a phase difference is produced between the wheel 2 and the rotary case 3b by shear deformation in the circumferential direction. Therefore, the above rotary case 3b and the wheel 2 are interconnected by the above second elastic member 13 and the constant-velocity universal joint 16. By shifting the rotation center of a wheel-side joint 16a from the rotation center of a motor-side joint 16b, the inwheel motor 3 can transmit torque to the wheel 2 from the rotary case 3b without a phase difference while moving vertically in the wheel 2. Therefore, the above phase difference can be minimized and the transmission efficiency of torque from the rotary case 3b to the wheel 2 can be improved.

Further, the non-rotary case 3a and the knuckle 5 are interconnected by the direct-acting guide unit 14 which comprises the damper 14a and the support member 14b shown in FIG. 7 and FIG. 8 of the above Embodiment 1 to further reduce the above phase difference.

By mounting the second elastic member 13 at the center position of the mass of the motor in the width direction of the motor, the mass of the inwheel motor 3 serves only as a counterweight, which prevents a part around the wheel from sharing the mass of the motor.

When the non-rotary case 3a and the knuckle 5 are interconnected by the first elastic member 11 as shown in FIG. 1 and not the above direct-acting guide unit 14, the above first elastic member 11 is preferably mounted at the center position of the mass of the motor in the width direction of the motor to prevent a part around the wheel from sharing the mass of the motor.

Embodiment 3

In the above Embodiment 2, the rotary case 3b and the wheel 2 are interconnected by the second elastic member 13 and the constant-velocity universal joint 16. When the rotary case 3b and the wheel 2 are interconnected by a driving force transmitting unit which can be eccentric from the wheel 2 in the radial direction in place of the above constant-velocity universal joint 16, torque transmission efficiency from the rotary case 3b to the wheel 2 can be further improved.

Figure 16:
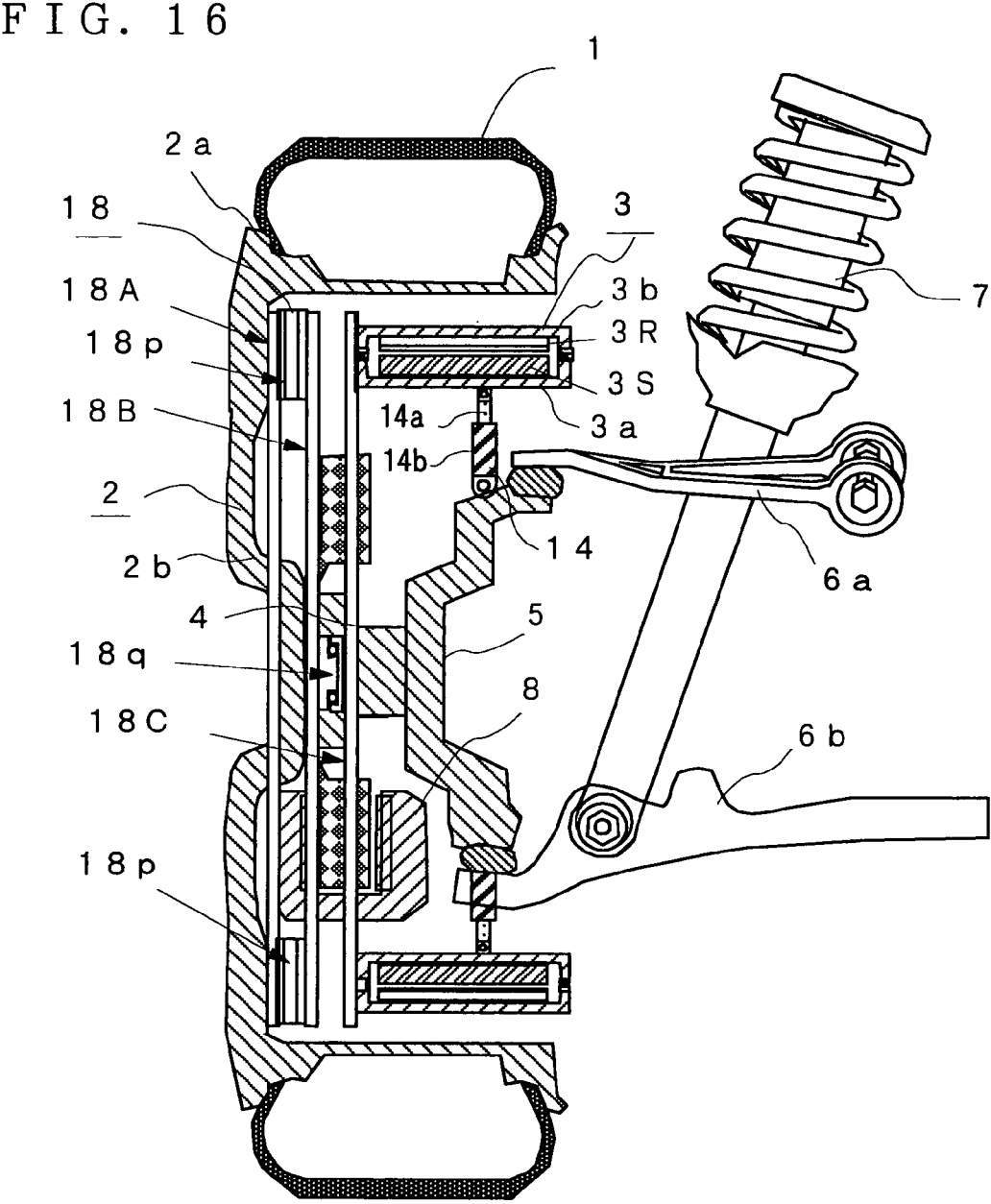
FIG. 16 is a longitudinal sectional view showing the constitution of an inwheel motor system according to Embodiment 3 of the present invention.
Figure 17:
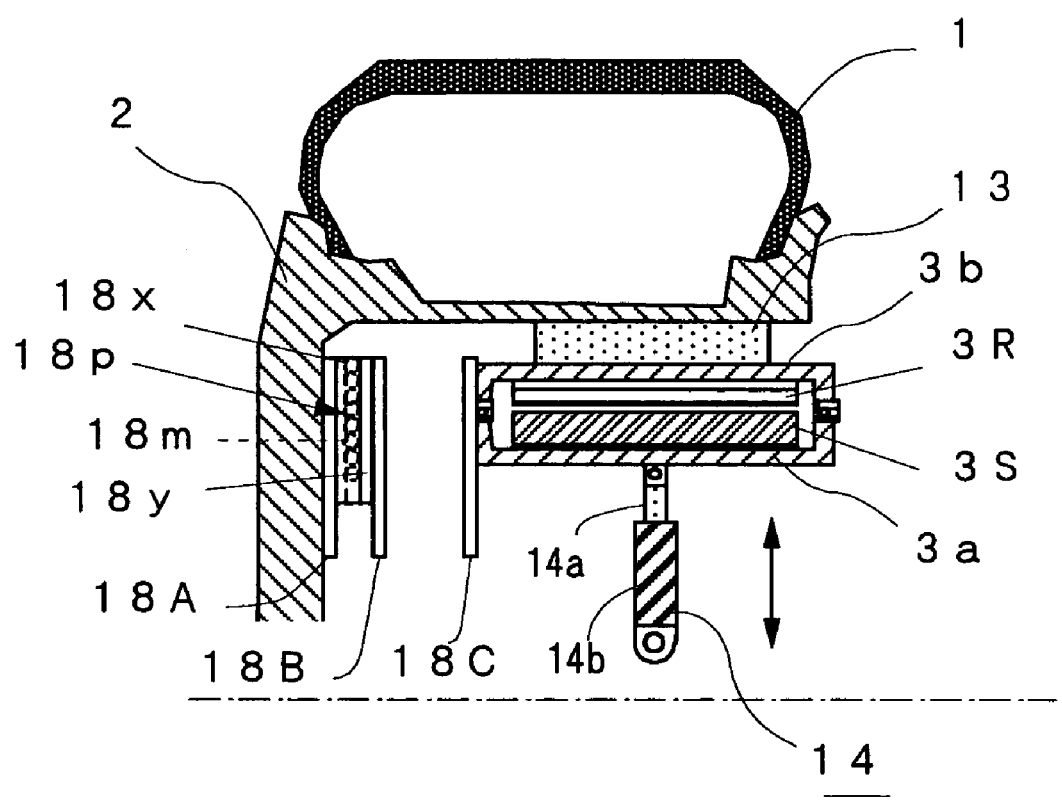
FIG. 17 is a sectional view of the key section of the inwheel motor system according to Embodiment 3 of the present invention.
Figure 18:
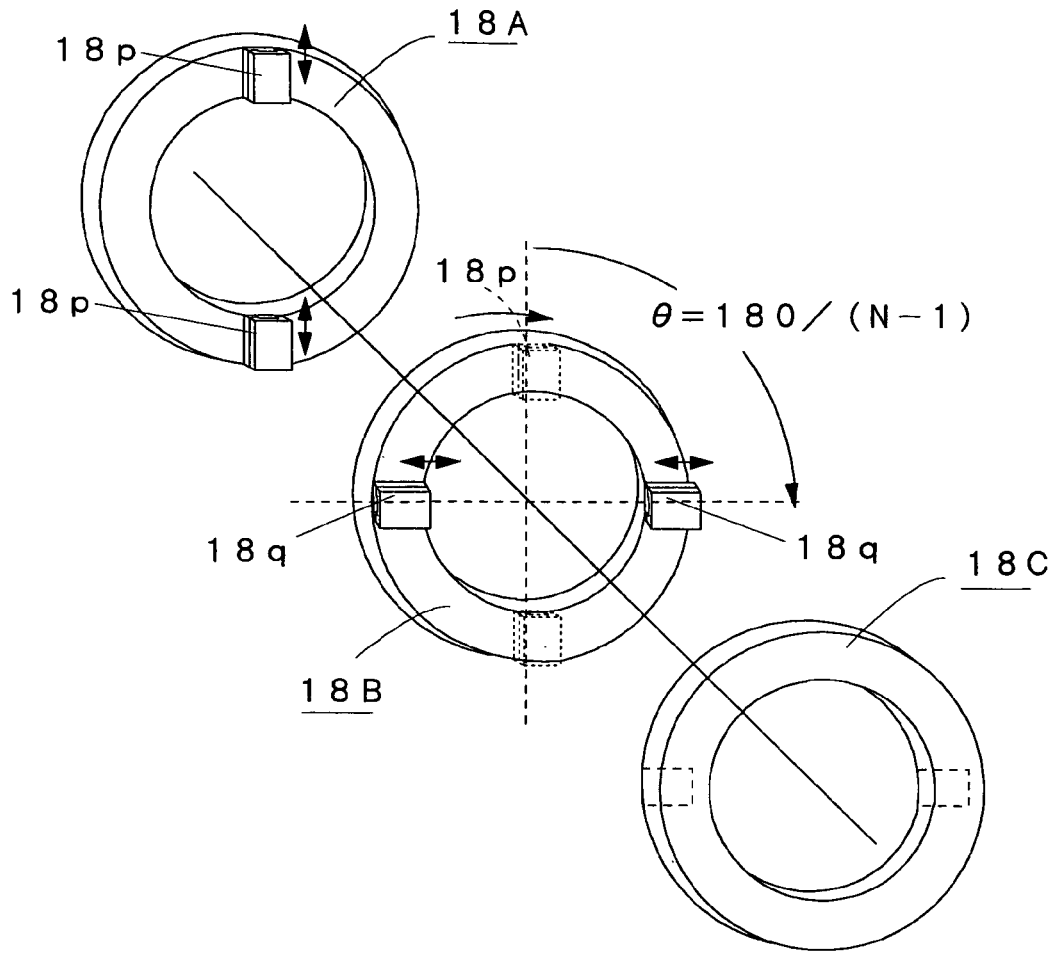
FIG. 18 is a diagram of the arrangement of direct-acting guides.

As the above driving force transmitting unit may be used, for example, a flexible coupling 18 which comprises a plurality of hollow disk-like plates 18A to 18C and direct-acting guides 18p and 18q for interconnecting the adjacent plates 18A and 18B and the adjacent plates 18B and 18C and for guiding the adjacent plates 18A and 18B and the adjacent plates 18B and 18C in the radial direction of the disk as shown in FIGS. 16 to 18. The rotary case 3b is connected to the wheel 2 by the above flexible coupling 18 to minimize the phase difference between the wheel 2 and the rotary case 3b, thereby making it possible to further improve torque transmission efficiency from the rotary case 3b to the wheel 2.

Figure 19:
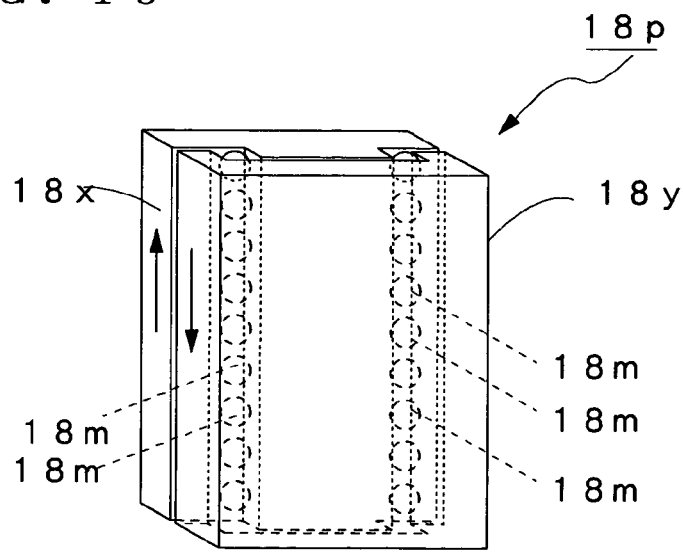
FIG. 19 is a diagram showing the constitution of the direct-acting guide.

As shown in FIG. 19, for example, each of the above direct-acting guides 18p and 18q comprises a guide rail 18x having a projection extending in the radial direction of the above plate, a guide member 18y having a recess extending in the radial direction of the above plate and mating with the above guide rail 18x, and a plurality of steel balls 18m placed between the projection of the above guide rail 18x and the recess of the guide member 18y to slide the above guide rail 18x and the guide member 18y smoothly.

The above guide rail 18x and guide member 18y are mounted on the opposing sides of the above adjacent plates 18A and 18B and the opposing sides of the above adjacent plates 18B and 18C, respectively.

Since the above guide rail 18x and guide member 18y slide such that they guide the above adjacent plates 18A and 18B and the adjacent plates 18B and 18C in the radial direction of the disk, the inwheel motor 3 can move in the working direction of the above direct-acting guides 18p and 18q, that is, the radial direction of the disk but not in the rotation direction. As a result, rotating torque can be transmitted to the wheel 2 efficiently.

By providing two or more pairs of direct-acting guides 18p and 18q having different angles, the above inwheel motor 3 can transmit driving torque to the wheel 2 while it is eccentric from the shaft in any direction.

When the number of direct-acting guides 18p and 18q is small, the angular velocity changes at the time of rotation. Therefore, a plurality of plates and a plurality of direct-acting guides are preferably combined. As shown in FIG. 18, when the number of the above hollow disk-like plates is represented by N, the above plates 18A to 18C are disposed to ensure that the angle formed by adjacent direct-acting guides should be incremented by $180/(N-1)°$ from the direct-acting guide 18p at one end, thereby making it possible to suppress a change in the above angular velocity without fail (since N=3 in this embodiment, the above angle is 90°).

Since the driving force of the inwheel motor 3 is transmitted to the wheel 2 mechanically when the rotary case 3b and the wheel 2 are interconnected by a driving force transmitting unit such as the above constant-velocity universal joint 16 or the flexible coupling 18, only the first elastic member 11 interposed between the non-rotary case 3a and the knuckle 5 suffices as a buffer member for exhibiting a dynamic damper effect.

Figure 20:
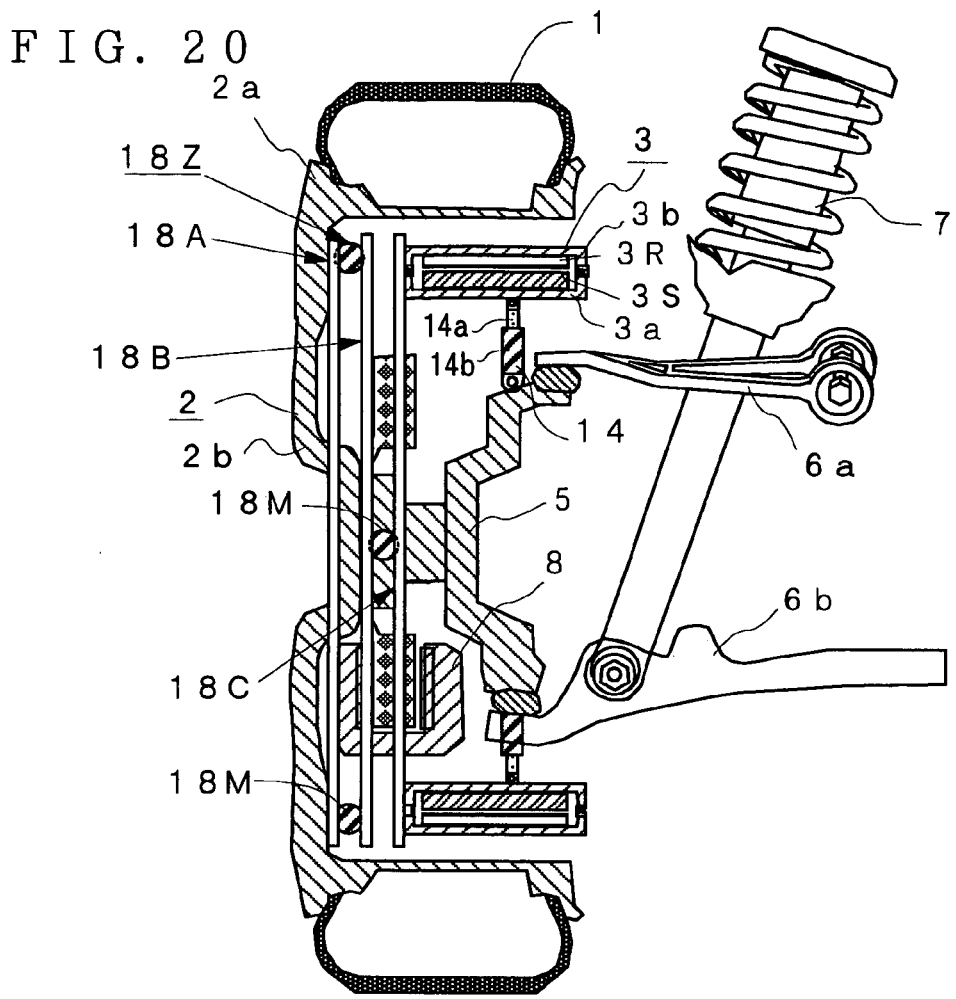
FIG. 20 is a diagram of another flexible coupling.
Figure 21:
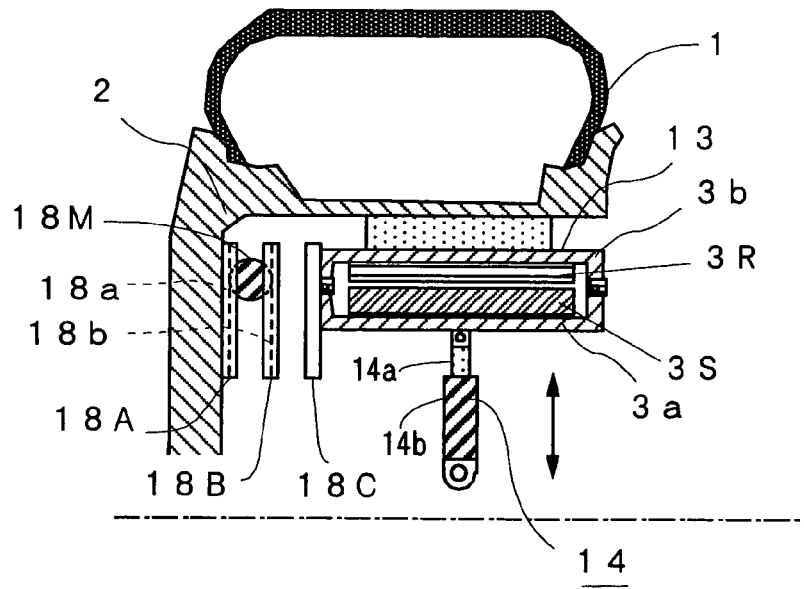
FIG. 21 is a sectional view of the key section of FIG. 20.
Figure 22:
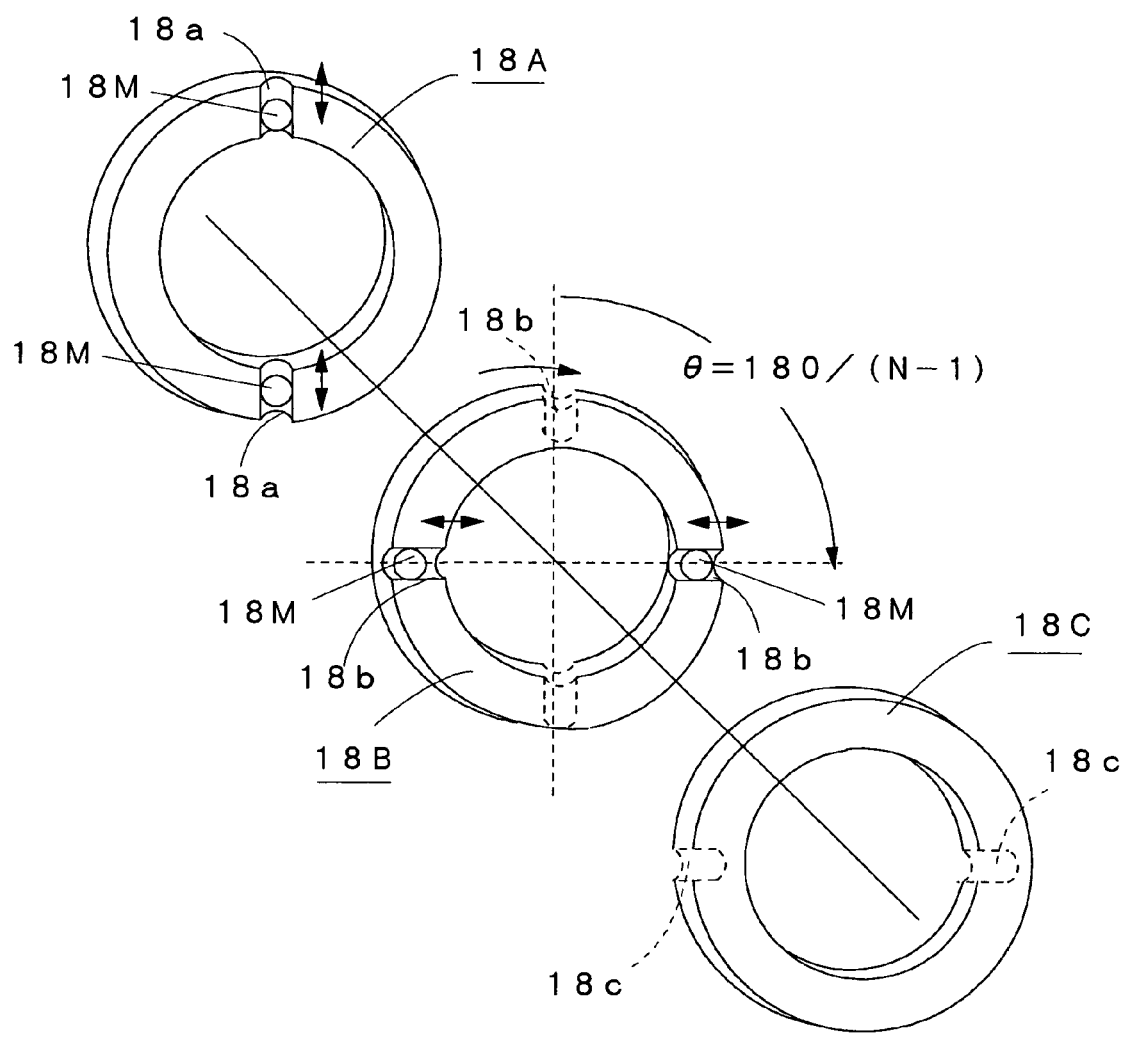
FIG. 22 is a diagram for explaining the operation of the flexible coupling shown in FIG. 20 and FIG. 21.

As the unit for guiding the above adjacent plates 18A to 18C in the radial direction of the disk may be used a flexible coupling 18Z as shown in FIGS. 20 to 22. This flexible coupling 18Z is constructed by forming bearing grooves 18a to 18c in the opposing sides of the above plates 18A to 18C in a radial direction and by placing bearing balls 18M which are a steel ball and which can move along the bearing grooves 18a and 18b and 18b and 18c between the opposing hollow disk-like plates 18A and 18B and between the opposing hollow disk-like plates 18B and 18C, respectively. A combination of the above bearing grooves 18a and 18b and a combination of the above bearing grooves 18b and 18c each constitute a direct-acting guide together with the bearing ball 18M.

That is, as the above bearing grooves 18a to 18c are formed such that the bearing balls 18M roll in the radial directions of the above plates 18A to 18C, the inwheel motor 3 can move in the direction of the above bearing grooves 18a to 18c but not the circumferential direction, thereby making it possible to transmit rotating torque to the wheel 2 efficiently. By combining two or more pairs of bearing grooves 18a to 18c having different angles with the bearing balls 18M, the above inwheel motor 3 can transmit driving torque to the wheel 2 while it is eccentric from the shaft in any direction.

Since the angular velocity changes at the time of rotation when the number of the bearing grooves is small, it is preferred to combine a plurality of plates with the bearing balls. Like the above direct-acting guides, as shown in FIG. 22, when the number of the above plates is represented by N, the above hollow disk-like plates are disposed to ensure that the angle formed by adjacent grooves in the axial direction of the plates should be incremented by $180/(N-1)°$ from the groove at one end, thereby making it possible to suppress a change in the above angular velocity without fail.

The plate 18A on the wheel 2 side (or the plate 18A and the guide rail 18x) which is a plate at one end may be integrated with the wheel 2 or the plate 18C on the rotary case 3b side (or the plate 18C and the guide member 18y) may be integrated with the rotary case 3b in the above flexible couplings 18 and 18Z. In this case, the number N of the plates used for the calculation of the angle is a value based on the assumption that there are plates at both ends.

Embodiment 4

Figure 23:
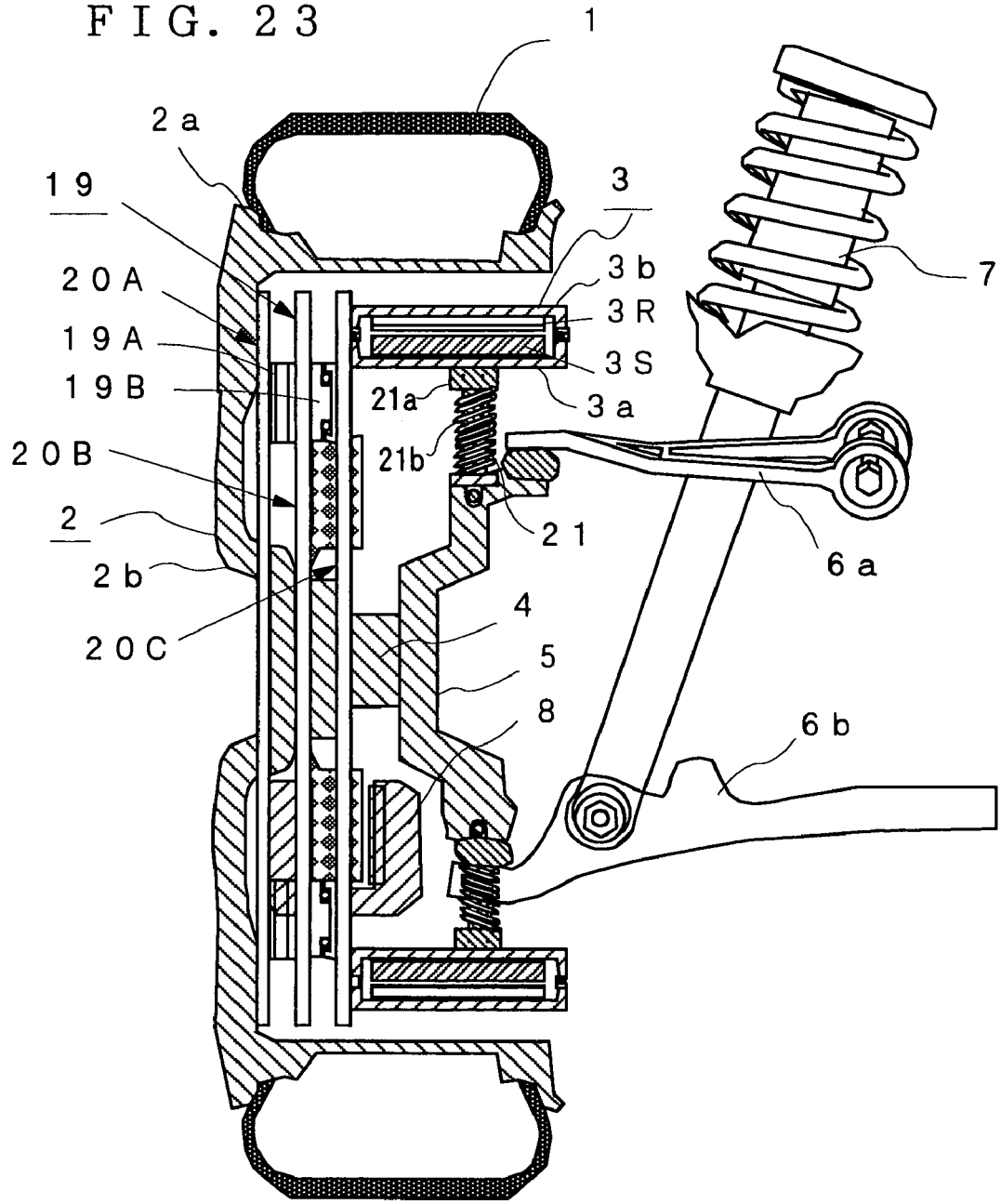
FIG. 23 is a longitudinal sectional view showing the constitution of an inwheel motor system according to Embodiment 4 of the present invention.
Figure 24:
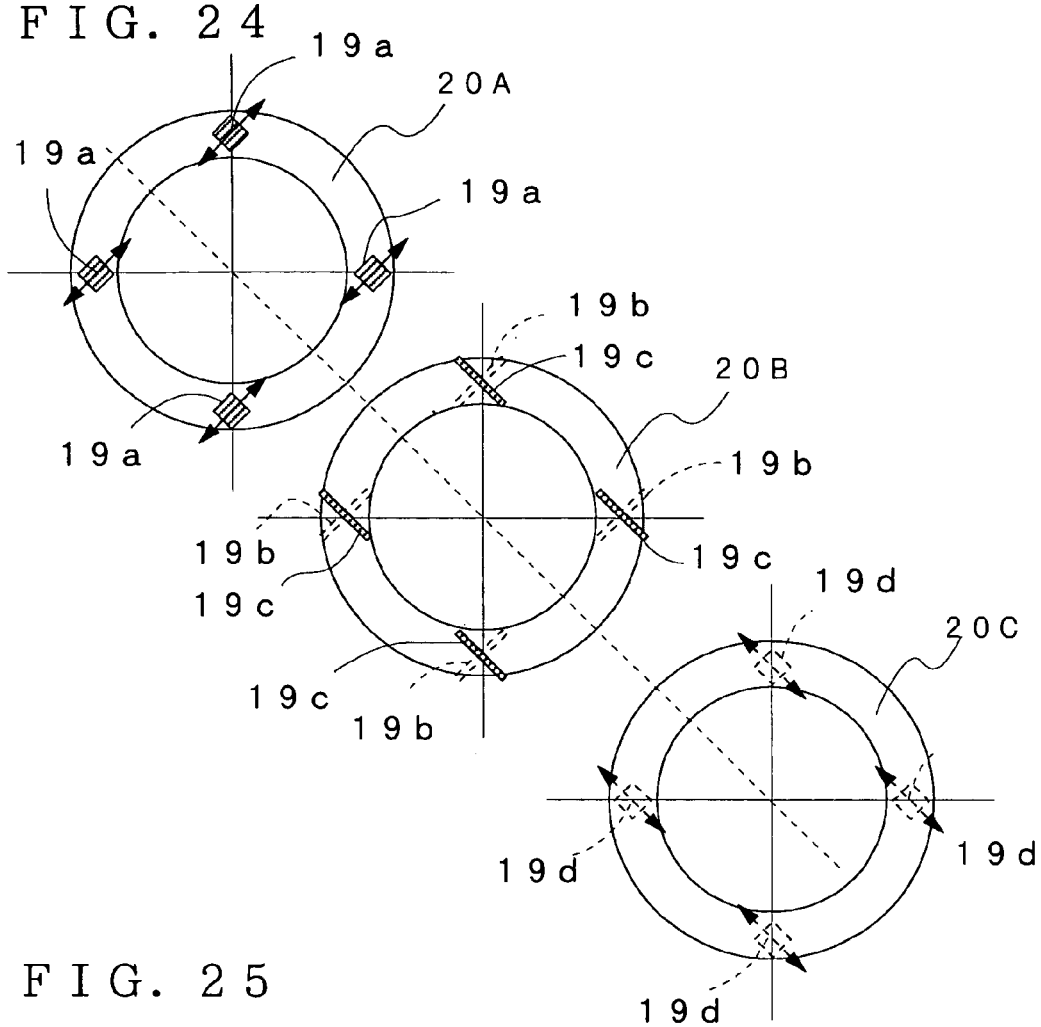
FIG. 24 is a diagram showing the constitution of a flexible coupling according to Embodiment 4 of the present invention.

In the above Embodiment 3, the flexible coupling 18 which comprises hollow disk-like plates 18A to 18C having direct-acting guides 18p and 18q on front and back sides disposed in crossing directions is used as the driving force transmitting unit for interconnecting the rotary case 3b and the wheel 2. A flexible coupling 19, which comprises (1) a hollow disk-like plate 20A located on the wheel 2 side and connected to the wheel 2, (2) a hollow disk-like plate 20C located on the motor 3 side and connected to the rotary case 3b of the motor 3, and (3) a hollow disk-like plate 20B having a plurality of direct-acting guides 19A and 19B at the same positions on the front and back sides of the motor 3 side plate and the wheel 2 side plate at intervals of 90° or 180° in the circumferential direction of the plates and connected to the above hollow disk-like plate 20A by the direct-acting guide 19A and to the above hollow disk-like plate 20C by the direct-acting guide 19B as shown in FIG. 23 and FIG. 24, may be used to interconnect the rotary case 3b and the wheel 2. Thereby, compression and tensile force generated in the circumferential direction of the plates are canceled each other to enable the elimination of an offset in the circumferential direction, the transmission of driving torque from the inwheel motor 3 to the wheel 2 with more certainty and the improvement of the durability of the driving force transmitting unit.

In this embodiment, the working direction of the direct-acting guide 19B located on the motor 3 side is 45° from the radial direction of the hollow disk-like plates 20A to 20C and the working direction of the direct-acting guide 19A located on the wheel 2 side is perpendicular to the working direction of the above direct-acting guide 19B.

In this embodiment, the non-rotary case 3a and the knuckle 5 are interconnected by a direct-acting guide unit 21 which comprises a direct-acting guide member 21a for guiding the above non-rotary case 3a in the vertical direction of the vehicle and a shock absorber 21b consisting of a damper and a spring member expanding and contracting in the working direction of this direct-acting guide member 21a. The non-rotary case 3a and the knuckle 5 may be interconnected by a buffer member such as the direct-acting guide unit 14 having the damper 14a as shown in FIG. 7 and FIG. 8 of the above Embodiment 1. Since the rotary case 3b and the wheel 2 are interconnected by the above driving force transmission unit in this embodiment like the above Embodiments 2 and 3, the second elastic member 13 interposed between the rotary case 3b and the wheel 2 can be omitted.

A description is subsequently given of the locations of the direct-acting guides 19A and 19B.

Each of the direct-acting guides 19A consists of a guide member 19a and a guide rail 19b as shown in FIG. 24. In this embodiment, four guide members 19a having a recess extending at 45° from the radial direction are disposed at intervals of 90° in the circumferential direction of the hollow disk-like plate located on the wheel 2 side (to be referred to as "wheel-side plate" hereinafter), and four guide rails 19b having a projection to be engaged with the above guide members 19a are disposed at positions corresponding to the above guide members 19a of the intermediate hollow disk-like plate (to be referred to as "intermediate plate" hereinafter) to interconnect the wheel-side plate 20A and the intermediate plate 20B by the four direct-acting guides 19A disposed at intervals of 90°.

Each of the direct-acting guides 19B consists of a guide rail 19c and a guide member 19d. Four guide rails 19c are disposed at intervals of 90° perpendicular to the guide rails 19b of the above direct-acting guides 19A in the circumferential direction on the motor 3 side hollow disk-like plate (to be referred to as "motor-side plate" hereinafter) side of the intermediate plate 20B, and four guide members 19d are disposed at positions corresponding to the guide rails 19c in the circumferential direction of the motor-side plate 20C to interconnect the intermediate plate 20B and the motor-side plate 20C by the four direct-acting guide 19B disposed at intervals of 90°.

Figure 25:
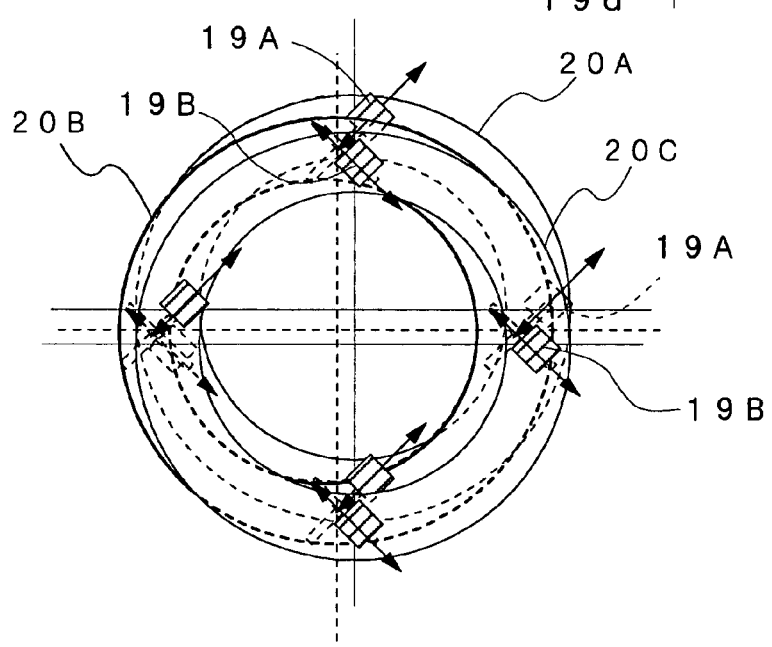
FIG. 25 is a diagram for explaining the operation of the flexible coupling according to Embodiment 4 of the present invention.

In the above constitution, when torque is transmitted from the rotary case 3b of the inwheel motor 3 to the wheel-side plate 20A connected to the wheel 2 through the motor-side plate 20C, the above direct-acting guides 19A and 19B are disposed at 45° from the axial direction of the hollow disk-like plates 20A to 20C. Therefore, as shown in FIG. 25, circumferential-direction rotating force and radial-direction expanding force are applied to the above intermediate plate 20B. However, since the direct-acting guides 19A which move in a direction perpendicular to the working direction of the direct-acting guides 19B are disposed on the back side (wheel 2 side) of the direct-acting guides 19B of the above intermediate plate 20B, that is, at the same positions as the above direct-acting guides 19B, force for expanding the above intermediate plate 20B in the radial direction is balanced with the radial-direction expanding force of the above direct-acting guides 19A with the result that only torque is transmitted to the wheel-side plate 20A and to the wheel 2. Therefore, as torque input into the direct-acting guides 19B from the motor-side plate 20C connected to the rotary case 3b is transmitted to the wheel-side plate 20A through the above intermediate plate 20B therebetween, the driving force of the above motor 3 can be transmitted to the wheel 2 without fail.

Since the working directions of the above direct-acting guides 19A and 19B are the same, compression and tensile stress are not generated in the hollow disk-like plates 19A to 19C at the same time and only force for expanding or contracting all of them in the radial direction is applied to them. Compression and tensile stress are not generated in the direct-acting guides 19B at the same time as the working direction of all the direct-acting guides 19B is perpendicular to the working direction of the above direct-acting guides 19A. Since the above expansion or compression force is transmitted from the both sides of the guide rails 19b and 19c sandwiching the intermediate plate 19B, there is no offset of a load in the circumferential direction of the intermediate disk plate 20B, thereby reducing the risk of buckling.

Embodiment 5

Figure 26:
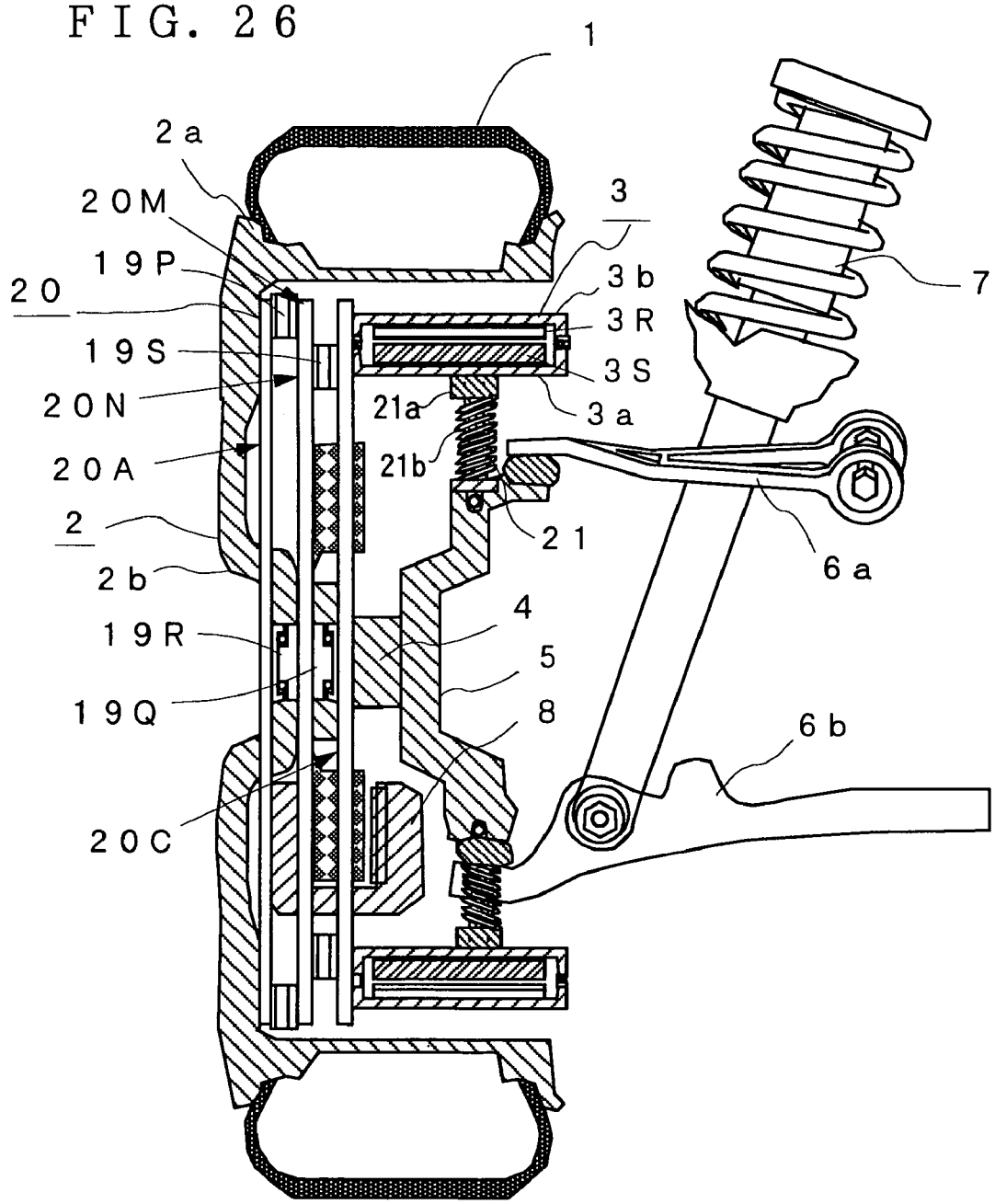
FIG. 26 is a longitudinal sectional view showing the constitution of an inwheel motor system according to Embodiment 5 of the present invention.
Figure 27:
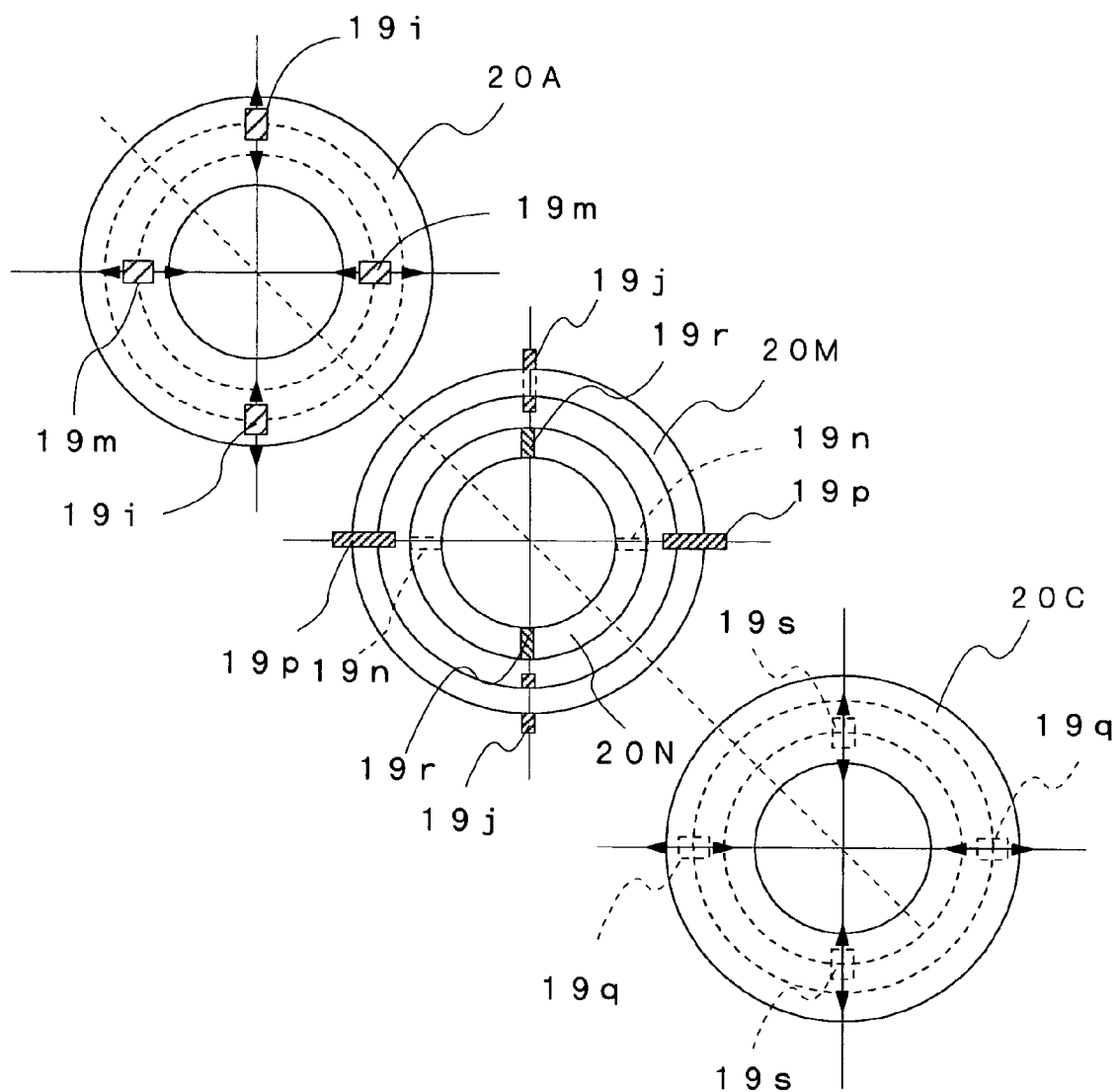
FIG. 27 is a diagram showing the constitution of a flexible coupling according to Embodiment 5 of the present invention.

A flexible coupling 20 as shown in FIG. 26 and FIG. 27, which comprises (1) a hollow disk-like plate (wheel-side plate) 20A located on the wheel side and connected to the wheel 2, (2) a hollow disk-like plate (motor-side plate) 20C located on the motor side and connected to the rotary case 3b of the motor 3, (3) a first hollow disk intermediate plate 20M having a plurality of direct-acting guides 19P and 19Q at the same positions on the front and back sides of the motor 3 side plate and the wheel 2 side plate at intervals of 90° or 180° in the circumferential direction of the plates and connected to the above wheel-side plate 20A by the direct-acting guides 19P and to the above motor-side plate 20C by the direct-acting guides 19Q, and (4) a second hollow disk intermediate plate 20N arranged on the inner side of the first intermediate plate 20M, having a plurality of direct-acting guides 19R and 19S arranged in an opposite way to that of the first intermediate plate 20M and connected to the above wheel-side plate 20A by the direct-acting guides 19R and to the above motor-side plate 20C by the direct-acting guides 19S, may be used in place of the flexible coupling 18 of the above Embodiment 3 to interconnect the rotary case 3b and the wheel 2. Thereby, vibration caused by the eccentric rotation of the above plates can be reduced, and driving torque can be transmitted from the inwheel motor 3 to the wheel 2 without fail.

In this embodiment, like the above Embodiment 4, the non-rotary case 3a and the knuckle 5 are interconnected by the direct-acting guide unit 21 which comprises the direct-acting guide member 21a for guiding the non-rotary case 3a in the vertical direction of the vehicle and the shock absorber 21b consisting of a damper and a spring member expanding and contracting in the working direction of the direct-acting guide member 21a.

The locations of the above direct-acting guides 19P and 19Q and the direct-acting guides 19R and 19S will be described hereinunder.

The direct-acting guide 19P consists of guide members 19i and guide rails 19j as shown in FIG. 27. In this embodiment, the direct-acting guide 19P consists of (1) two guide members 19i and 19i having a recess extending in the radial direction of the above first intermediate plate 20M and disposed on the first intermediate plate 20M side of the wheel-side plate 20A located on the wheel 2 side at an interval of 180° in the circumferential direction and (2) two guide rails 19j and 19j having a projection to be engaged with the above guide members 19i and 19i and disposed at positions corresponding to the above guide members 19i and 19i in the circumferential direction on the wheel-side plate 20A side of the first intermediate plate 20M. This direct-acting guide 19P guides the wheel-side plate 20A and the first intermediate plate 20M in the radial direction of the plates.

The direct-acting guide 19Q consists of (1) two guide rails 19p and 19p provided on the motor-side plate 20C side of the first intermediate plate 20M at an interval of 180° at positions 90° from the above guide rails 19*j* and 19*j* in the circumferential direction and (2) two guide members 19*q* and 19*q* disposed at positions corresponding to the above guide rails 19*p* and 19*p* in the circumferential direction of the motor-side plate 20C. This direct-acting guide 19Q guides the motor-side plate 20C and the first intermediate plate 20M in the radial direction of the disk.

Meanwhile, the direct-acting guide 19R consists of two guide members 19*m* and 19*m* having a recess extending in the radial direction of the above wheel-side plate 20A and disposed on the inner side in the radial direction of the above guide members 19*i* and 19*i* at an interval of 180° at positions 90° from the above guide members 19*i* and 19*i* in the circumferential direction, and two guide rails 19*n* and 19*n* having a projection to be engaged with the above guide members 19*m* and 19*m* and disposed on the wheel-side plate 20A side of the second intermediate plate 20N at positions corresponding to the above guide members 19*m* and 19*m* in the circumferential direction. The direct-acting guide 19S consists of two guide rails 19*r* and 19*r* disposed at an interval of 180° at positions 90° from the above guide rails 19*n* and 19*n* in the circumferential direction on the motor-side plate 20C side of the second intermediate plate 20N and two guide members 19*s* and 19*s* having a recess to be engaged with the above guide rails 19*r* and 19*r* and disposed at positions corresponding to the above guide rails 19*r* and 19*r* in the circumferential direction of the motor-side plate 20C.

Owing to the above constitution, the motor 3 turns while it is eccentric from the wheel 2 in a downward direction. Stated more specifically, motor torque is first applied to the motor-side plate 20C and this circumferential direction force applied to the motor-side plate 20C is applied to the first intermediate plate 20M through the direct-acting guide 19Q and further to the second intermediate plate 20N through the direct-acting guide 19S which operates in a direction perpendicular to the above direct-acting guide 19Q.

The circumferential direction force applied to the above first intermediate plate 20M is applied to the wheel-side plate 20A through the direct-acting guide 19P and circumferential direction force applied to the above second intermediate plate 20N is applied to the wheel-side plate 20A through the direct-acting guide 19R which operates in a direction perpendicular to the above direct-acting guide 19P.

Therefore, for example, when the motor 3 turns clockwise while it is eccentric from the wheel 2 in a downward direction as shown in FIGS. 28(*a*) to (*c*), the first intermediate plate 20M on the outer side turns clockwise from down to left and up eccentrically with the center point between the axis of the wheel-side plate 20A and the axis of the motor-side plate 20C as the center. Meanwhile, the second intermediate plate 20N on the inner side turns clockwise from up to right and down eccentrically with the center point between the axis of the wheel-side plate 20A and the axis of the motor-side plate 20C as the center.

When the mass of the above second intermediate plate 20N is made equal to the mass of the first intermediate plate 20M, the above first and second intermediate plates 20M and 20N turn eccentrically in dot-symmetrical directions as described above, whereby vibrations caused by their eccentricities are canceled each other, the motor-side plate 20C and the wheel-side plate 20A become eccentric from each other only in the vertical direction and not the longitudinal direction. Therefore, vibrations caused by the eccentric rotations of the hollow disk-like plates (plates 20A, 20M, 20N, 20C) can be reduced and driving force can be transmitted to the wheel 2 without fail.

Figure 29:
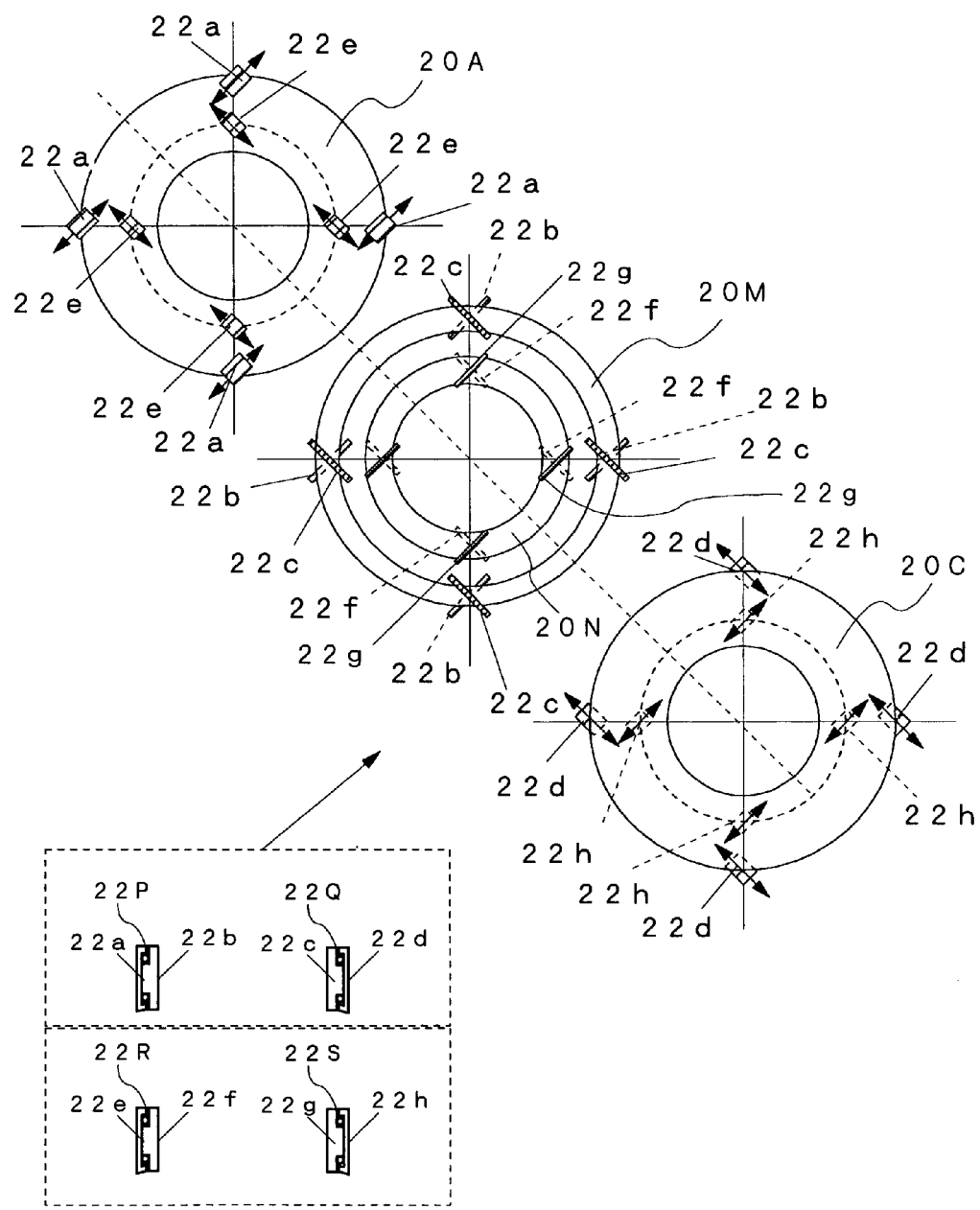
FIG. 29 is a diagram of another flexible coupling according to the present invention.

When direct-acting guides 22P and 22Q and direct-acting guides 22R and 22S whose working directions are 45° from the radial directions of the plates 20A, 20M, 20N and 20C are mounted at the same positions on the front and back sides of the above first and second intermediate plates 20M and 20N in place of the above direct-acting guides 19P and 19Q and the direct-acting guides 19R and 19S as shown in FIG. 29, compression and tensile stress are not generated in the above hollow disk-like plates 20A, 20M, 20N and 20C at the same time like the above Embodiment 4, only force for expanding or compressing the whole in the radial direction is applied, and the working directions of the direct-acting guides 22Q and 22S are perpendicular to the working directions of the above direct-acting guides 22P and 22R, thereby making it possible to prevent compression and tensile stress from being generated at the same time. Therefore, there is no offset of load in the circumferential directions of the above first and second intermediate plates 20M and 20N, the risk of buckling is reduced, and the durability of the driving force transmission unit can be improved.

The direct-acting guide 22P consists of a guide member 22*a* and a guide rail 22*b*, the direct-acting guide 22Q consists of a guide rail 22*c* and a guide member 22*d*, the direct-acting guide 22R consists of a guide member 22*e* and a guide rail 22*f*, and the direct-acting guide 22S consists of a guide rail 22*g* and a guide member 22*h*. The guide members 22*a* and the guide members 22*e* are provided on the wheel-side plate 20A like the above Embodiment 4. The guide rails 22*b* are provided on the wheel-side plate 20A side of the first intermediate plate 20M, the guide rails 22*c* on the motor-side plate 20C side of the first intermediate plate 20M, the guide rails 22*f* on the wheel-side plate 20A side of the second intermediate plate 20N, the guide rails 22*g* on the motor-side plate 20C side of the second intermediate plate 20N, and the guide members 22*d* and the guide members 22*h* on the wheel-side plate 20C.

Embodiment 6

Figure 30:
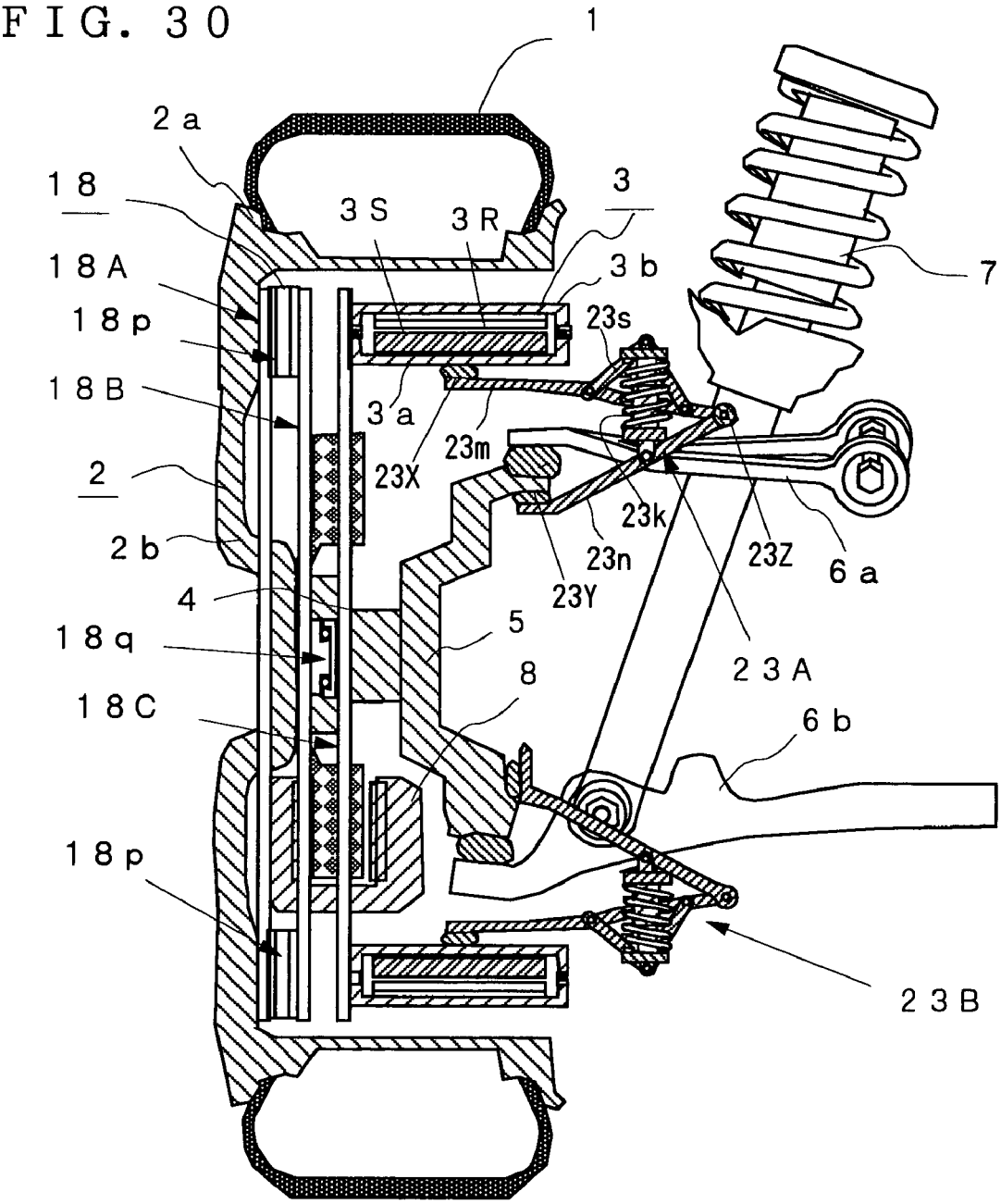
FIG. 30 is a longitudinal sectional view showing the constitution of an inwheel motor system according to Embodiment 6 of the present invention.

In the above Embodiments 1 to 5, the non-rotary case 3*a* of the inwheel motor 3 and the knuckle 5 which is a part around the wheel of the vehicle are interconnected by a buffer member such as the first elastic member 11 or the direct-acting guide unit 21 which comprises the direct-acting guide member 21*a* and the shock absorber 21*b* consisting of a spring member expanding and contracting in the working direction of the direct-acting guide member 21 and the damper. By interconnecting the non-rotary case 3*a* and the knuckle 5 by buffer units 23A and 23B having one end connected to the knuckle 5 and the other end supporting the motor 3 as shown in FIG. 30, TCFF can be further reduced.

In this embodiment, the rotary case 3*b* and the wheel 2 are interconnected by the flexible coupling 18 used in the above Embodiment 3. However, the driving force transmission unit such as the constant-velocity universal joint 16 of the above Embodiment 2 or the flexible coupling 19 or 20 of the above Embodiment 5 or 6 may be used to interconnect these.

The above buffer units 23A and 23B may be substantially A-shaped or H-shaped link units, each comprising two arms 23*m* and 23*n* which are interconnected rotatably by a buffer member 23*k* consisting of a spring and/or a damper at a junction 23Z. In this embodiment, one end of the buffer member 23*k* is fixed to an attachment member 23*s* attached to the above arm 23*m* and the other end is directly attached to the above arm 23*n*. Both ends of the buffer member 23*k* may be directly attached to the arms 23*m* and 23*n*, respectively.

To connect the above buffer units 23A and 23B to the non-rotary case 3a of the inwheel motor 3 and the knuckle 5, the end portions 23X of the arms 23m of the above buffer units 23A and 23B are attached to the non-rotary case 3a of the above motor 3 and the end portions 23Y of the other arms 23n are attached to the knuckle 5. At this point, the above buffer units 23A and 23B are attached such that the expansion or contraction direction of the above buffer member 23k becomes the vertical direction of the vehicle. Since the changing direction of the connection point 23X with the non-rotary case 3a of the above arm 23m and the changing direction of the connection point 23Y with the knuckle 5 of the above arm 23n are thereby limited to the expansion or contraction direction of the above buffer member 23k comprising a spring or damper, the non-rotary case 3a and the knuckle 5 can be interconnected in such a manner that they can move in the vertical direction of the motor 3.

That is, in this embodiment, the rotary case 3b for fixing the rotor 3R of the inwheel motor 3 and the wheel 2 are interconnected by the flexible coupling 18 (or the flexible coupling 19 or 20), and the non-rotary case 3a for fixing the stator 3S is fixed to the knuckle 5 which is a part around the wheel of the vehicle in the rotation direction and elastically supported in the vertical direction. Therefore, torque transmission efficiency from the rotary case 3b to the wheel 2 can be improved, TCFF can be further reduced, and the road holding properties of the vehicle can be enhanced.

Embodiment 7

Figure 31:
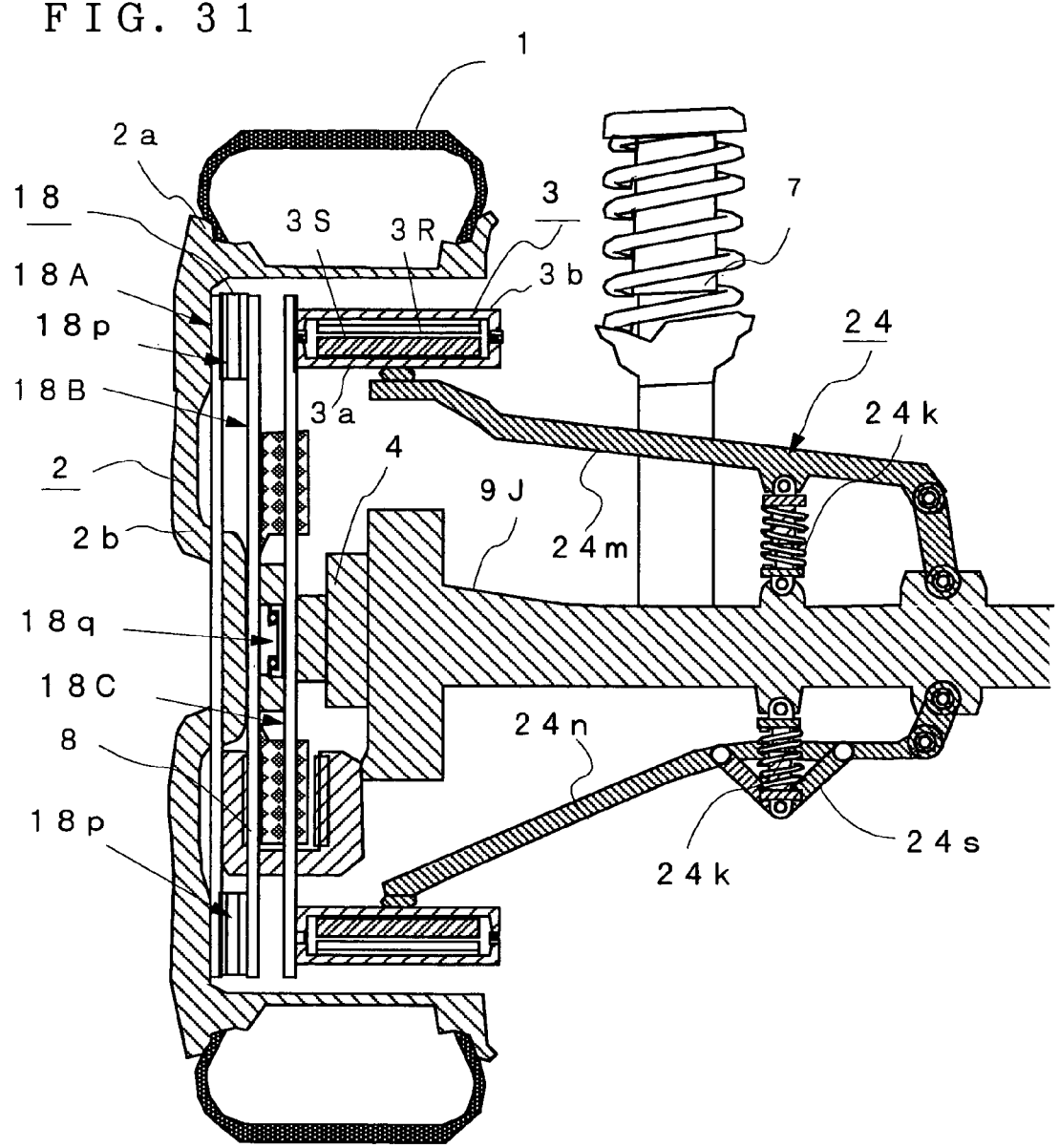
FIG. 31 is a longitudinal sectional view showing the constitution of an inwheel motor system according to Embodiment 7 of the present invention.

In the above Embodiment 6, the buffer units 23A and 23B which are substantially A-shaped or H-shaped link units, each comprising two arms 23m and 23n interconnected by the buffer member 23k, are used to interconnect the non-rotary case 3a of the inwheel motor 3 and the knuckle 5 which is a part around the wheel of the vehicle. When a vehicle equipped with the inwheel motor 3 has a shaft type suspension unit, as shown in FIG. 31, a buffer unit 24 similar in construction to the above buffer units 23A and 23B is used to interconnect the non-rotary case 3a and a shaft 9J, thereby making it possible to reduce TCFF.

The above buffer unit 24 is a substantially H-shaped or A-shaped link unit which comprises two arms 24m and 24n rotatably connected to the shaft 9J by buffer members 24k consisting of a spring or damper. In this embodiment, the two arms 24m and 24n are rotatably connected to the shaft 9J by the two buffer members 24k and 24k having one end connected to the shaft 9J so that the expansion or contraction direction becomes the vertical direction of the vehicle. The above buffer members 24k and 24k may be attached to the arms 24m and 24n by an attachment member 24s or directly.

Thereby, even in the vehicle having a shaft suspension unit, the non-rotary case 3a and the knuckle 5 can be interconnected such that they can move in the vertical direction of the motor 3, thereby making it possible to further reduce TCFF.

Embodiment 8

Figure 32:
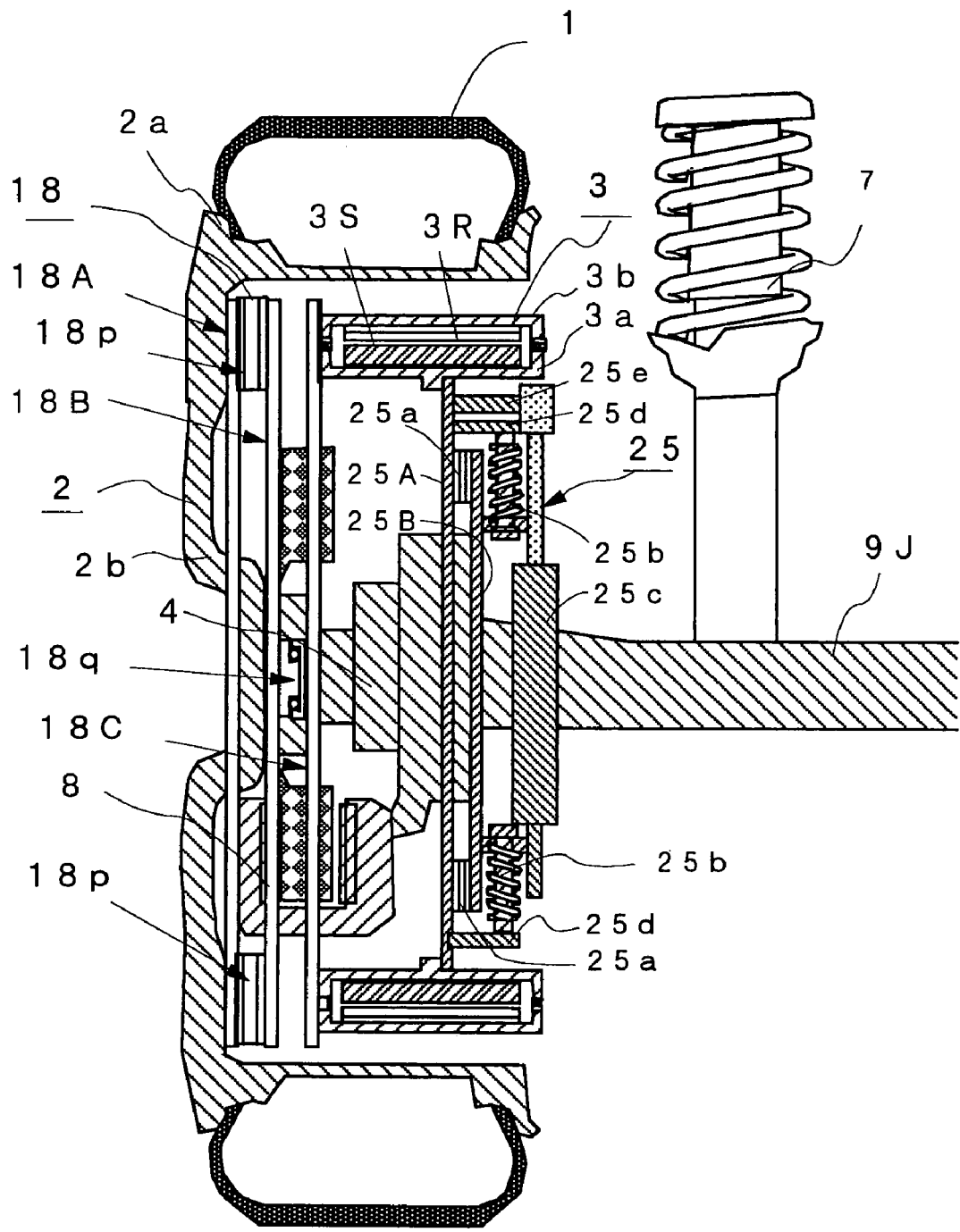
FIG. 32 is a longitudinal sectional view showing the constitution of an inwheel motor system according to Embodiment 8 of the present invention.

FIG. 32 is a diagram showing the constitution of an inwheel motor system according to Embodiment 8. In the figure, reference numeral 1 denotes a tire, 2 denotes a wheel consisting of a rim 2a and a wheel disk 2b, 3 denotes an inwheel motor of an outer rotor type, 4 denotes a hub portion connected to the above wheel 2 at its rotation axis, 5 denotes a knuckle which is a part around the wheel of a vehicle and connected to a shaft 9J, 7 denotes a suspension member composed of a shock absorber or the like, 8 denotes a brake mounted to the above hub portion 4, 18 denotes a flexible coupling shown in FIGS. 16 to 18 of the above Embodiment 3 which comprises hollow disk-like plates having a plurality of direct-acting guides on the front and back sides in such a manner that the working directions thereof are perpendicular to each other and which is used to interconnect the rotary case 3b for supporting the rotor 3R of the inwheel motor 3 and the wheel 2 in such a manner that they can be eccentric from each other in the radial direction of the wheel 2, and 25 denotes a buffer unit for elastically supporting the non-rotary case 3a which supports the stator 3S of the inwheel motor 3 to the knuckle 5 in the vertical direction of the vehicle. The rotary case 3b and the wheel 2 may be interconnected by the driving force transmission unit such as the constant-velocity universal joint 16 of the above Embodiment 2 or the flexible coupling 19 or 20 of the above Embodiment 5 or 6 in place of the above flexible coupling 18.

Figure 33:
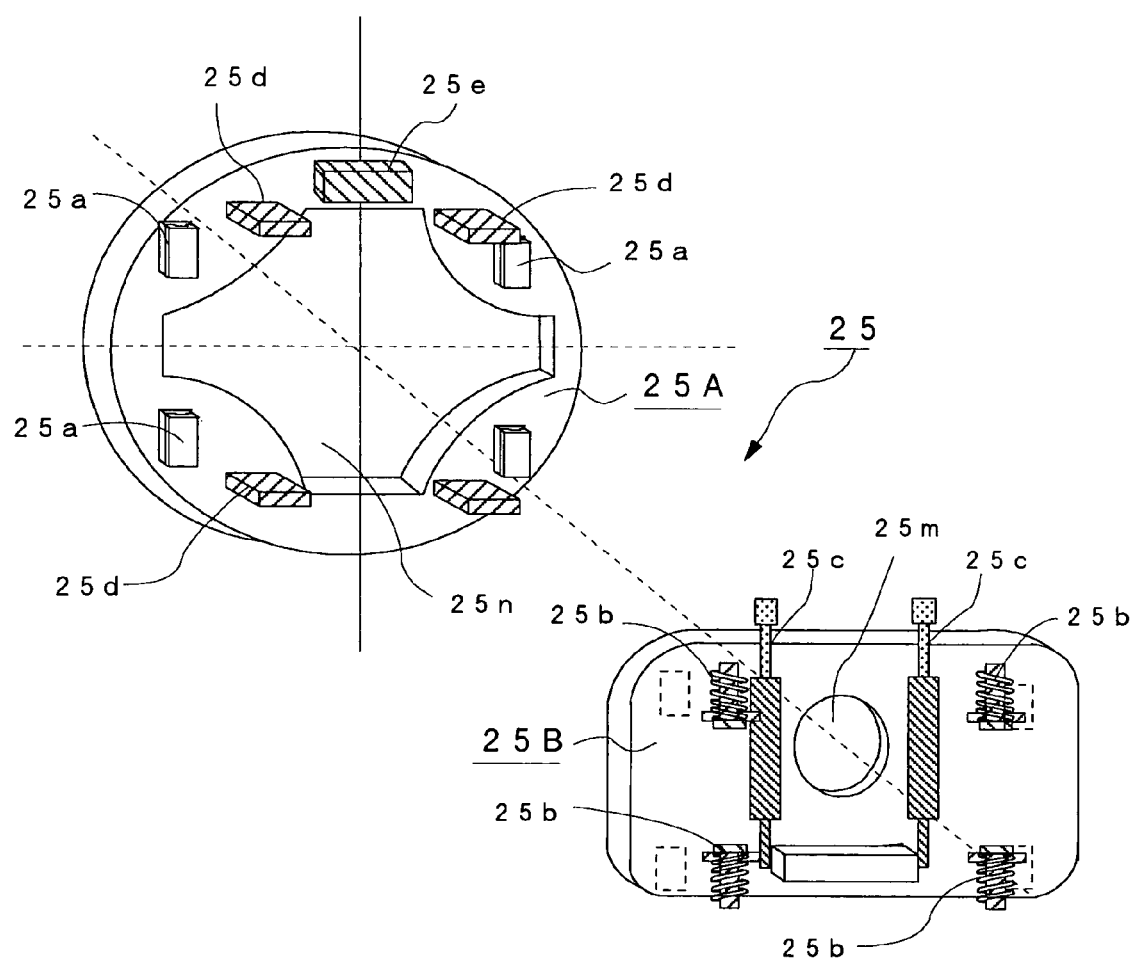
FIG. 33 is a diagram showing the constitution of a buffer unit according to Embodiment 8 of the present invention.

As shown in FIG. 33, the above buffer unit 25 comprises two plates 25A and 25B interconnected by springs 25b which operate in the vertical direction of the vehicle and whose working directions are limited to the vertical direction of the vehicle by direct-acting guides 25a and dampers 25c. In this embodiment, four springs 25b which expand and contract in the vertical direction of the vehicle are mounted at the four corners of the plate 25B located on the suspension member 7 side (to be referred to as "knuckle attachment plate" hereinafter) and connected to the shaft 9J linked to the knuckle 5, two dampers 25c which expand and contract in the vertical direction of the vehicle are provided on both sides of a connection hole 25m for the shaft 9J formed in the center portion thereof, spring receiving portions 25d are provided at respective positions corresponding to the top and bottom portions of the above springs 25b of the plate 25A located on the motor 3 side (to be referred to as "motor attachment plate" hereinafter), a damper attachment portion 25e is provided at a position corresponding to the top portion of the above dampers 25c, that is, above a connection hole 25n for the shaft 9J, and the above plates 25A and 25B are interconnected by the four direct-acting guides 25a symmetrical about the center of the plate.

Since the above motor attachment plate 25A and the knuckle attachment plate 25B are guided in the vertical direction of the vehicle by the above four direct-acting guides 25a and interconnected by the springs 25b and the dampers 25c, they can confine the inwheel motor 3 in the vertical movement direction while they generate attenuation force.

In this Embodiment 8, as the rotary case 3b for fixing the rotor 3R of the inwheel motor 3 and the wheel 2 are interconnected by the flexible coupling 18, and the non-rotary case 3a for supporting the stator 3S is connected in such a manner that it is fixed in the rotation direction of the wheel 2 (or the shaft 9J) and it can move in the vertical direction of the vehicle, torque transmission efficiency from the rotary case 3b to the wheel 2 can be improved, TCFF can be reduced, and the road holding properties of the vehicle can be improved.

Embodiment 9

Figure 34:
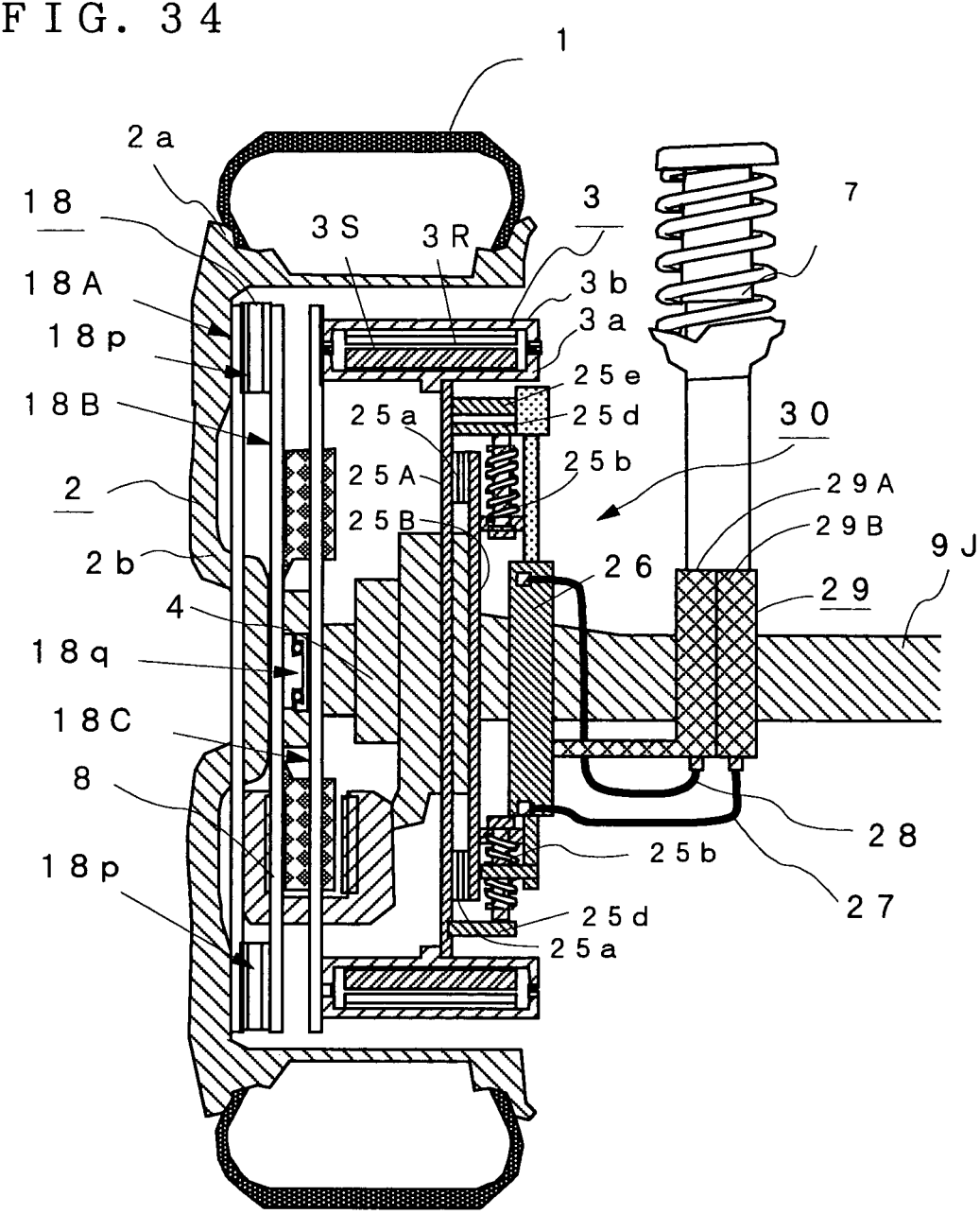
FIG. 34 is a longitudinal sectional view showing the constitution of an inwheel motor system according to Embodiment 9 of the present invention.
Figure 35:
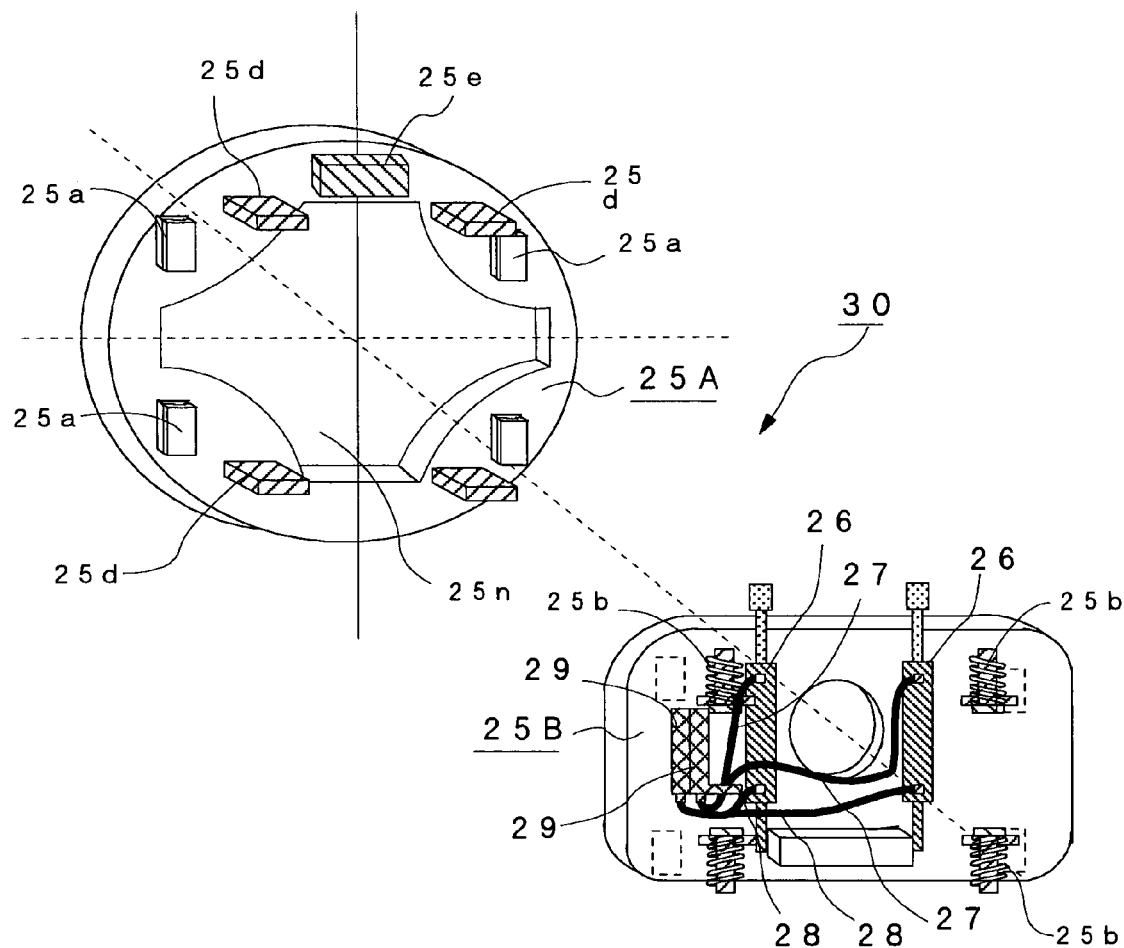
FIG. 35 is a diagram showing the constitution of a buffer unit comprising a hydraulic cylinder according to Embodiment 9 of the present invention.

In the above Embodiment 8, the plates 25A and 25B are interconnected by the direct-acting guides 25a, springs 25b and dampers 25c. As shown in FIG. 34 and FIG. 35, the non-rotary case 3a for supporting the stator 3S can be fixed in the rotation direction of the wheel 2 (or the shaft 9J) with more certainty and connected such that it can move in the vertical direction of the vehicle by using a buffer unit 30 which comprises hydraulic cylinders 26 and reservoir tanks 29 connected to the hydraulic cylinders 26 by pressure hoses 27 and 28 in place of the above dampers 25c and 25c, thereby making it possible to further reduce TCFF.

Figure 36:
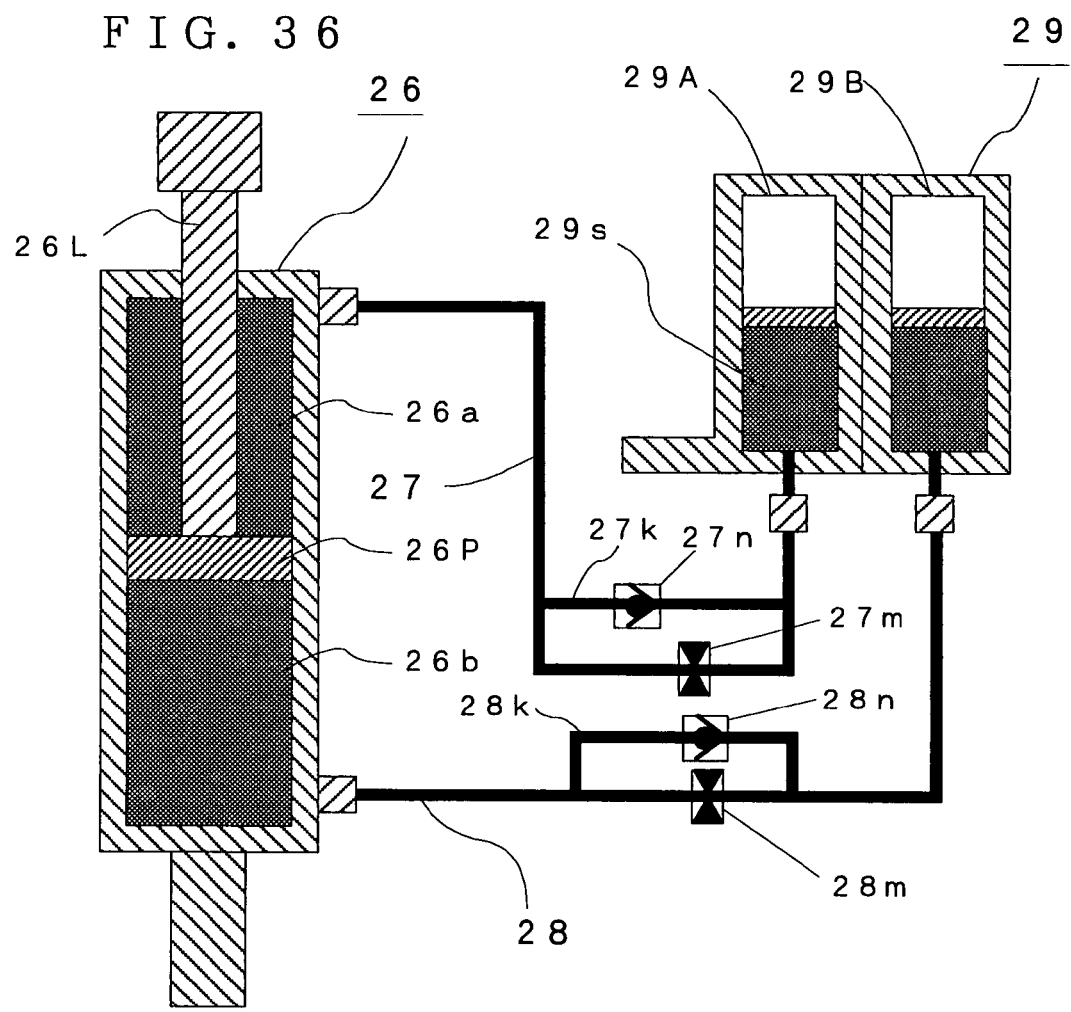
FIG. 36 is a diagram showing the details of the buffer unit comprising a hydraulic cylinder.

FIG. 36 shows the details of the above buffer unit 30 comprising hydraulic cylinders. In this embodiment, each of the above reservoir tanks 29 consists of an expansion-side reservoir tank 29A which communicates with the upper chamber 26a of the hydraulic cylinder 26 and a contraction-side reservoir tank 29B which communicates with the lower chamber 26b of the hydraulic cylinder 26, these chambers 26a and 26b are separated from each other by a piston 26P to which one end of a piston rod 26L is fixed, the upper chamber 26a of the above hydraulic cylinder 26 and the expansion-side reservoir tank 29A are interconnected through an expansion-side valve (orifice) 27m, and the lower chamber 26b and the contraction-side reservoir tank 29B are interconnected through a contraction-side valve (orifice) 28m. 27n and 28n denote an expansion-side check valve and a contraction-side check valve for preventing a backflow of working oil 29s into the hydraulic cylinder 26 from the reservoir tank 29, which are provided in oil branch lines 27k and 28k bypassing the above expansion-side valve 27m and the contraction-side valve 28m, respectively.

In this embodiment, as shown in FIG. 35, only the simple-structured hydraulic cylinders 26 are mounted on the knuckle attachment plate 25B connected to the knuckle 5 which is a part around the wheel, and the reservoir tanks 29 for securing a flow rate of working oil 29s for generating attenuation force are mounted at positions other than a position around the wheel (on the unshown car body side of the shaft 9J).

The buffer unit 30 of this embodiment has an advantage that attenuation force on the expansion side of the buffer unit and attenuation force on the contraction side of the buffer unit can be separately adjusted because the piston upper chamber 26a and the piston lower chamber 26b of the hydraulic cylinder 26 are connected to the reservoir tanks 29A and 29B by the pressure hoses 27 and 28 through the separate valves 27m and 28m, respectively.

Figure 37:
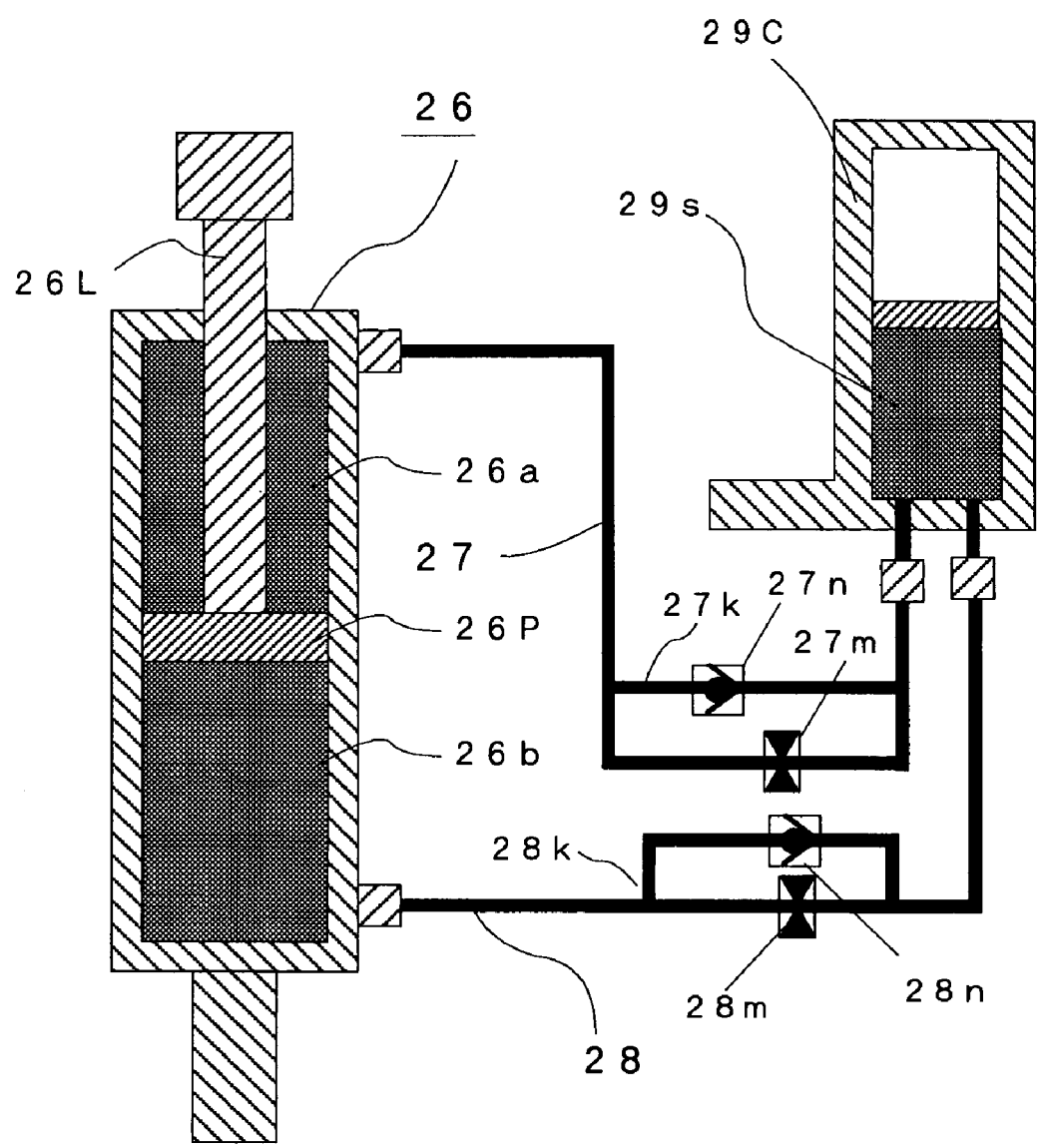
FIG. 37 is a diagram of another buffer unit comprising a hydraulic cylinder according to Embodiment 9 of the present invention.
Figure 38:
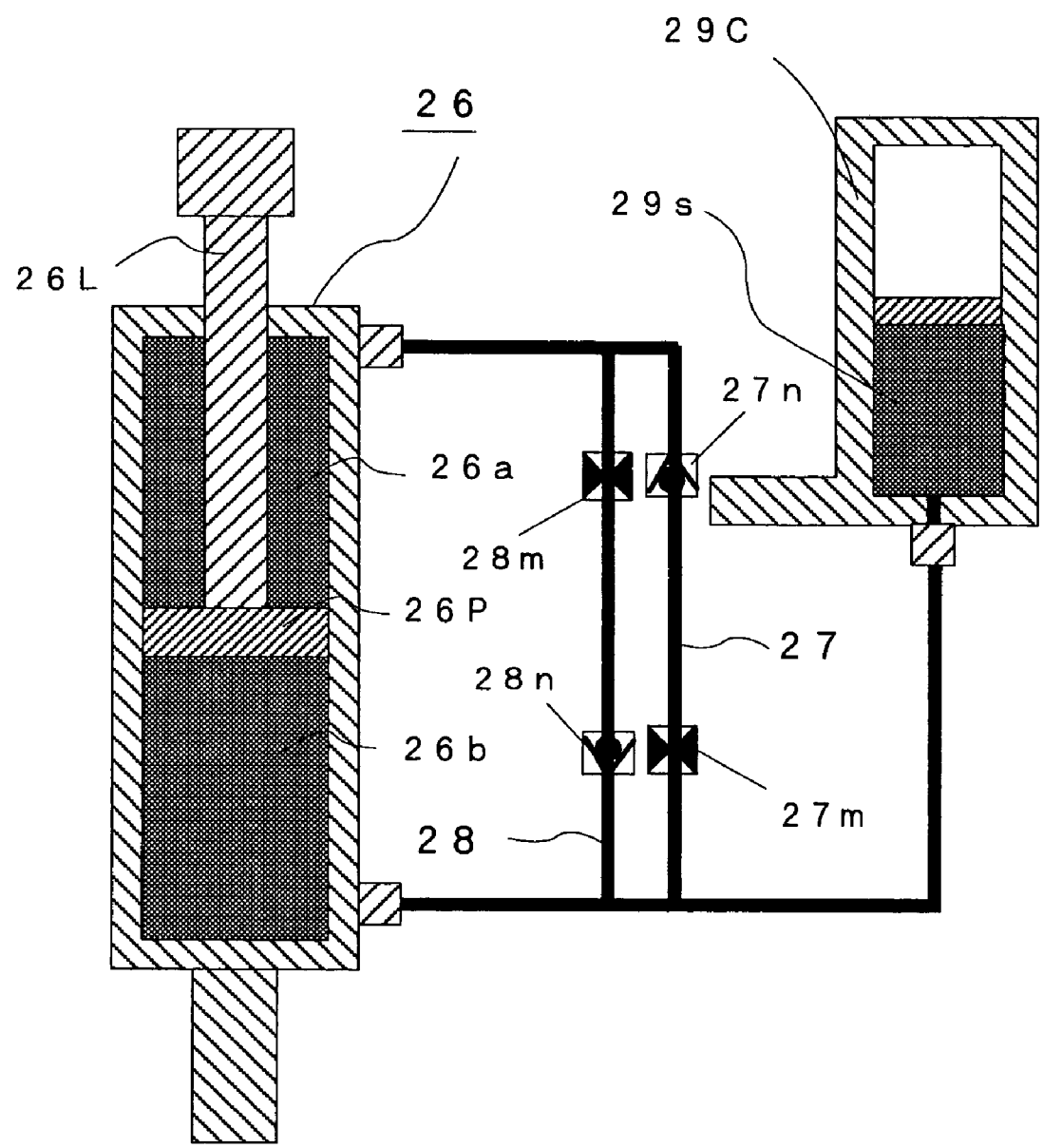
FIG. 38 is a diagram of still another buffer unit comprising a hydraulic cylinder according to Embodiment 9 of the present invention.

When the piston upper chamber 26a and the piston lower chamber 26b of the hydraulic cylinder 26 are connected to the separate valves 27m and 28m, respectively, and the both lines are connected to a common reservoir tank 29C as shown in FIG. 37, or when the piston upper chamber 26a and the piston lower chamber 26b of the hydraulic cylinder 26 are connected by the separate valves 27m and 28m, and the piston lower chamber 26b and the reservoir tank 29C are interconnected as shown in FIG. 38, the number of parts of the buffer unit 30 can be reduced and the buffer unit 30 can be reduced in size.

Embodiment 10

Figure 39:
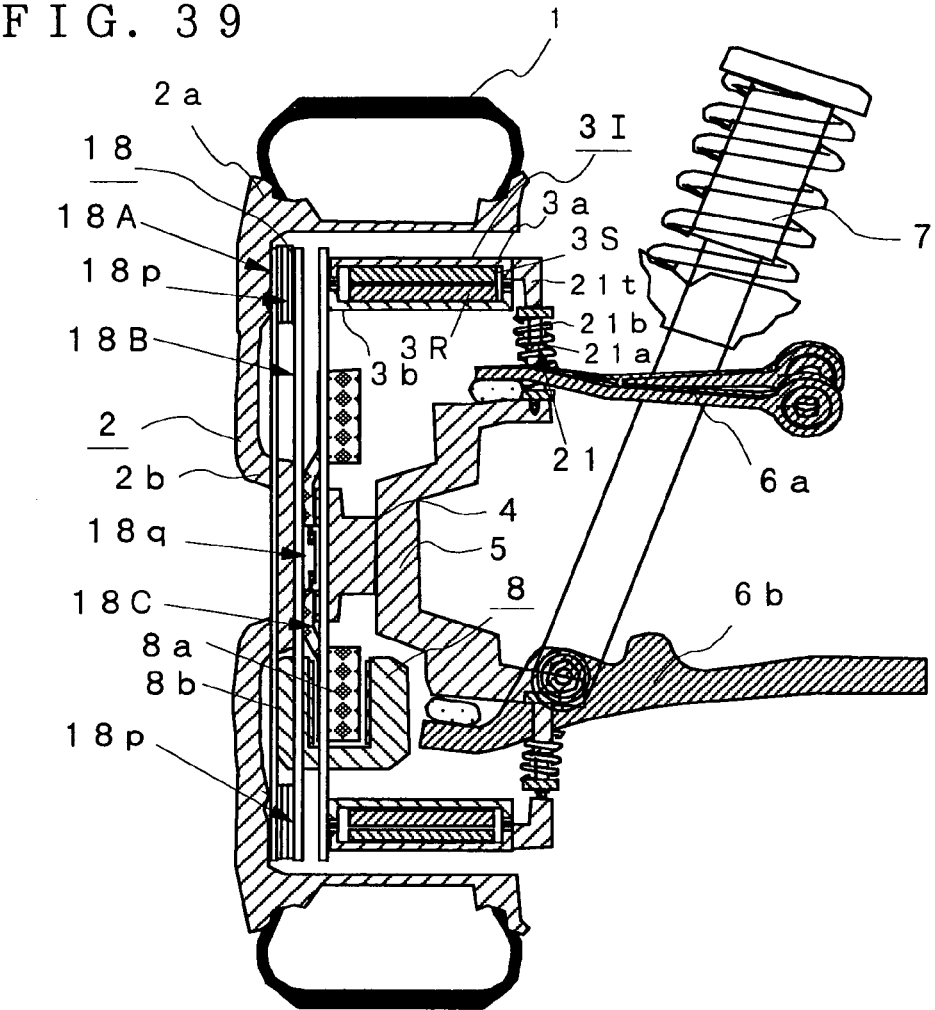
FIG. 39 is a longitudinal sectional view showing the constitution of an inwheel motor system according to Embodiment 10 of the present invention.
Figure 40:
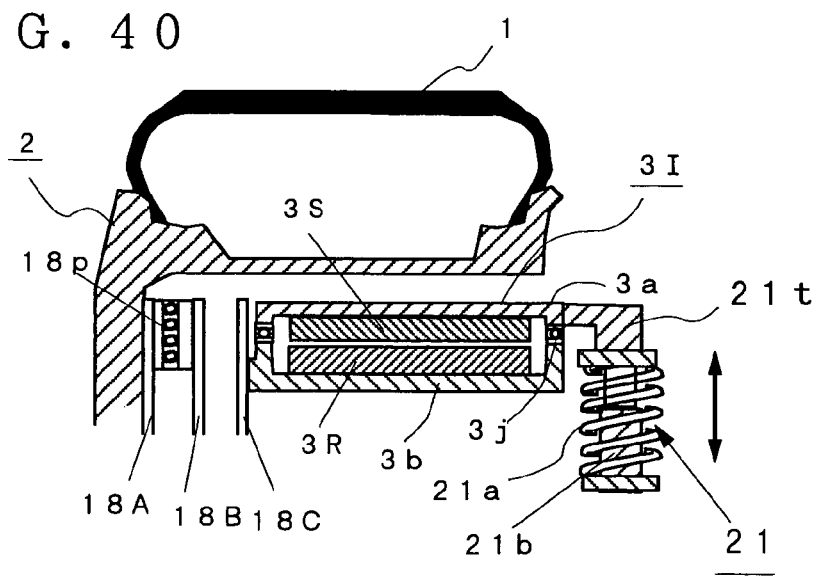
FIG. 40 is a sectional view of the key section of the inwheel motor system according to Embodiment 10 of the present invention.

FIG. 39 is a diagram showing the constitution of an inwheel motor system according to Embodiment 10 and FIG. 40 is a sectional view of its key section. In these figures, reference numeral 1 denotes a tire, 2 denotes a wheel consisting of a rim 2a and a wheel disk 2b, and 3I denotes a hollow inner rotor type motor (inwheel motor) which comprises a stator 3S fixed to a non-rotary case 3a provided on the outer side in the radial direction and a rotor 3R fixed to a rotary case 3b rotatably connected to the above non-rotary case 3a through a bearing 3j and provided on the inner side in the radial direction.

Reference numeral 4 represents a hub portion connected to the above wheel 2 at its rotation axis, 5 represents a knuckle connected to upper and lower suspension arms 6a and 6b, 7 represents a suspension member which is a shock absorber or the like, and 8 represents a brake which is a brake disk comprising a brake rotor 8a and a brake caliper 8b and mounted to the above hub portion 4.

In this embodiment, the non-rotary case 3a which is the outer case of the above inwheel motor 3I and the knuckle 5 which is a part around the wheel are interconnected by a direct-acting guide unit 21 which comprises a direct-acting guide member 21a for guiding the above non-rotary case 3a in the vertical direction of the vehicle and a shock absorber 21b consisting of a spring member expanding and contracting in the working direction of the direct-acting guide member 21a and a damper, and the rotary case 3b which is the inner case of the above motor 3I and the wheel 2 are interconnected by the flexible coupling 18 which comprises hollow disk-like plates 18A to 18C having a plurality of direct-acting guides 18p and 18q on the front and back sides so that the working directions thereof become perpendicular to each other as shown in FIGS. 16 to 18 of the above Embodiment 3. The rotary case 3b for supporting the rotor 3R of the inwheel motor 3I and the wheel 2 are interconnected by the above flexible coupling 18 in such a manner that they can be eccentric from each other in the radial direction of the wheel 2.

One end of a connection member 21t having an L-shaped section is fixed to the side opposite to the wheel 2 of the non-rotary case 3a and the other end is fixed to the upper end of the above direct-acting guide unit 21 having a lower end secured to the knuckle 5.

In this Embodiment 10, since the above non-rotary case 3a is connected to the knuckle 5 by the direct-acting guide unit 21 which comprises the direct-acting guide member 21a for guiding the above non-rotary case 3a in the vertical direction of the vehicle and the shock absorber 21b consisting of a spring member expanding and contracting in the working direction of the direct-acting guide member 21a and a damper, and the inwheel motor 3I can be float mounted to an unsprung mass corresponding portion which is a part around the wheel of the vehicle as described above, the axis of the motor and the axis of the wheel can move separately in the radial direction. Therefore, the mass of the motor is separated from the unsprung mass of the vehicle and functions as the weight of a so-called dynamic damper.

Since the weight of the dynamic damper cancels unsprung vibration at the time of running over an uneven road, TCFF is reduced with the result that the road holding properties of the vehicle are improved, vibration applied to the motor 3I can be reduced at the time of running over a bad road and accordingly, a load on the motor 3I imposed by vibration can be reduced.

Since the rotary case 3b of the inwheel motor 3I and the wheel 2 are interconnected by the flexible coupling 18, the inwheel motor 3I can move in the working direction of the direct-acting guides 18p and 18q of the flexible coupling 18, that is, the radial direction of the hollow disk-like plates 18A to 18C but not in the rotation direction because it is restricted by the above direct-acting guides 18p and 18q. Therefore, torque from the rotor 3R can be transmitted to the wheel 2 efficiently.

Although the axis of the motor and the axis of the wheel become eccentric from each other by the vibration of the motor at the time of running over a bad road, torque can be transmitted smoothly by using the above flexible coupling 18.

The transmission efficiency of driving force can be further improved by using a driving force transmission unit such as the flexible coupling 19 or 20 of the above Embodiment 4 or 5 in place of the above flexile coupling 18.

Even in the inwheel motor system of the present invention, as the mass of the vehicle is supported by the hub portion 4, a load on the body of the motor 3I is small. Therefore, since a change in the air gap between the rotor 3R and the stator 3S can be made small, the stiffness of the case can be lowered, and the weight of the motor 3 can be thereby reduced.

When the outer rotor type motor is used in the present invention, the bearing of the rotation portion on the outer race side turns. When the motor runs at a high speed, the outer race is expanded outward in the radial direction by the centrifugal force of the motor, causing the dislocation of the bearing which is not preferred in terms of durability.

Therefore, as the bearing on the inner race side turns when the inner rotor type motor whose inner side turns is used, the inner race expands in the radial direction at the time of high-speed rotation, and the dislocation of the bearing does not occur accordingly. Since the inner rotor type motor is smaller in the radius of a rotation portion than the outer rotor type motor, inertia moment can be made small and response to the operation of the accelerator can be improved, thereby making it possible to realize an inwheel motor car having excellent running stability.

EXAMPLE 1

Figure 41:
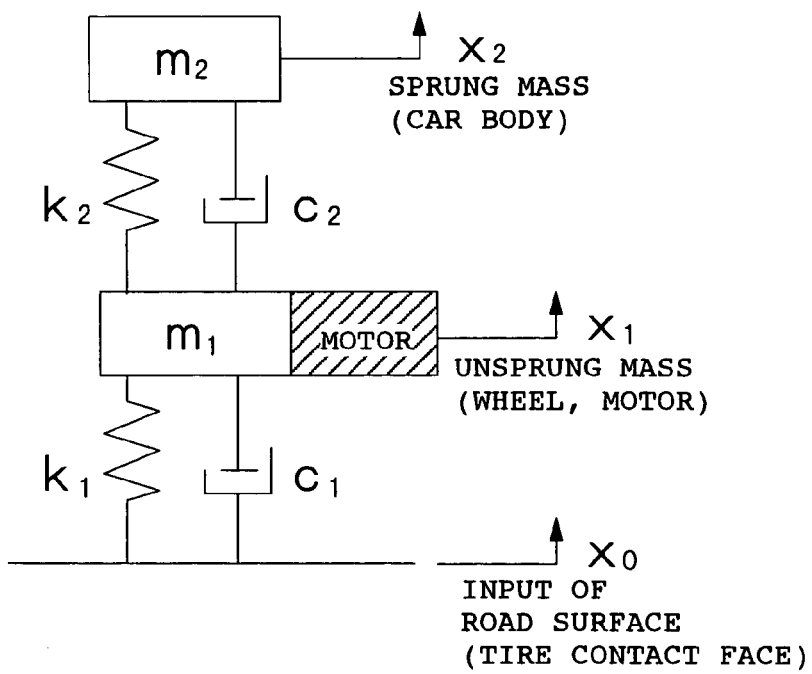
FIG. 41 is a diagram showing a car vibration model in the inwheel motor system of the prior art.
Figure 42:
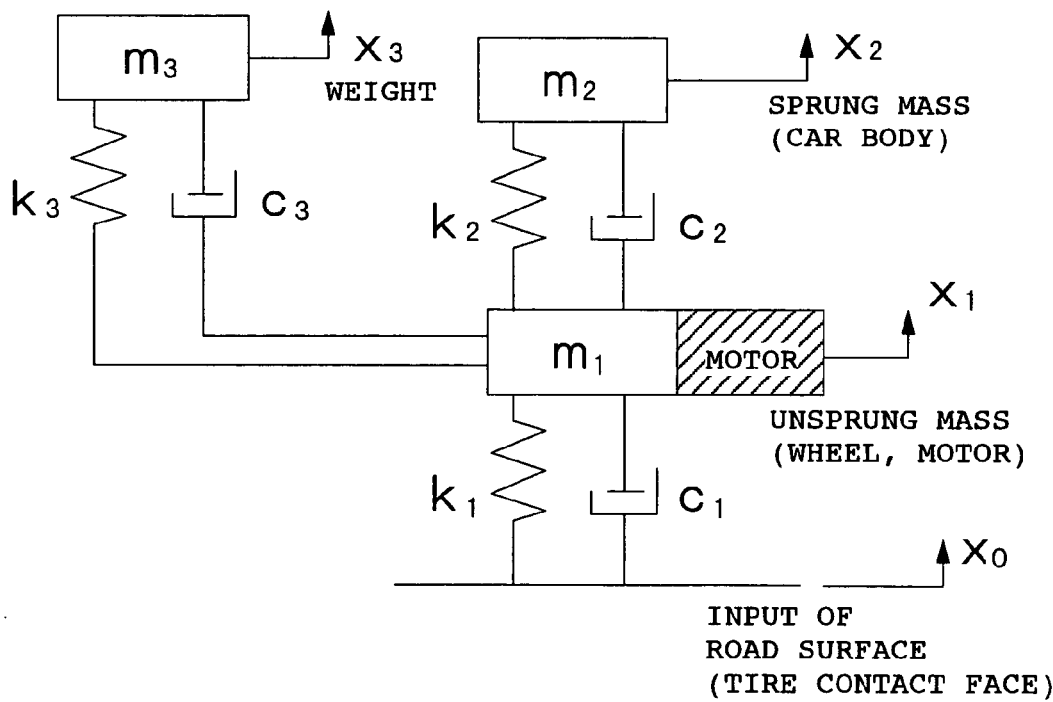
FIG. 42 is a diagram showing a car vibration model when a dynamic damper is mounted to the inwheel motor system of the prior art.
Figure 43:
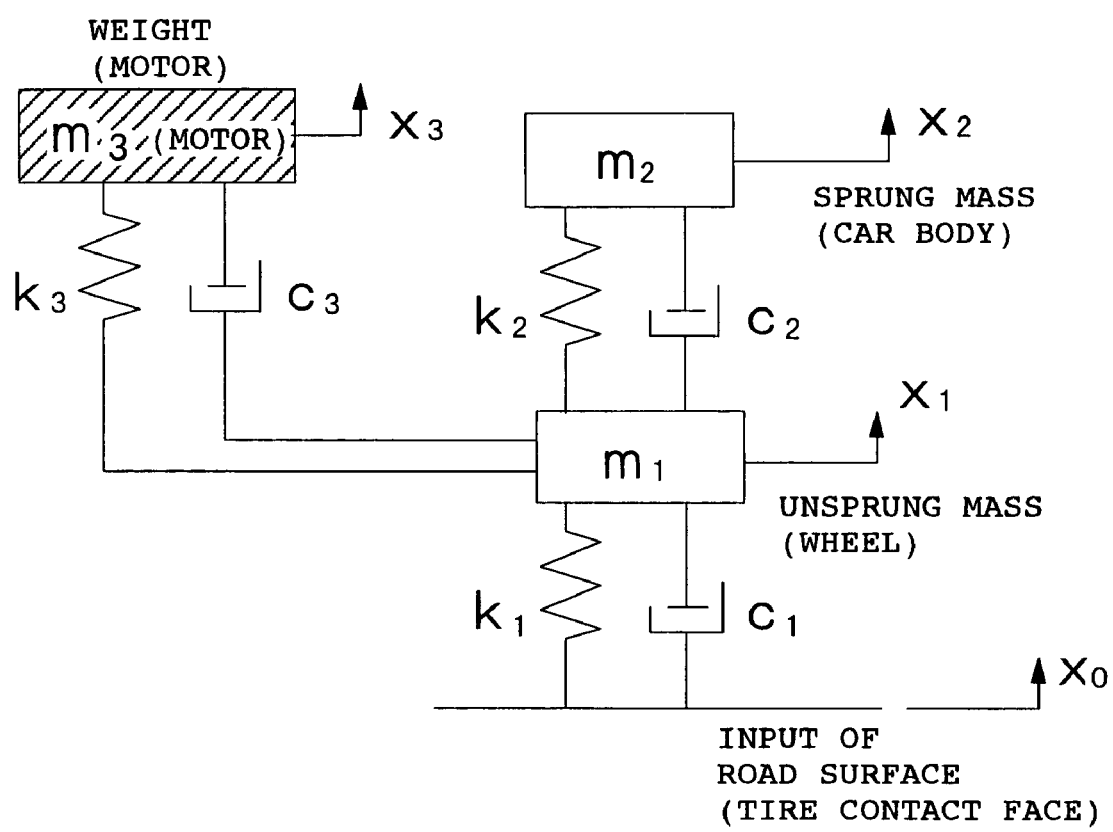
FIG. 43 is a diagram showing a car vibration model in the inwheel motor system of the present invention.
Figure 45:
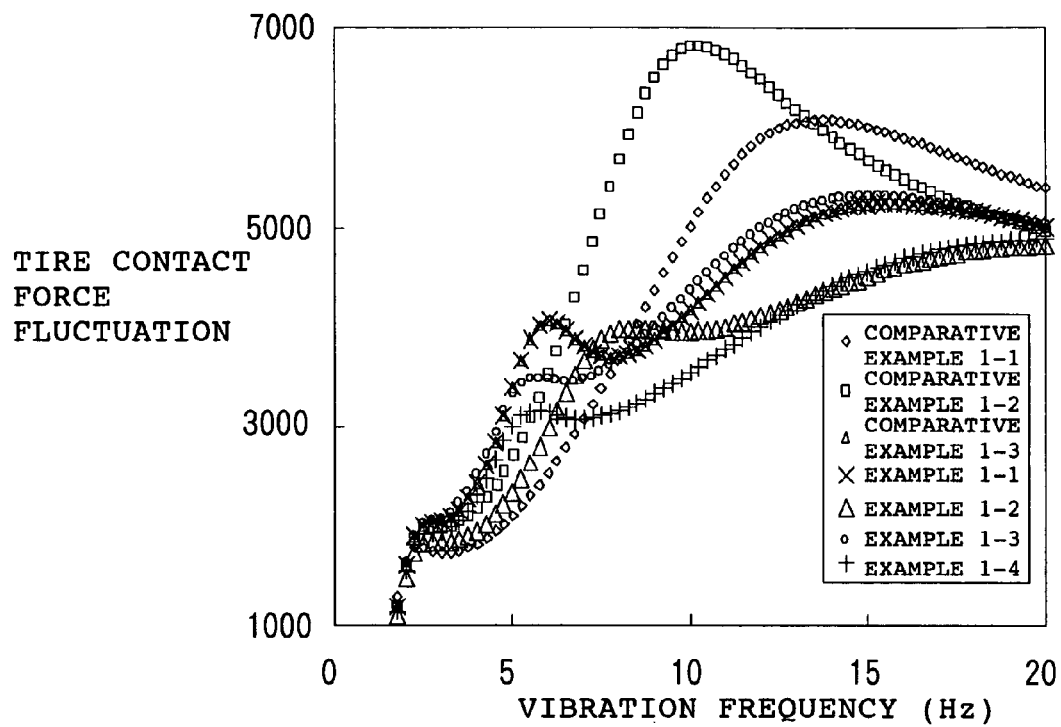
FIG. 45 is a graph showing the analytical results of car vibration models.

The vibration level of the inwheel motor system according to Embodiment 1 is analyzed based on car vibration models as shown in FIGS. 41 to 43 and the table of FIG. 44 at the time of running over an uneven road and the results of comparison with the level of TCFF in the system of the prior art are shown in the graph of FIG. 45.

In FIG. 45, the horizontal axis shows vibration frequency (Hz) and the vertical axis shows the level (N) of TCFF. Comparative Example 1-1 is a car vibration model without an inwheel motor.

Figure 46:
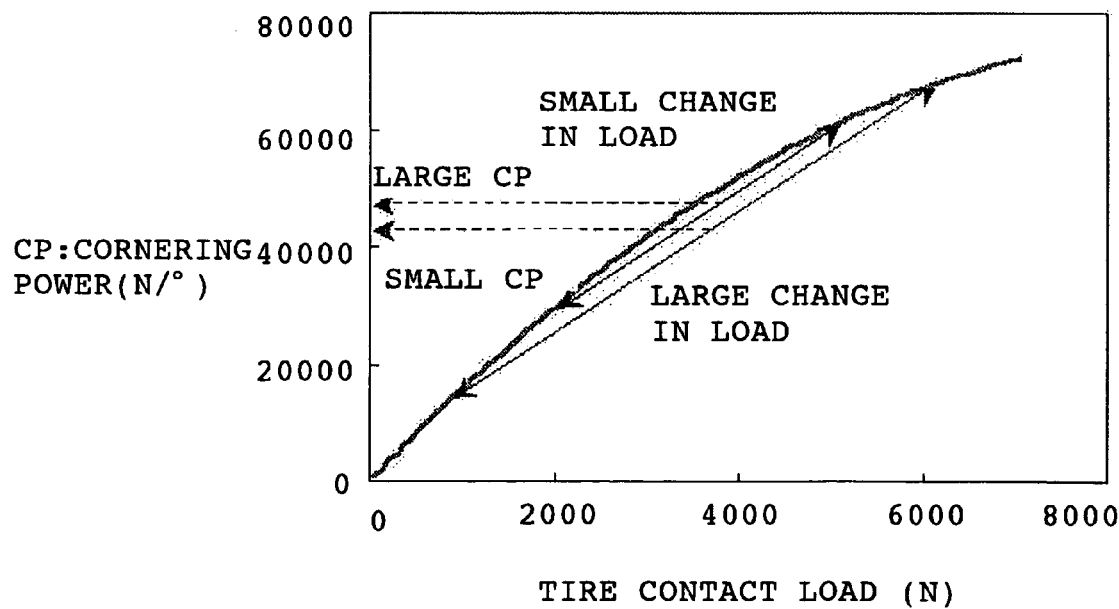
FIG. 46 is a graph showing the relationship between tire contact load and cornering power (CP)

Since the inwheel motor is directly mounted to an unsprung mass corresponding portion such as a wheel or knuckle in the system of the prior art, its car vibration model is expressed as a two-freedom vibration model as shown in FIG. 41 (Comparative Example 1-2). Describing in detail, a vibration model in which the unsprung mass $m_1$ is connected to the contact face R of the tire by an elastic member $k_1$ and a dash pot $c_1$ and in which the above unsprung mass $m_1$ and the sprung mass $m_2$ are interconnected by an elastic member $K_2$ and a dash pot $C_2$ may become a model in which the mass of the inwheel motor is added to the above unsprung mass $m_1$. When the motor is directly mounted, the level of TCFF rises due to an increase in the unsprung mass. Since the tire has a non-linear vertical load as shown in FIG. 46, if TCFF is large, capability such as the cornering power of the tire lowers and the road holding properties of the vehicle deteriorate. To maintain these at the level of the above Comparative Example 1-1, the total weight of the motor and the part around the wheel must be made equal to that of the prior art system. However, in order to greatly reduce the weight of the part around the wheel while the requirement for strength is satisfied, a serious cost rise is expected due to use of a large amount of a light alloy, which cannot be said to be practical.

Meanwhile, to reduce the level of a load change at the time of running over an uneven road without reducing the weight of the part around the wheel, there is a method called "dynamic damper". As shown in FIG. 42, this dynamic damper is represented by a three-freedom model (Comparative Example 1-3) in which new mass $m_3$ is added to the above two-freedom model shown in FIG. 41 by an elastic member $k_3$ and a dash pot $C_3$. According to this method, the level of TCFF can be lowered without reducing the weight. However, although the effect of reducing the change improves more as the weight increases in the above dynamic damper, this additional weight has a bad influence such as a weight increase on the vehicle. Therefore, the above weight cannot be increased and accordingly there is limitation to the effect of reducing the change.

In contrast to this, since the inwheel motor is connected to the part around the wheel (unsprung mass) by the elastic member, or the elastic member and the guide unit as shown in FIG. 1 and FIG. 7 or FIG. 39 in the inwheel motor system of the present invention, the car vibration model can be represented by a three-freedom model in which the weight of the dynamic damper is equivalent to the mass $m_3$ of the above inwheel motor (Example 1-1).

Therefore, as shown in the graph of FIG. 45, the change level can be reduced without increasing the weight of the vehicle excessively.

At this point, the level of TCFF can be reduced without fail by adjusting the mass $m_3$ of the inwheel motor and the elastic constant $k_3$ of the elastic member for connecting an unsprung part to ensure that the resonance frequency $f_3$ of the above mounted inwheel motor should be higher than the resonance frequency $f_2$ of sprung mass and lower than the resonance frequency $f_1$ of unsprung mass as shown in the expression below.

$$f_2 < f_3 < f_1 \qquad \text{[expression 1]}$$

$$f_1 = \frac{1}{2\pi}\sqrt{\frac{m_1}{k_1}} \quad f_2 = \frac{1}{2\pi}\sqrt{\frac{m_2}{k_2}} \quad f_3 = \frac{1}{2\pi}\sqrt{\frac{m_3}{k_3}}$$

In the above constitution, the motor and the part around the wheel can be made lightweight like Example 1-2, the elastic constant of the elastic member can be reduced like Example 1-3, and when the both are combined like Example 4, the change level can be further reduced (see the table of FIG. 44 and the graph of FIG. 46).

Embodiment 11

Figure 47:
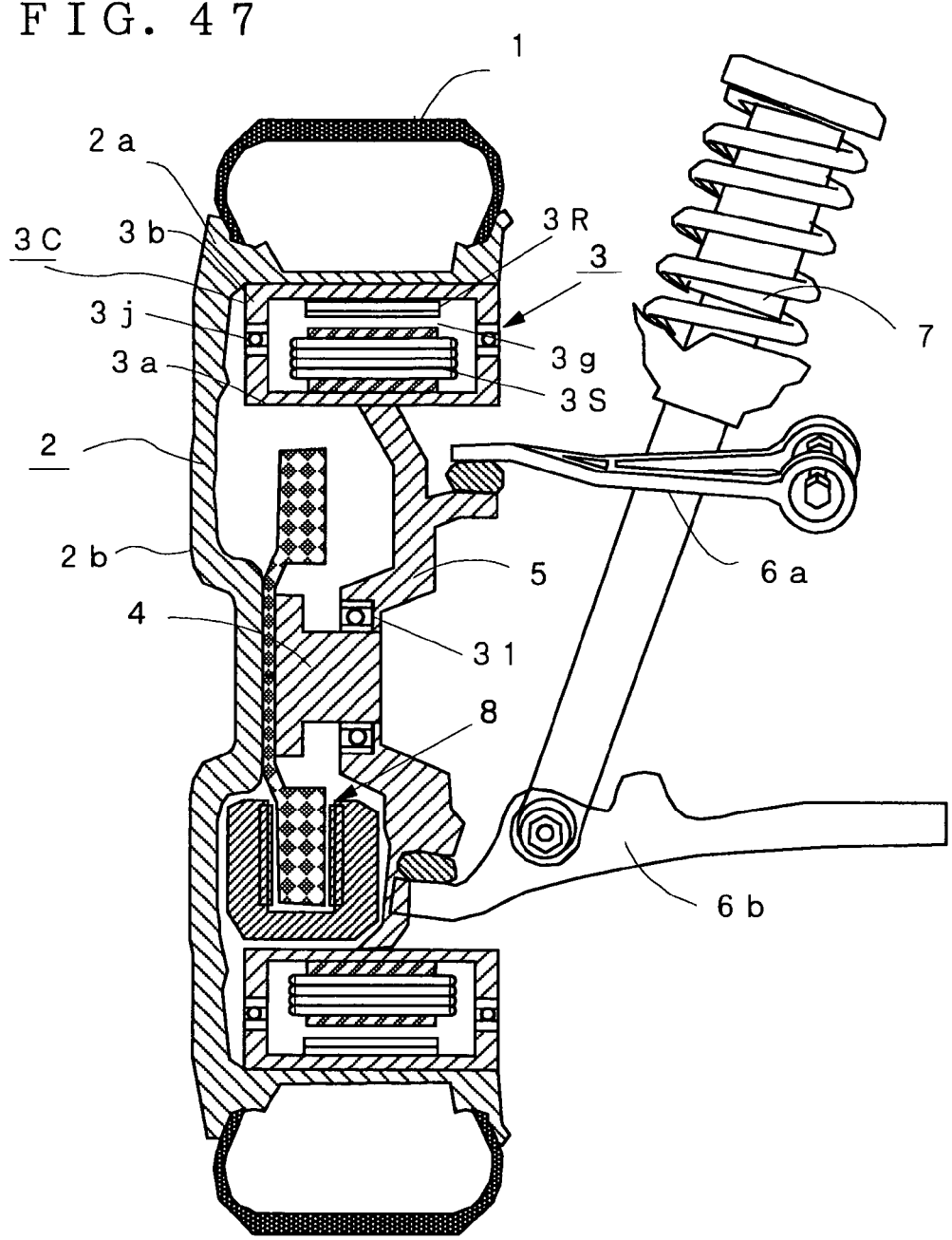
FIG. 47 is a longitudinal sectional view showing the constitution of an inwheel motor system according to Embodiment 11 of the present invention.

FIG. 47 is a diagram showing the constitution of an inwheel motor system according to Embodiment 11. In FIG. 47, reference numeral 1 denotes a tire, 2 denotes a wheel consisting of a rim 2a and a wheel disk 2b, and 3 denotes an inwheel motor of an outer rotor type which comprises a stator 3S fixed to a non-rotary case 3a and a rotor 3R fixed to a rotary case 3b rotatably connected to the above non-rotary case 3a through a bearing 3j and provided on the outer side in the radial direction.

Reference numeral 4 represents a hub portion connected to the wheel 2 at its rotation axis, 5 represents a knuckle which is a part around the wheel of the vehicle and connected to suspension arms 6a and 6b, 7a suspension member, and 8 represents a brake.

In Embodiment 11, the non-rotary case 3a of the inwheel motor 3 is connected to the knuckle 5 which is a part around the wheel of the vehicle, the rotary case 3b rotatably connected to the above non-rotary case 3a through the bearing 3j is connected to the rotating wheel 2 in such a manner that it is inscribed in the wheel 2, and the hub portion 4 connected to the above wheel 2 at its rotation axis and the knuckle 5 are coupled through a hub bearing 31 provided on the inner side of the hollow inwheel motor 3 so that the weight of the vehicle can be shared by the wheel 2 and a motor case 3C consisting of the above non-rotary case 3a, the bearing 3j and the rotary case 3b.

That is, since the weight of the vehicle can be shared by the wheel 2 and the motor case 3C in a ratio of "stiffness of the wheel including the stiffness of the hub bearing" and "stiffness of the motor case" by employing the above structure, the weight of the vehicle for each wheel is shared by the motor case 3c and the hub bearing 31. Thereby, a load on the motor case 3C is reduced and a change in the air gap 3g between the rotor 3R and the stator 3S can be reduced, whereby the weight of the inwheel motor 3 can be reduced by lowering the stiffness of the motor case 3C or by reducing the size of the motor itself. Accordingly, as the unsprung vibration level and sprung vibration level of the vehicle can be reduced, the riding comfort of the vehicle can be improved.

As the rotary case 3b which is an outer case is connected to the wheel 2 in such a manner that it is inscribed in the wheel 2 in this embodiment, torque can be transmitted from the inwheel motor 3 to the wheel 2. Further as the brake 8 is mounted to the hub portion 4, brake torque is transmitted only to the above hub portion 4 and the knuckle 5 at the time of braking, and brake reaction is not applied to the motor case 3C. Therefore, the stiffness of the motor case 3C can be lowered, thereby making it possible to further reduce the weight of the inwheel motor 3.

Figure 48:
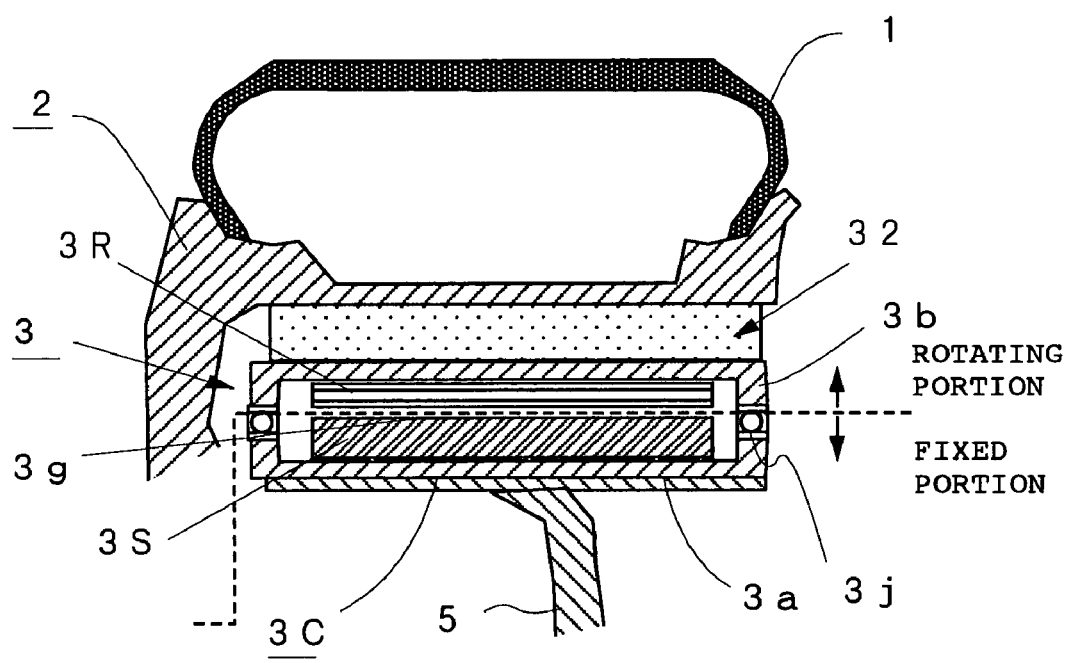
FIG. 48 is a sectional view of the key section of another inwheel motor system according to the present invention.

By connecting the rotary case 3b to the wheel 2 by an elastic member 32 as shown in FIG. 48, the distortion of the motor case 3C can be further reduced.

That is, as the wheel 2 turns while it is distorted by stress in various directions received from the surface of a road, the distortion of the motor case 3C can be reduced by absorbing the deformation of this wheel 2 with the above elastic member 32. Therefore, the stiffness of the motor case 3C can be further lowered and the weight of the inwheel motor 3 can be reduced. Since the rotary case 3b and the wheel 2 are interconnected by the elastic member 32 in the above constitution, if the wheel 2 is distorted, torque can be transmitted from the inwheel motor 3 to the wheel 2.

When an elastic material such as rubber is used in the above elastic member 32, the material constituting the above elastic member 32 preferably has a vertical elastic coefficient of 1 to 120 MPa. The above vertical elastic coefficient is more preferably 1 to 40 MPa.

Figure 49:
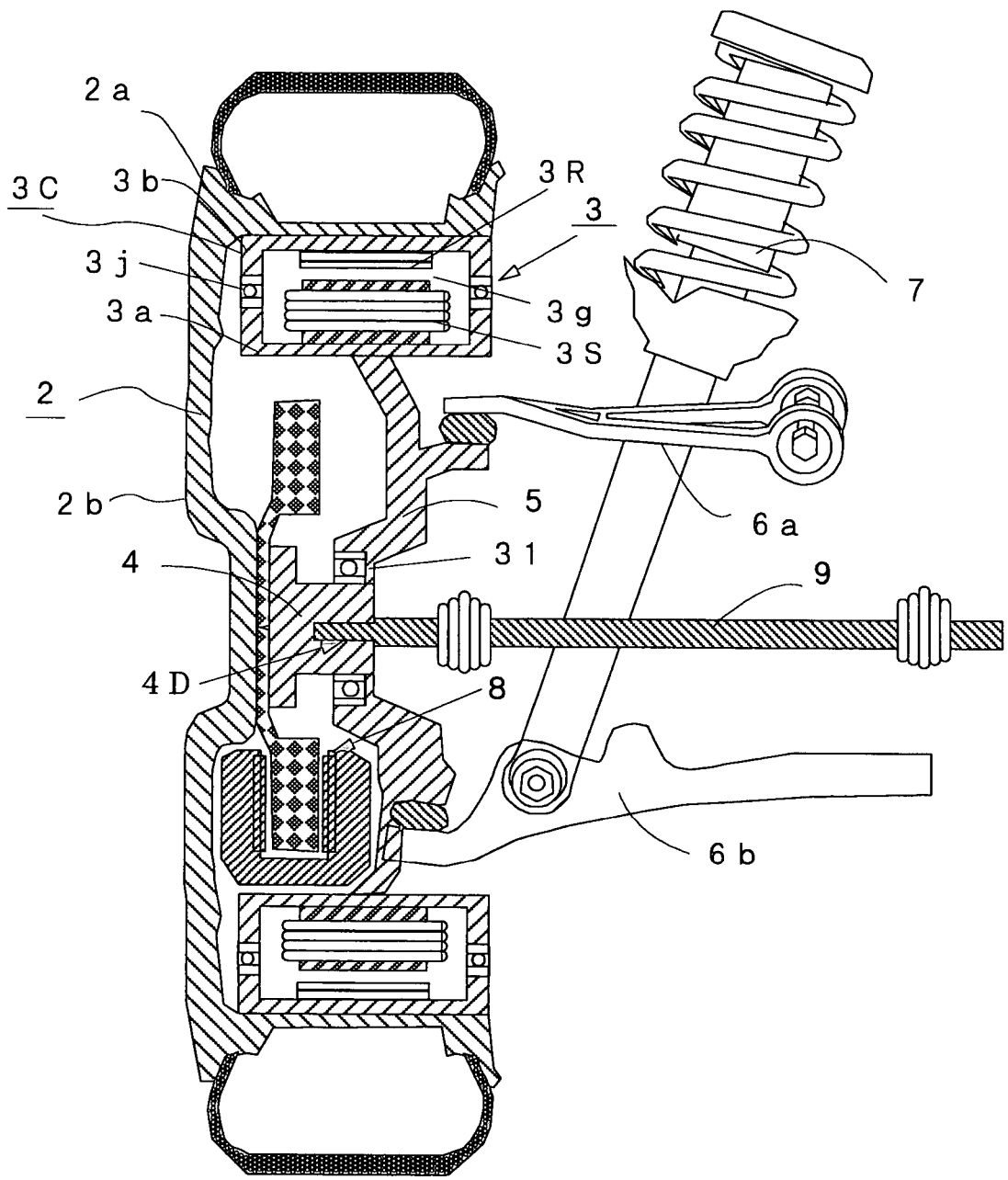
FIG. 49 is a longitudinal sectional view showing the constitution of another inwheel motor system according to the present invention.

When the hub portion 4 is provided with a connection portion 4D for the drive shaft 9 like an ordinary automobile as shown in FIG. 49, power from a car power engine or motor other than the inwheel motor 3 can be transmitted to the wheel 2 through the drive shaft 9. Therefore, by connecting the output shaft of a gasoline engine car to the hub portion 4 of the inwheel motor system of this embodiment, a hybrid car can be constructed.

Embodiment 12

Figure 50:
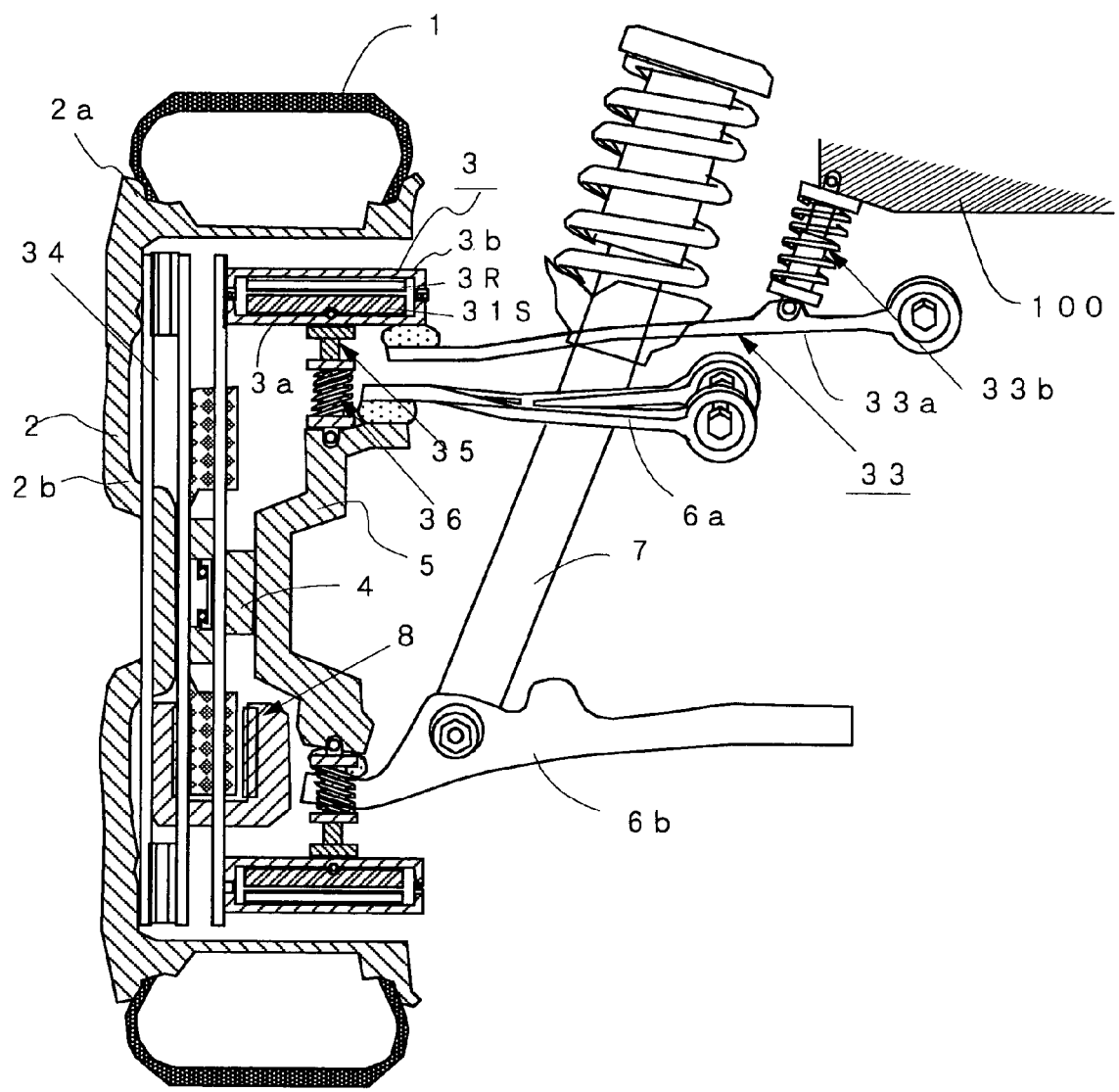
FIG. 50 is a longitudinal sectional view showing the constitution of an inwheel motor system according to Embodiment 12 of the present invention.

FIG. 50 is a diagram showing the constitution of an inwheel motor system according to Embodiment 12. In FIG. 50, reference numeral 1 denotes a tire, 2 denotes a wheel consisting of a rim 2a and a wheel disk 2b, and 3 denotes an inwheel motor of an outer rotor type which comprises a stator 3S fixed to a non-rotary case 3a provided on the inner side in the radial direction and a rotor 3R fixed to a rotary case 3b rotatably connected to the above non-rotary case 3a through a bearing 3j and provided on the outer side in the radial direction.

Reference numeral 4 represents a hub portion connected to the wheel 2 at its rotation axis, 5 represents a knuckle which is a part around the wheel of the vehicle and connected to upper and lower suspension arms 6a and 6b, 7 represents a suspension member which is a shock absorber or the like, and 8 represents a brake which is a brake disk mounted to the above hub portion 4.

Reference numeral 33 denotes a motor buffer unit for connecting the above inwheel motor 3 to a car body 100 side, 34 denotes a flexible coupling which is a driving force transmission unit having the same constitution as the above Embodiment 4 and interposed between the inwheel motor 3 and the wheel 2, and 35 denotes a direct-acting guide unit having the same constitution as the above Embodiment 4 and interposed between the above non-rotary case 3a and the knuckle 5. This direct-acting guide unit 35 is provided with a spring member 36 for preventing a collision between the wheel 2 and the inwheel motor 3, which is not directly connected to the above non-rotary case 3a but only to the knuckle 5.

The above motor buffer unit 33 comprises a motor arm 33a extending toward the car body 100 and a damper 33b which is an elastic member or spring member for connecting this motor arm 33a to the car body 100. The above motor arm 33a connected to the car body 100 side by this damper 33b is used to support the non-rotary case 3a of the inwheel motor 3. Therefore, the inwheel motor 3 is vibrated not in the rotation direction but only in the vertical direction with respect to the car body 100 and wheel 2 by the flexible coupling 34 so that torque can be transmitted efficiently and the above motor 3 is mounted on the car body 100 side by the above motor buffer unit 33. Thus, the inwheel motor 3 can be mounted to a sprung portion.

Since the non-rotary case 3a of the inwheel motor 3 is mounted on the car body 100 side by the motor buffer unit 33 in the inwheel motor system of Embodiment 12, the inwheel motor 3 is mounted to a sprung portion, thereby making it possible to reduce the unsprung mass. Therefore, TCFF can be reduced and the running stability of the vehicle can be improved.

In this embodiment, the spring member 36 for preventing a collision between the wheel 2 and the inwheel motor 3 plays the role of a bump rubber for preventing a collision between the wheel 2 and the inwheel motor 3. Therefore, even when the suspension makes a great stroke by the rolling of the car body, it is possible to prevent a collision between the wheel 2 and the inwheel motor 3. Even when the above spring member 36 for preventing a collision is interposed between the rotary case 3b and the wheel 2, the same effect can be obtained. The above spring member 36 for preventing a collision may be interposed between the case and the knuckle, or both between the wheel and the motor and between the case and the knuckle.

Figure 51:
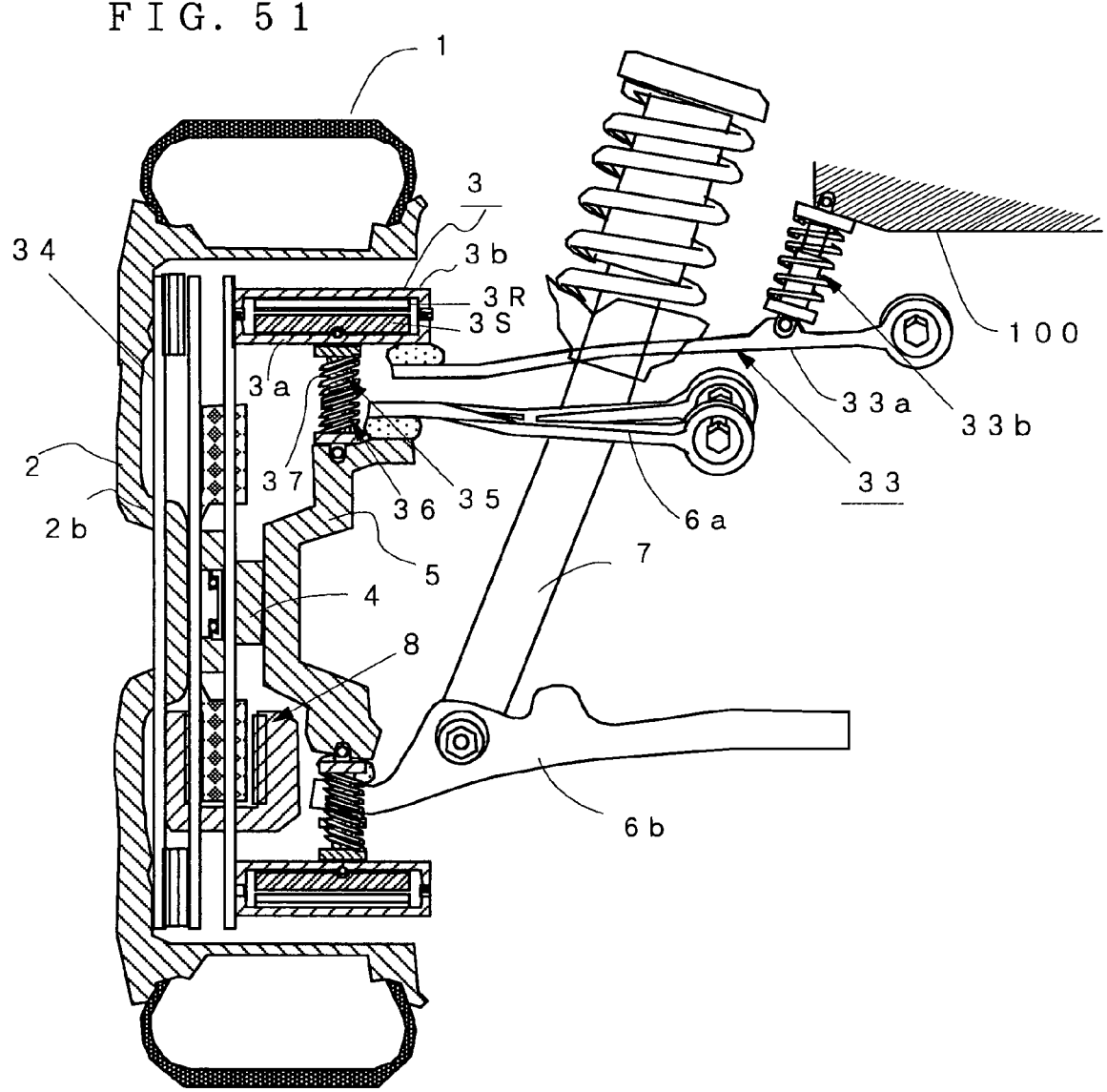
FIG. 51 is a longitudinal sectional view showing the constitution of another inwheel motor system according to the present invention.

As shown in FIG. 51, the non-rotary case 3a of the inwheel motor 3 and the knuckle 5 are interconnected by a buffer member 37 which is a spring member in addition to the above direct-acting guide unit 35 and by the spring member 36 for preventing a collision, thereby making it possible to further reduce TCFF. That is, the inwheel motor 3 is connected to the knuckle 5 which is an unsprung mass corresponding portion of the vehicle by the buffer member 37, whereby the mass of the inwheel motor 3 functions as the weight of a so-called dynamic damper for the unsprung mass. Therefore, TCFF can be further reduced when the vehicle runs over an uneven road, and the road holding properties of the vehicle can be improved. Since the mass of the inwheel motor 3 can be separated from the unsprung mass corresponding portion of the vehicle by the above constitution, even when the vehicle runs over a bad road, vibration is not directly transmitted to the above inwheel motor 3, and a load on the inwheel motor 3 imposed by vibration is reduced.

EXAMPLE 2

Figure 52:
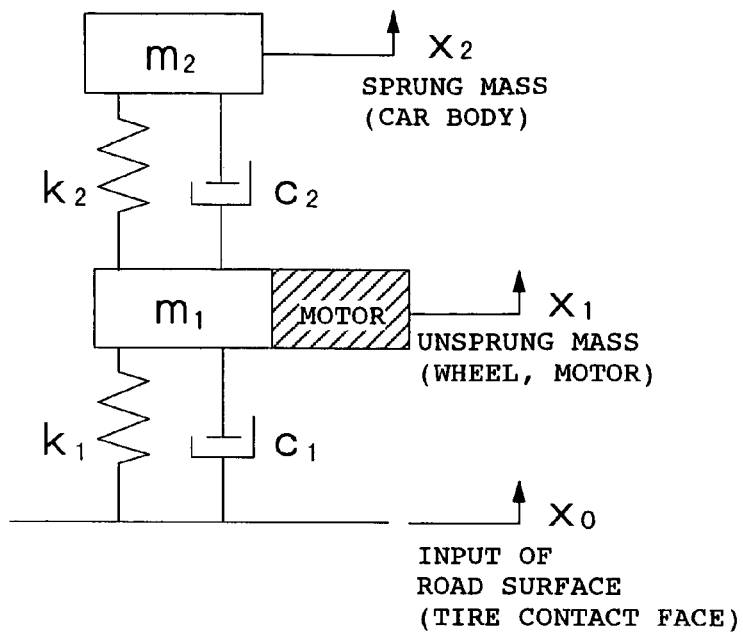
FIG. 52 is a diagram showing a car vibration model in the inwheel motor system of the prior art.
Figure 53:
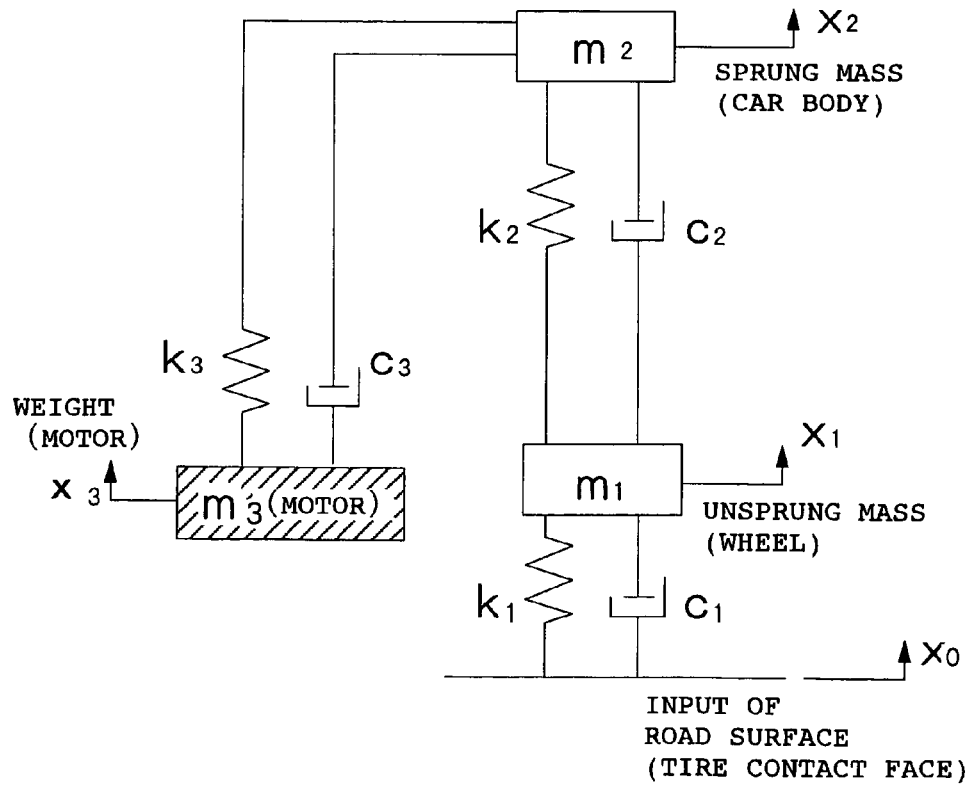
FIG. 53 is a diagram showing a car vibration model in the inwheel motor system of FIG. 50 of the present invention.
Figure 54:
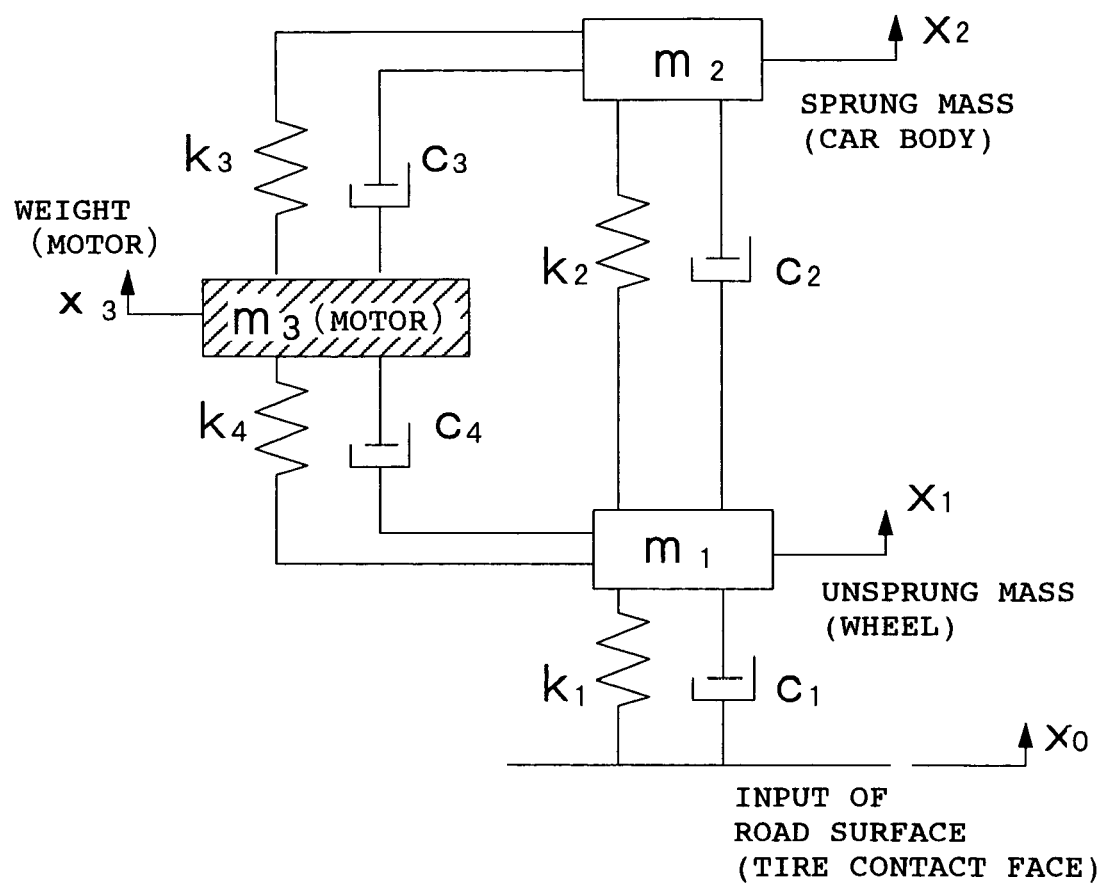
FIG. 54 is a diagram showing a car vibration model in the inwheel motor system of FIG. 51 of the present invention.
Figure 56:
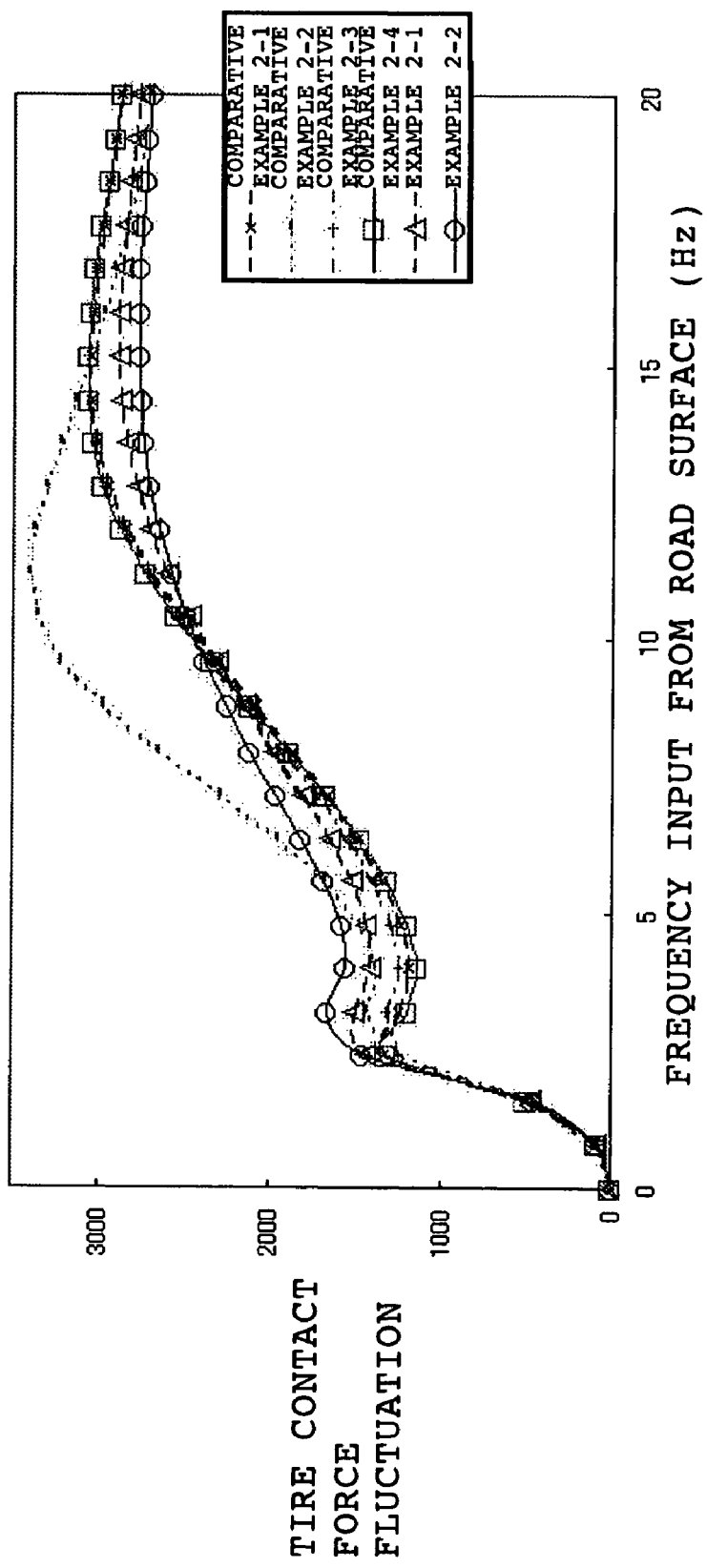
FIG. 56 is a graph showing the analytical results of car vibration models.

The graph of FIG. 56 shows the analytical results of the level of TCFF in the inwheel motor system of Embodiment 12 and the prior art system using car vibration models as shown in FIGS. 52 to 54 and the table of FIG. 55 when the vehicle runs over an uneven road. Comparative Example 2-1 is an electric car which does not employ an ordinary inwheel motor system and in which the mass of the motor corresponds to the sprung mass as the motor is mounted on the car body side.

In FIG. 56, the horizontal axis shows vibration frequency (Hz) and the vertical axis shows the level (N) of TCFF.

Figure 79:
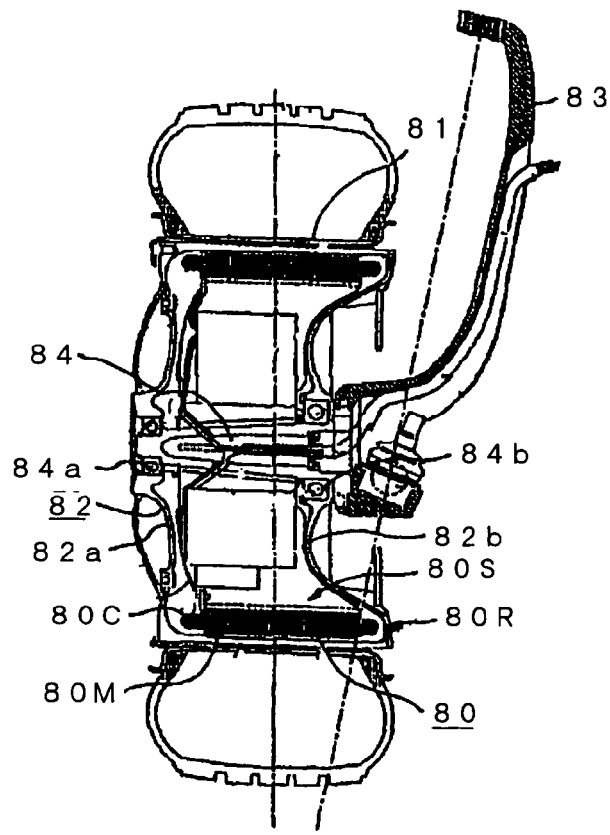
FIG. 79 is a diagram showing the constitution of the inwheel motor system of the prior art.

For example, as the motor is mounted to the wheel or knuckle in the conventional inwheel system shown in FIG. 79, the mass of the motor corresponds to the unsprung mass. The car vibration model is a two-freedom unsprung vibration model (Comparative Example 2-2) as shown in FIG. 52. Describing in more detail, the vibration model in which the unsprung mass $m_1$ is connected to the contact face of the tire by the elastic member $k_1$ and the dash pot $c_1$ and in which the above unsprung mass $m_1$ and the sprung mass $m_2$ are interconnected by the elastic member $k_2$ and the dash pot $c_2$ becomes a model in which the mass of the inwheel motor is added to the above unsprung mass $m_1$. Thus, as the unsprung mass increases when the motor is directly mounted, the level of TCFF rises and the capability of the tire deteriorates (FIG. 56).

To maintain this level of TCFF at the level of the above Comparative Example 2-1, the total weight of the motor and a part around the wheel must be made equal to that of the prior art system as shown in Comparative Example 2-3. However, a serious cost rise is expected because a large amount of a light alloy must be used to greatly reduce the weight of the part around the wheel while the requirement for strength is satisfied, which cannot be said to be practical.

In contrast to this, in the inwheel motor system of the present invention, the inwheel motor is mounted on the car body 100 side by a motor buffer unit corresponding to the elastic member $k_3$ and the dash pot $C_3$ as shown in FIG. 50. Therefore, the car vibration model is a three-freedom model (Example 2-1) in which the mass $m_3$ of the motor is connected to the sprung mass $m_2$ by the elastic member $k_3$ and the dash pot $C_3$ as shown in FIG. 53 in the two-freedom model shown in FIG. 52.

Therefore, as shown in the graph of FIG. 56, the level of TCFF can be made equal to that of an electric motor which does not employ an ordinary inwheel motor system shown in the above Comparative Example 1.

When the inwheel motor is mounted on the car body side by the above buffer unit, and the buffer member consisting of the elastic member $k_4$ and the dash pot $c_4$ is added between the inwheel motor and the part around the wheel as shown in FIG. 51, the car vibration model becomes a model as shown in FIG. 54 in which the mass $m_3$ of the motor is connected to the sprung mass $m_2$ by the elastic member $k_3$ and the dash pot $C_3$ and in which the mass $m_3$ of the above motor is connected to the unsprung mass $m_1$ to become the weight of a dynamic damper (Example 2-2).

Therefore, as shown in the graph of FIG. 56, the level of TCFF can be reduced by 10 Hz or more without increasing the weight of the vehicle excessively.

A 10 Hz or more further reduction in the level of TCFF can be achieved by increasing spring force $k_4$ between the motor and the part around the wheel and by reducing spring force $k_3$ between the inwheel motor and the car body like Example 2-3.

Embodiment 13

In the above Embodiments 1 to 12, an ordinary inwheel motor 3 has been described. When a geared motor consisting of a hollow inner rotor type motor and a speed reducing gear is mounted to an unsprung mass corresponding portion of the vehicle by a buffer member or a buffer unit, TCFF is reduced, thereby making it possible to improve road holding properties and transmit torque to the wheel without fail.

Figure 57:
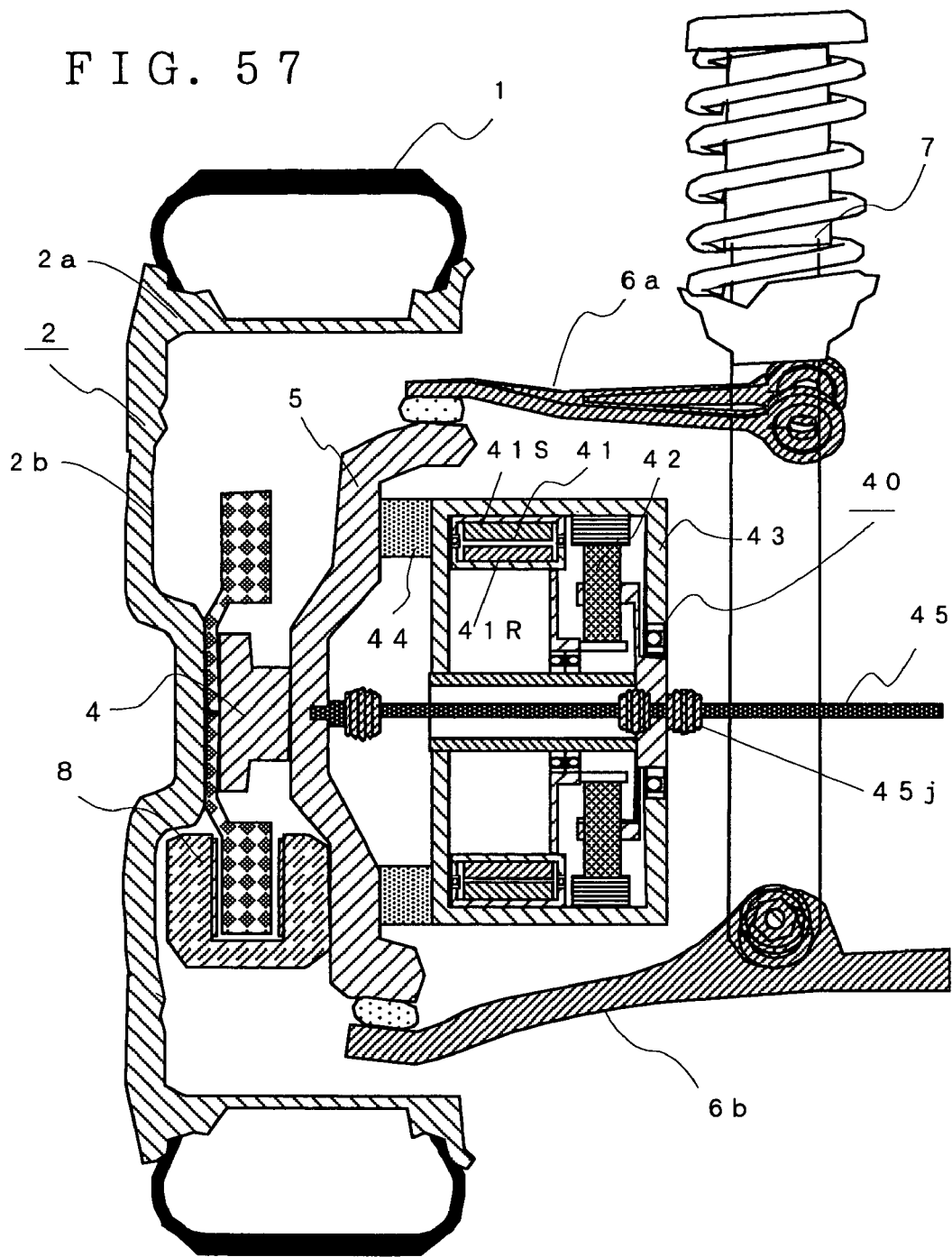
FIG. 57 is a longitudinal sectional view showing the constitution of an inwheel motor system according to Embodiment 13 of the present invention.
Figure 58:
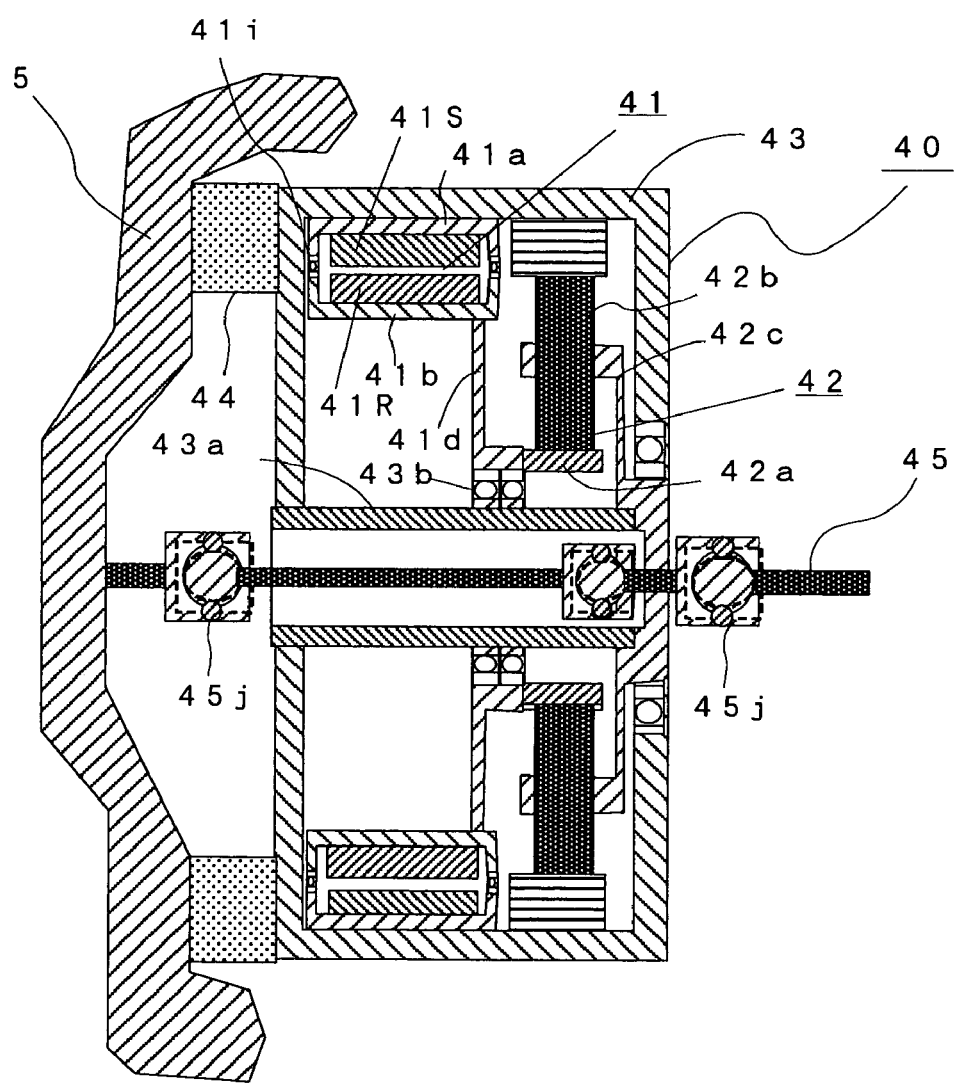
FIG. 58 is a sectional view of the key section of the inwheel motor system according to Embodiment 13 of the present invention.

FIG. 57 is a diagram showing the constitution of an inwheel motor system according to Embodiment 13, and FIG. 58 is a sectional view of the key section of the system. In these figures, reference numeral 1 denotes a tire, 2 denotes a wheel consisting of a rim 2a and a wheel disk 2b, 40 denotes a geared motor (inwheel motor) which incorporates an electric motor 41 and a planetary speed reducer 42 in a motor case 43, 4 denotes a hub portion connected to the wheel 2 at its rotation axis, 5 denotes a knuckle which is a part around the wheel of the vehicle and connected to upper and lower suspension arms 6a and 6b, 7 denotes a suspension member which is a shock absorber or the like, and 8 denotes a brake which is a brake disk mounted to the above hub portion 4.

Reference numeral 44 represents an elastic member for connecting the motor case 43 which is the non-rotary portion of the geared motor 40 to the knuckle 5, and 45 represents a shaft having a universal joint 45j, for connecting the output shaft of the planetary speed reducer 42 to the wheel 2.

The electric motor 41 of the geared motor 40 is a hollow inner rotor type motor which comprises a stator 41S fixed to a non-rotary case 41a provided on the outer side in the radial direction and a rotor 41R fixed to a rotary case 41b rotatably connected to the above non-rotary case 41 through a bearing 41j and provided on the inner side in the radial direction. The above non-rotary case 41a is mounted to the motor case 43 connected to the knuckle 5 which is a fixed portion by the elastic members 44, and the rotary case 41b is connected to the sun gear 42a of the planetary speed reducer 42 by a connection member 41d and rotatably connected to an inner wall 43a constituting the hollow shaft portion of the motor case 43 through a bearing 43b. In the above planetary speed reducer 42, the rotation speed of the above sun gear 42a is changed to a speed corresponding to the rotation speed of the planetary gear 42b to be reduced and transmitted to the wheel 2 by the above shaft 45 connected to the output shaft of the planetary speed reducer 42 from a carrier 42c.

Figure 59:
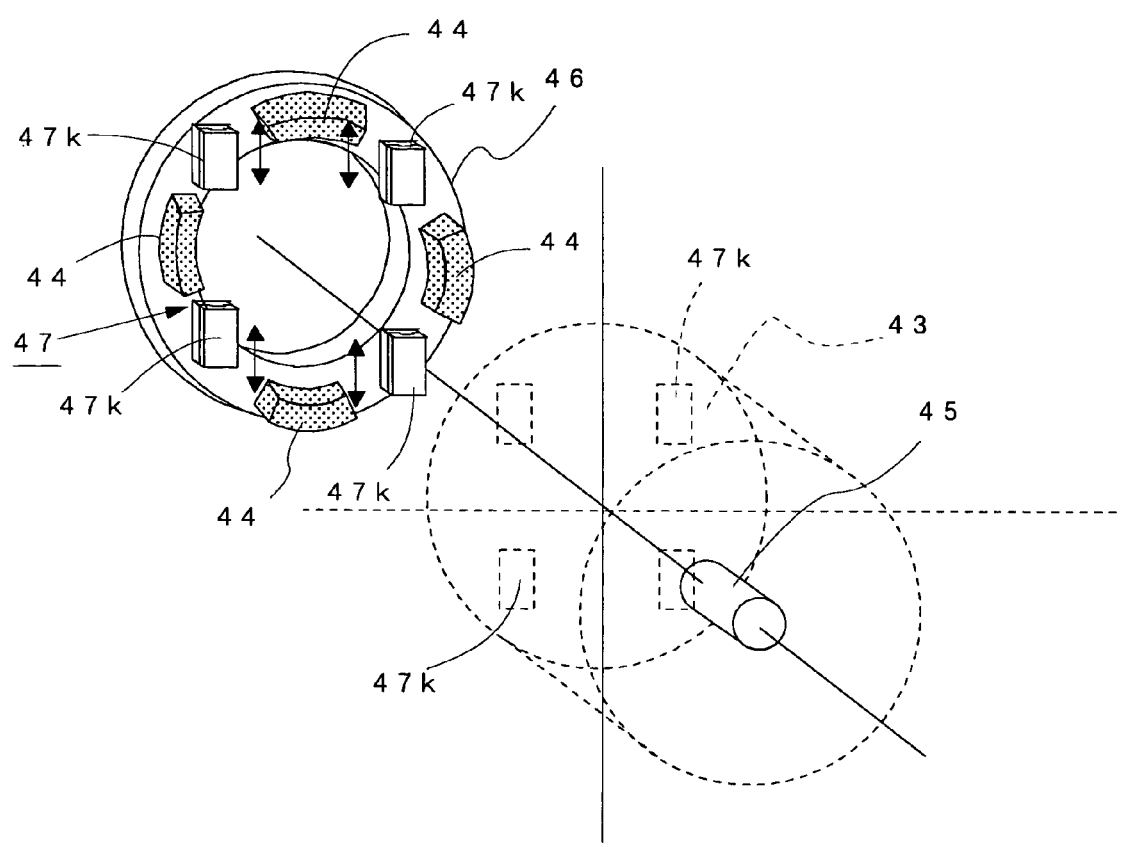
FIG. 59 is a diagram showing the constitution and operation of elements 44 in FIG. 58 according to Embodiment 13 of the present invention.

To interconnect the motor case 43 and the knuckle 5 by the elastic members 44 in this embodiment, as shown in FIG. 59, four elastic members 44 are arranged symmetrical on a disk-like motor attachment member 46, and a motor attachment unit 47 which has direct-acting guides 47k, interposed between the above elastic members 44 and 44, for guiding the motor case 43 in the vertical direction is used to interconnect the motor case 43 and the knuckle 5, thereby limiting the moving direction of the motor to the vertical direction of the wheel.

Since the motor case 43 which is the non-rotary portion of the geared motor 40 is mounted to the knuckle 5 by the elastic members 44 as described above to float mount the above geared motor 40 to an unsprung mass corresponding portion which is a part around the wheel of the vehicle, the axis of the motor and the axis of the wheel can move separately in the radial direction. Therefore, the mass of the motor is separated from the unsprung mass corresponding portion of the vehicle and functions as the weight of a so-called dynamic damper like the above Embodiments 1 to 12 to cancel unsprung vibration at the time of running over an uneven road, thereby reducing TCFF. Therefore, the road holding properties of the vehicle can be improved and vibration applied to the geared motor 40 at the time of running over a bad road can be reduced, thereby making it possible to reduce a load on the above motor 40 imposed by vibration. Since the motor case 43 and the knuckle 5 are interconnected by the elastic members 44 and the motor attachment unit 47 having the direct-acting guides 47k for guiding the motor case 43 in the vertical direction, the geared motor 40 can move in the vertical direction of the vehicle but not in the rotation direction by the restriction of the direct-acting guides 47k. Therefore, the rotation of the motor case 43 which is a non-rotary portion can be prevented. Although the motor vibrates and the axis of the motor and the axis of the wheel become eccentric from each other at the time of running over a bad road, the torque of the motor can be transmitted smoothly by using the above universal joint 45j even when these axes become eccentric from each other.

Since the mass of the vehicle is supported by the hub portion 4 in the inwheel motor system of this embodiment, a load on the body of the motor 40 is small. Therefore, a change in the air gap between the rotor 41R and the stator 41S can be made small, whereby the stiffness of the case can be reduced and the motor 40 can be made lightweight.

Since the geared motor 40 is connected to the hub portion 4 by the shaft 45 having the universal joints 45j passing through the center thereof, even when the geared motor 40 moves relative to a portion around the wheel, torque can be transmitted to the wheel 2 without fail.

Since the geared motor 40 is used as the inwheel motor in this embodiment, compared with a case where a direct drive motor of an outer rotor type is used, the capacity of the motor can be made smaller to generate the same torque and the mass of the motor can be reduced, thereby making it possible to reduce the total weight of the vehicle and the production cost of the motor. Further, since the gear ratio of the geared motor 40 can be selected, a torque curve can be freely set with the same motor, thereby improving the general-applicability of the motor compared with a direct drive motor of an outer rotor type.

EXAMPLE 3

Figure 60:
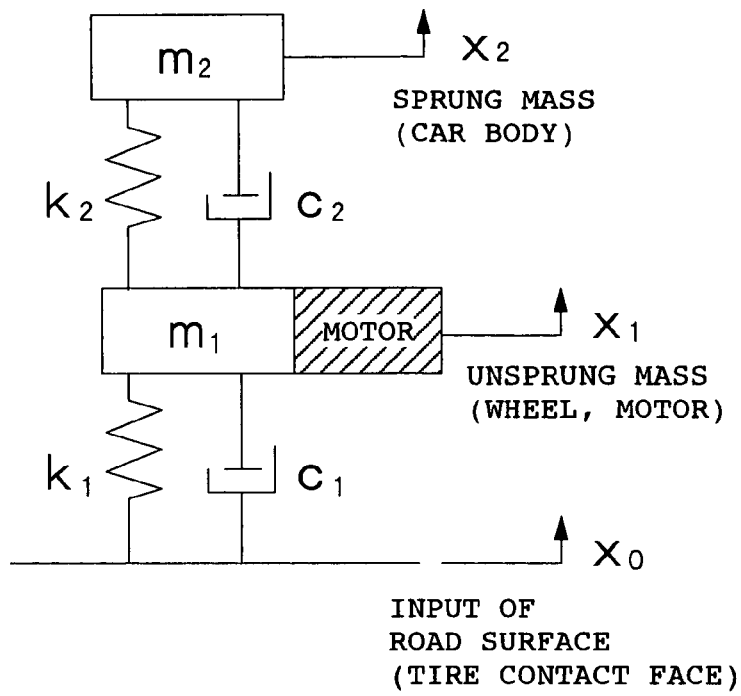
FIG. 60 is a diagram showing a car vibration model in the inwheel motor system of the prior art.
Figure 61:
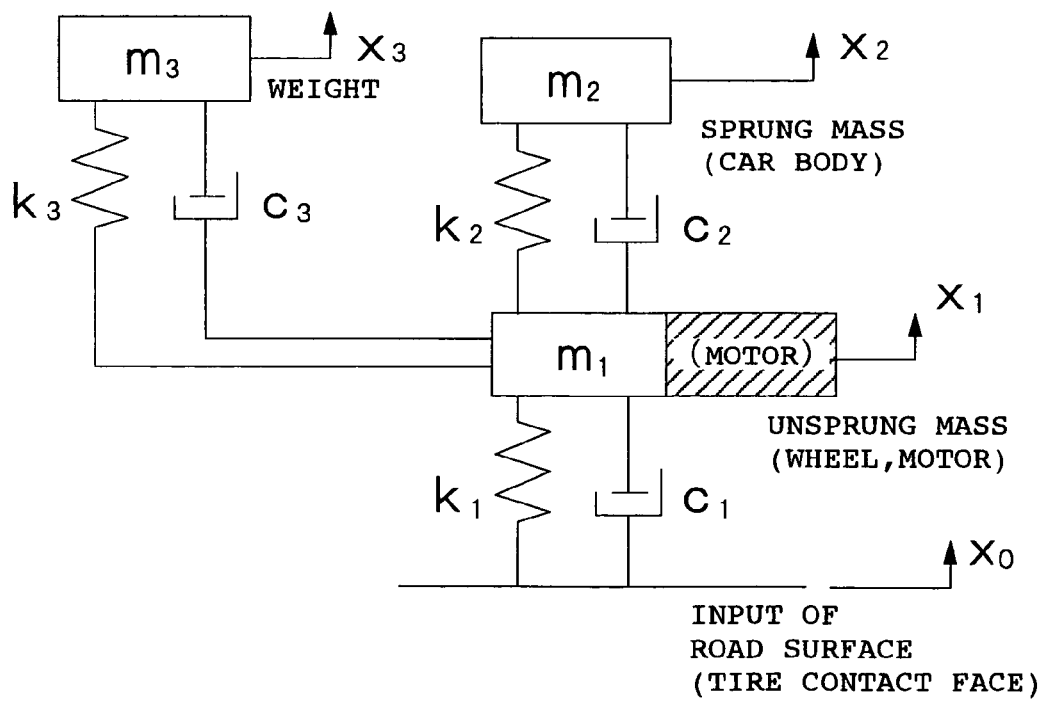
FIG. 61 is a diagram showing a car vibration model when a dynamic damper is mounted to the inwheel motor system of the prior art.
Figure 62:
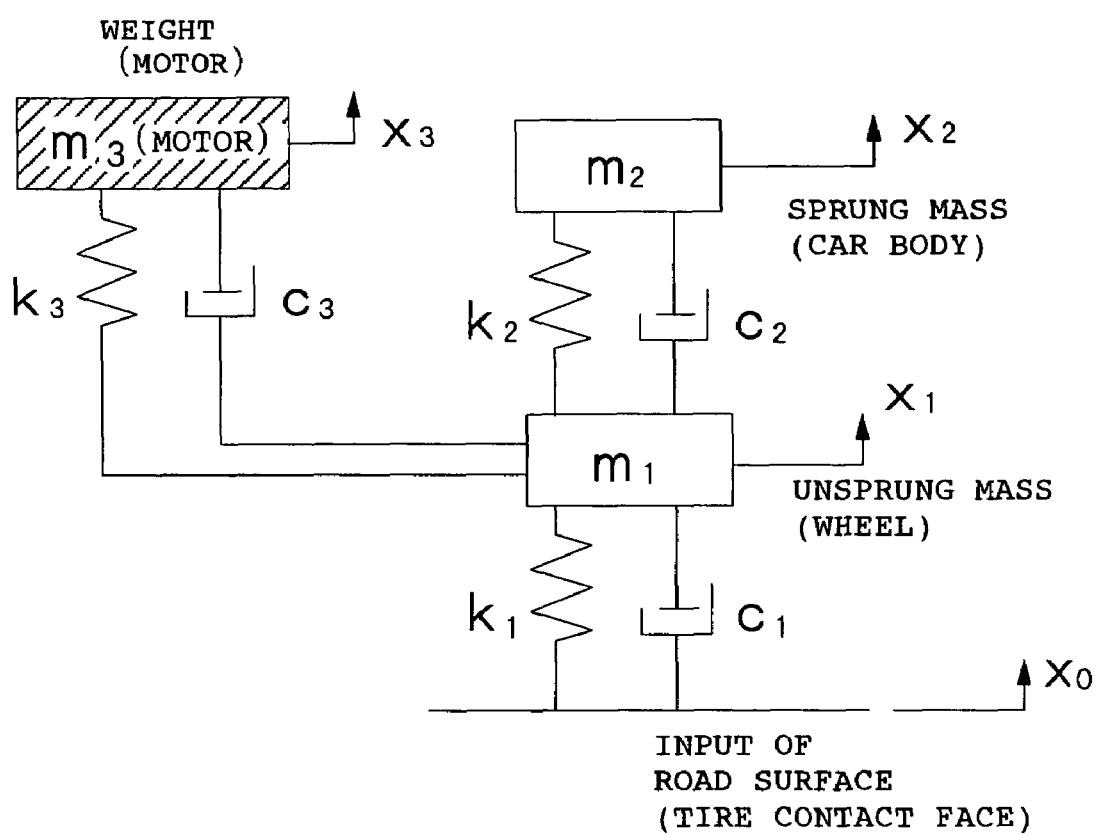
FIG. 62 is a diagram showing a car vibration model in the inwheel motor system of the present invention.
Figure 64:
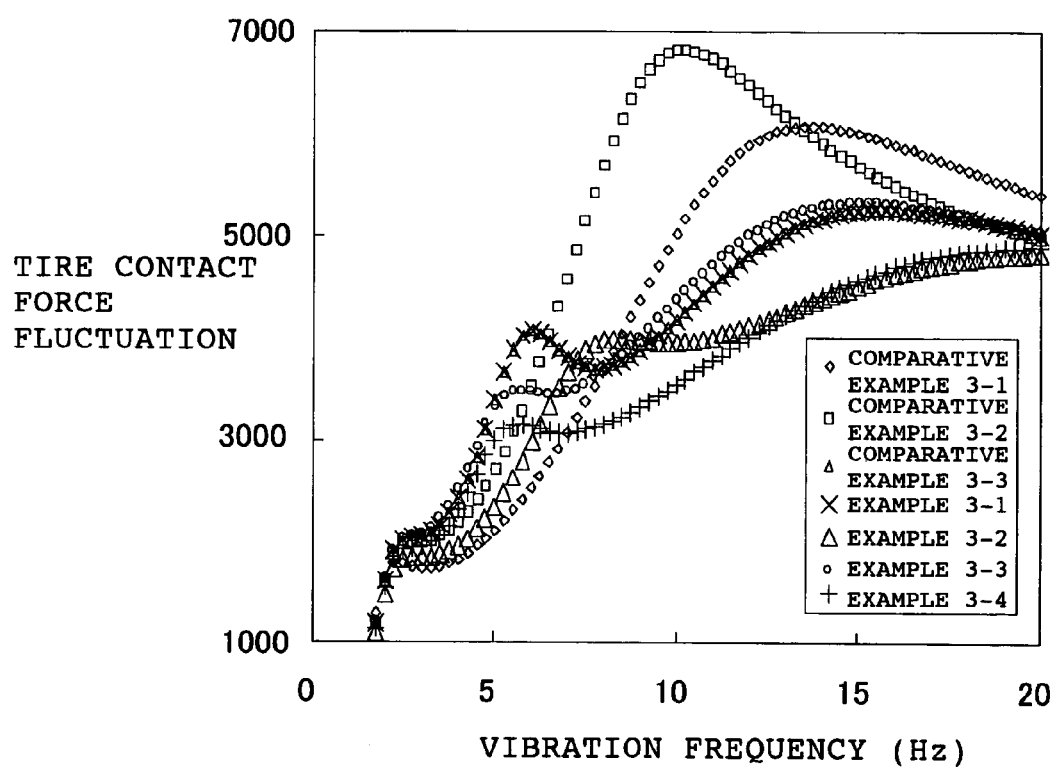
FIG. 64 is a graph showing the analytical results of car vibration models.

The graph of FIG. 64 shows the analytical results of the level of TCFF in the inwheel motor system of the above Embodiment 13 and the system of the prior art using car vibration models at the time of running over an uneven road as shown in FIGS. 60 to 62 and the table of FIG. 63.

Comparative Example 3-1 is an electric car which does not employ an ordinary inwheel motor system in which the mass of the motor corresponds to the sprung mass as the motor is mounted on the car body side.

Since the motor is mounted to an unsprung mass corresponding portion such as the wheel or knuckle in the conventional inwheel motor system, a car vibration model is a two-freedom unsprung vibration model as shown in FIG. 60 (Comparative Example 3-2 in the table of FIG. 63). Describing in more detail, the model is a vibration model in which the mass of the inwheel motor is added to the above unsprung mass $m_1$ in the vibration model in which the unsprung mass $m_1$ is connected to the contact face of the tire by the elastic member $k_1$ and the dash pot $c_1$, and the above unsprung mass $m_1$ and the sprung mass $m_2$ are interconnected by the elastic member $k_2$ and the dash pot $c_2$. Thus, when the motor is directly mounted to an unsprung mass corresponding portion, the unsprung mass increases with the result that the level of TCFF rises and the road holding properties deteriorate as shown in FIG. 64.

To maintain this level of TCFF at the level of the above Comparative Example 3-1, the total weight of the motor and a part around the wheel must be made equal to that of the prior art system. However, to greatly reduce the weight of the part around the wheel while the requirement for strength is satisfied, a serious cost rise is expected due to use of a large amount of a light alloy, which cannot be said to be practical.

Meanwhile, as means of reducing TCFF at the time of running over an uneven road without reducing the above weight, there is a method called "dynamic damper" represented by a model shown in FIG. 61 (Comparative Example 3-3 in the table of FIG. 63). This is a three-freedom model in which new weight $m_3$ is added to the unsprung mass $m_1$ of the two-freedom model of FIG. 60 by the elastic member $k_3$ and the dash pot $C_3$ and has the effect of reducing TCFF as shown in FIG. 64.

This method is more effective as the additional weight $m_3$ increases. As this additional weight merely serves to increase the weight of the vehicle besides to reduce the above change, it has a bad influence on the vehicle. Therefore, there is limitation to the increase of the above weight $m_3$.

In contrast to this, since the inwheel motor (geared motor) 40 is mounted on the car body side by the elastic members 44 in the inwheel motor system of the present invention as shown in FIG. 57, the car vibration model can be represented by a three-freedom model (Example 3-1) in which the mass of the motor is connected to the unsprung mass $m_1$ by the elastic member $k_3$ and the dash pot $c_3$ as shown in FIG. 62. This is a model in which the mass of the motor added to the unsprung mass $m_1$ is removed and this mass of the motor is designated as additional weight $m_3$ used in the dynamic damper in FIG. 61. Therefore, as shown in the graph of FIG. 64, the level of TCFF can be made equal to that of an electric car which does not employ an ordinary inwheel motor system shown in the above Comparative Example 3-1 without increasing the weight of the vehicle excessively.

When the weight of the motor and the weight of the part around the wheel are both reduced in the above Example 3-1 (Example 3-2), when the elastic coefficient of the elastic member is reduced (Example 3-3) and when both of them are combined (Example 3-4), the level of TCFF can be further reduced.

Embodiment 14

Figure 65:
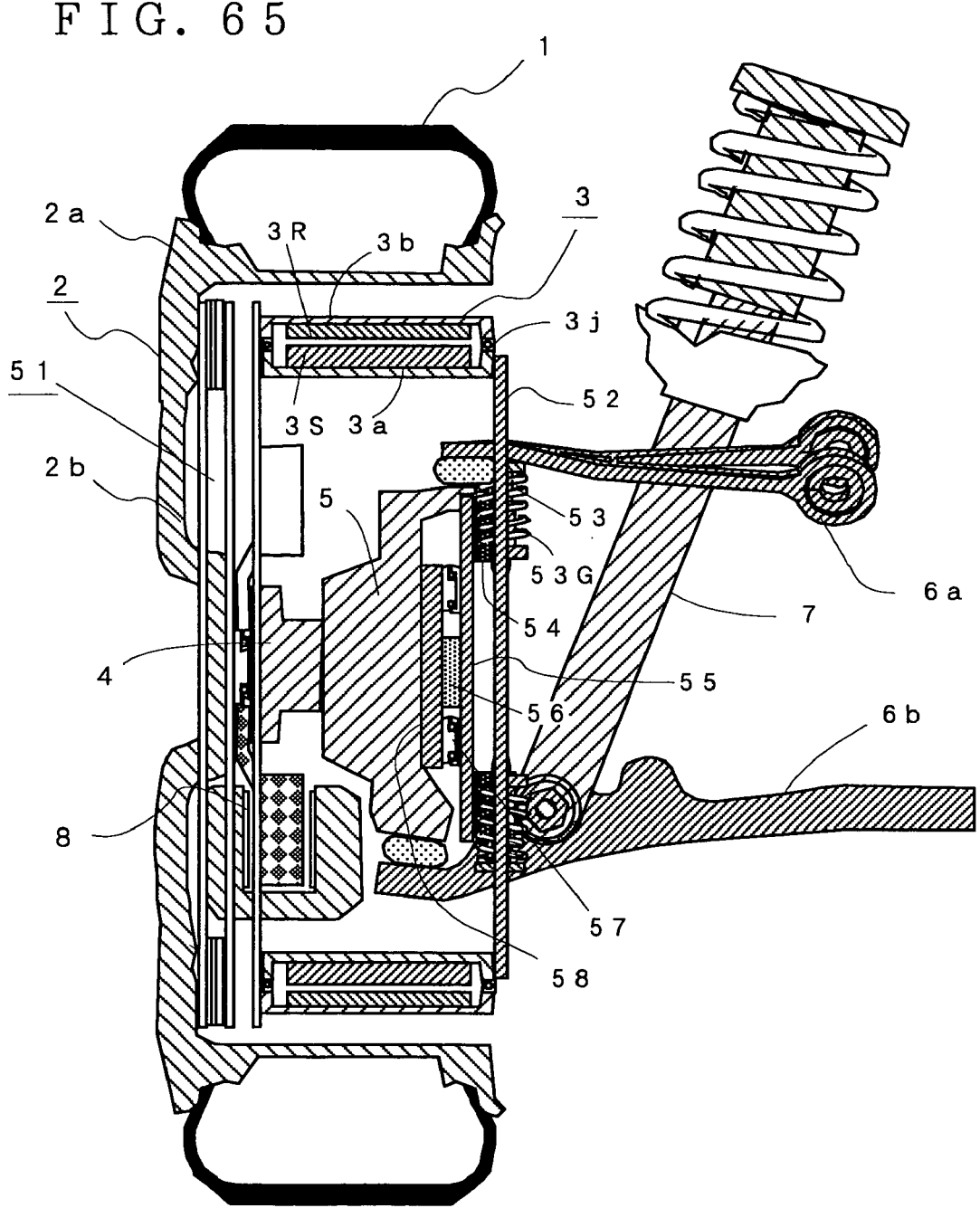
FIG. 65 is a longitudinal sectional view showing the constitution of an inwheel motor system according to Embodiment 14 of the present invention.

FIG. 65 is a diagram showing the constitution of an inwheel motor system according to Embodiment 14. In the figure, reference numeral 1 denotes a tire, 2 denotes a wheel consisting of a rim 2a and a wheel disk 2b, and 3 denotes an inwheel motor of an outer rotor type which comprises a stator 3S fixed to a non-rotary case 3a provided on the inner side in the radial direction and a rotor 3R fixed to a rotary case 3*b* rotatably connected to the above non-rotary case 3*a* through a bearing 3*j* and provided on the outer side in the radial direction.

Reference numeral 4 represents a hub portion connected to the wheel 2 at its rotation axis, 5 represents a knuckle which is a part around the wheel of the vehicle and connected to upper and lower suspension arms 6*a* and 6*b*, 7 represents a suspension member which is a shock absorber or the like, and 8 represents a brake which is a brake disk mounted to the above hub portion 4.

In this embodiment, the rotary case 3*b* of the above inwheel motor 3 is connected to the wheel 2 by a flexible coupling 51. The above flexible coupling 51 is identical to the flexible coupling 18, 19 or 20 shown in FIGS. 22 to 25 of Embodiment 4, FIGS. 29 and 30 of Embodiment 5 or FIGS. 32 and 33 of the above Embodiment 6.

Figure 66:
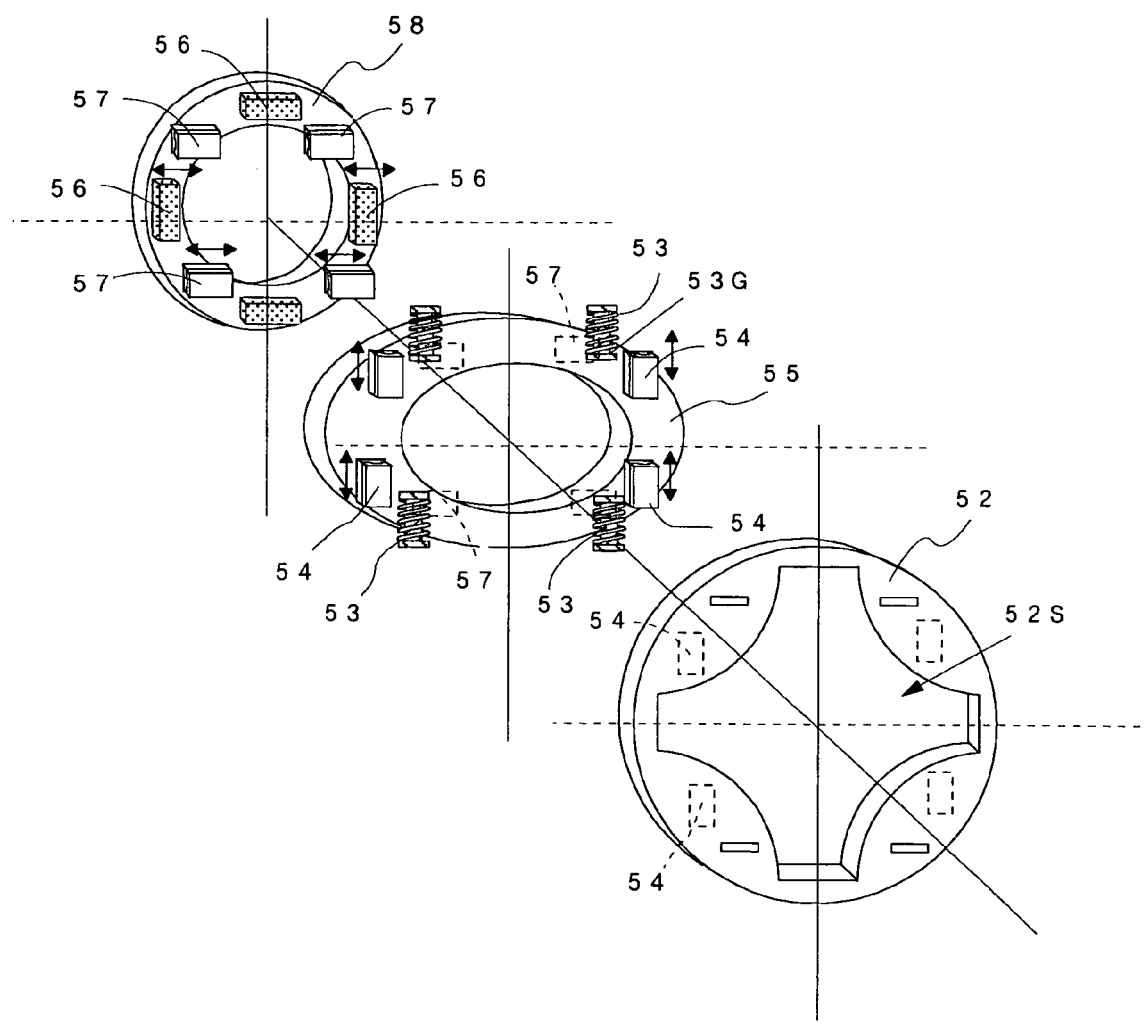
FIG. 66 is a diagram showing how to mount the inwheel motor system of Embodiment 14

Meanwhile, the non-rotary case 3*a* is mounted to the peripheral portion of a disk-like motor attachment member 52 having a cut-out portion 52S in the center as shown in FIG. 66. This motor attachment member 52 is connected to a hollow oval disk-like motor vertical support member 55 having a long axis in the longitudinal direction by dampers 53 which are spring members mounted to slide guides 53G for guiding in the vertical direction of the vehicle and direct-acting guides 54 for guiding in the vertical direction of the vehicle. Further, this motor vertical support member 55 is mounted to the knuckle 5 which is a fixed portion by elastic members 56, direct-acting guides 57 for guiding in the longitudinal direction of the vehicle and a hollow disk-like knuckle attachment member 58. In this embodiment, four dampers 53 and four direct-acting guides 54 for interconnecting the above motor attachment member 52 and the motor vertical support member 55, and four elastic members 56 and four direct-acting guide 57 for interconnecting the above motor vertical support member 55 and the knuckle attachment member 58 are disposed alternately and symmetrically in the circumferential direction.

Thereby the inwheel motor 3 can be supported by the direct-acting guides and the elastic members in the vertical direction of the vehicle, and the vertical direction support part and the knuckle which is a part around the wheel can be supported by the direct-acting guides and the elastic members in the longitudinal direction of the vehicle.

That is, since the non-rotary case 3*a* of the inwheel motor 3 is connected to the hollow oval disk-like motor vertical support member 55 by the dampers 53 and the direct-acting guides 54 for guiding in the vertical direction of the vehicle, the inwheel motor 3 can be float mounted to an unsprung mass corresponding portion which is a part around the wheel of the vehicle, and the axis of the motor and the axis of the wheel can move separately only in the vertical direction. Therefore, the mass of the motor is separated from the unsprung mass of the vehicle and functions as the weight of a so-called dynamic damper. As the weight of the dynamic damper cancels unsprung vibration at the time of running over an uneven road, TCFF is reduced, the road holding properties of the vehicle are improved, and a load on the motor 3 imposed by vibration at the time of running over a bad road can be made small.

Since the motor 3, the motor attachment member 52 and the motor vertical support member 55 are connected to the knuckle 5 by the elastic members 56 and the direct-acting guides 57 for guiding in the longitudinal direction of the vehicle to support the knuckle in the longitudinal direction of the vehicle, the axis of the motor and the axis of the wheel can move separately in the longitudinal direction of the vehicle as well, whereby the tire longitudinal force fluctuation can be reduced and the performance of the tire can be stabilized.

Since the rotary case 3*b* of the motor 3 and the wheel 2 are interconnected by the flexile coupling 51 in this embodiment, rotating torque from the rotor 3R can be efficiently transmitted to the wheel 2 and torque can be smoothly transmitted even when the axis of the motor and the axis of the wheel become eccentric from each other due to the vibration of the motor at the time of running over a bad road.

A constant-velocity universal joint as shown in FIGS. 14 and 15 of the above Embodiment 2 may be used as means of interconnecting the above rotary case 3*b* and the wheel 2. Since the inwheel motor 3 moves within the wheel 2 in the vertical and longitudinal directions when the rotation center of the wheel-side joint is shifted from the rotation center of the motor-side joint, torque can be smoothly transmitted even when they become eccentric from each other.

Since the mass of the vehicle is supported by the hub portion 4 in this embodiment, a load on the body of the motor 3 is small. Therefore, a change in the air gap between the stator and the rotor can be reduced, thereby making it possible to reduce the stiffness of the case and the weight of the motor 3.

Figure 67:
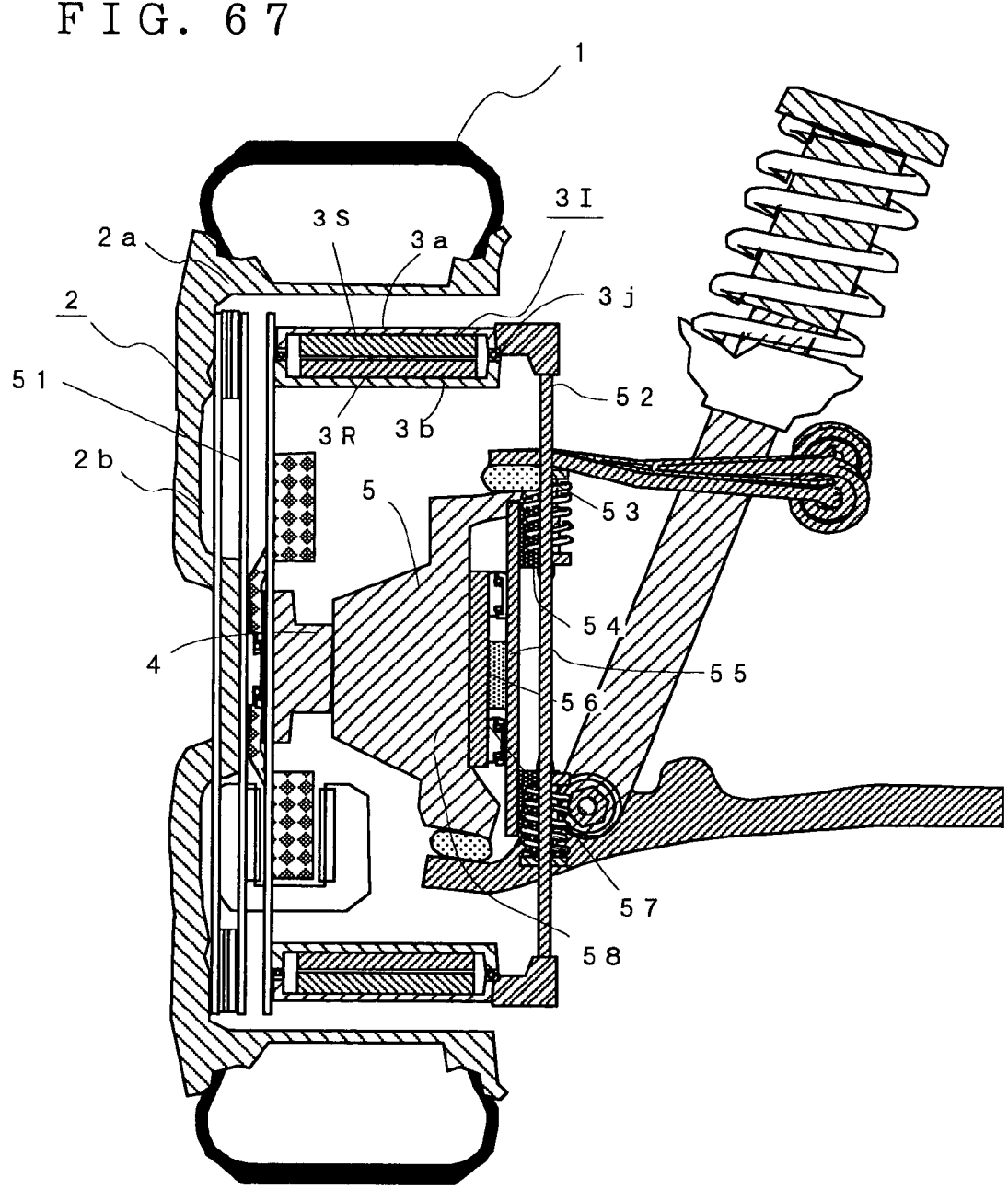
FIG. 67 is a longitudinal sectional view showing the constitution of another inwheel motor system according to the present invention.

In the above embodiment, an outer rotor type motor is used as the inwheel motor 3. Even when an inner rotor type motor 3I is used as shown in FIG. 67, the same effect can be obtained.

Embodiment 15

Figure 68:
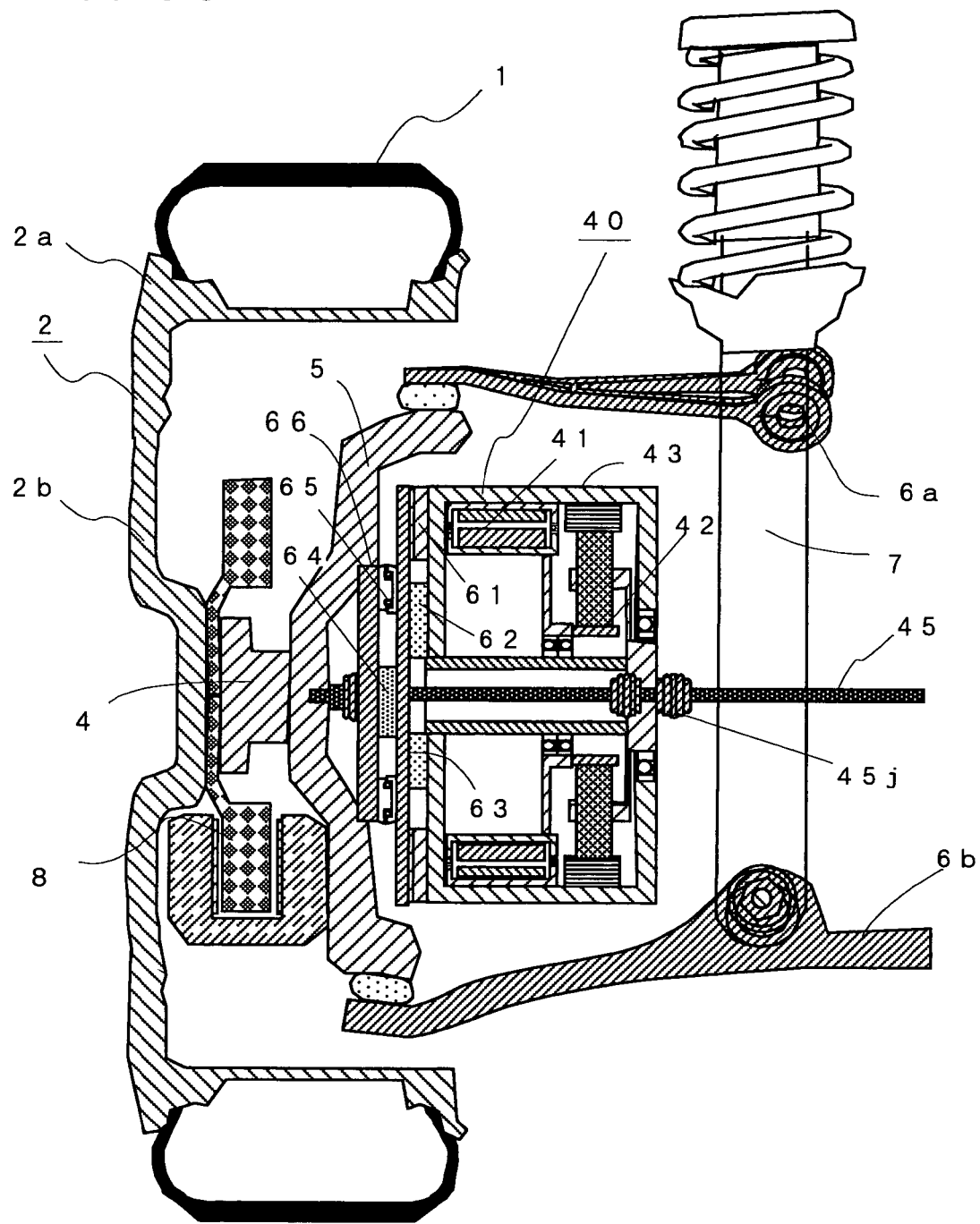
FIG. 68 is a longitudinal sectional view showing the constitution of an inwheel motor system according to Embodiment 15 of the present invention.
Figure 69:
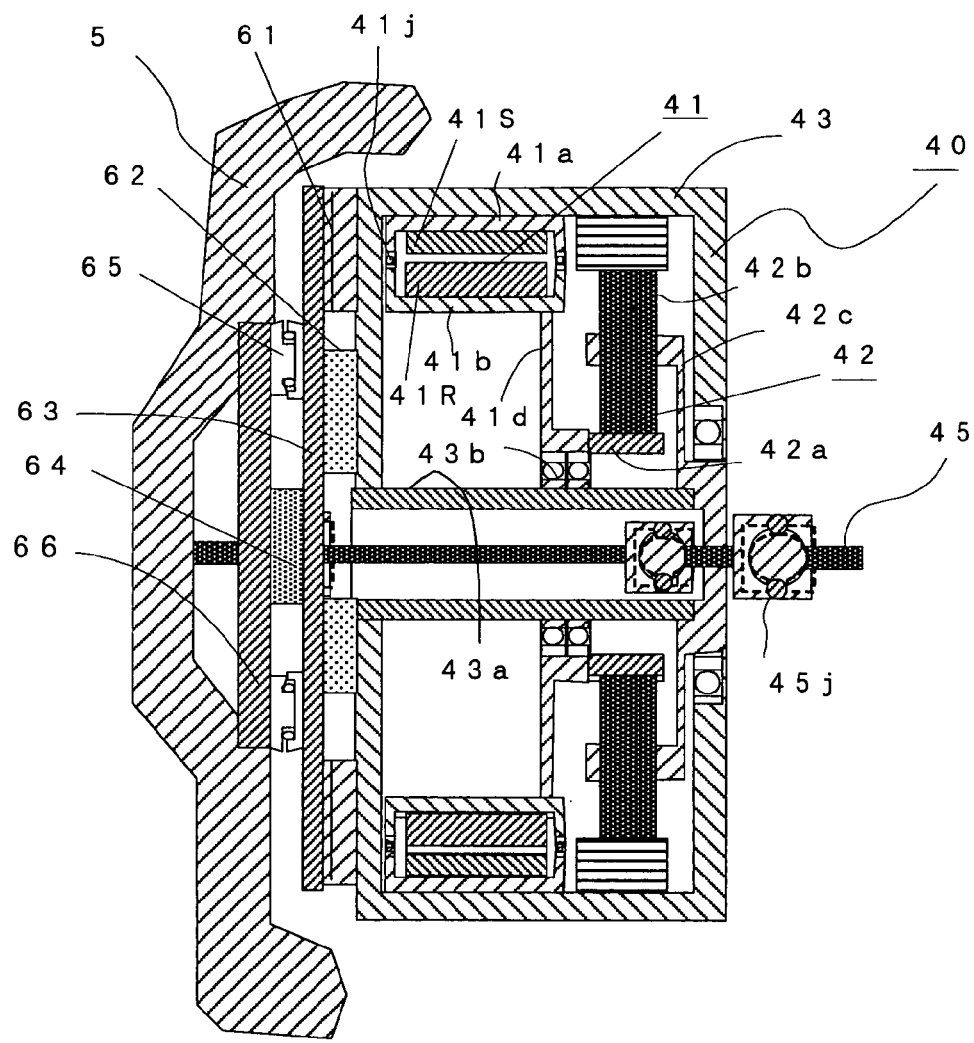
FIG. 69 is a sectional view of the key section of FIG. 68.

In the above Embodiment 14, the inwheel motor 3 which is a direct drive motor is mounted. Similarly, as shown in FIG. 68 and FIG. 69, a geared motor 40 which comprises an electric motor 41 and a speed reducing gear (planetary speed reducer) 42 in a motor case 43 shown in FIGS. 57 and 58 of the above Embodiment 13 may be mounted.

Figure 70:
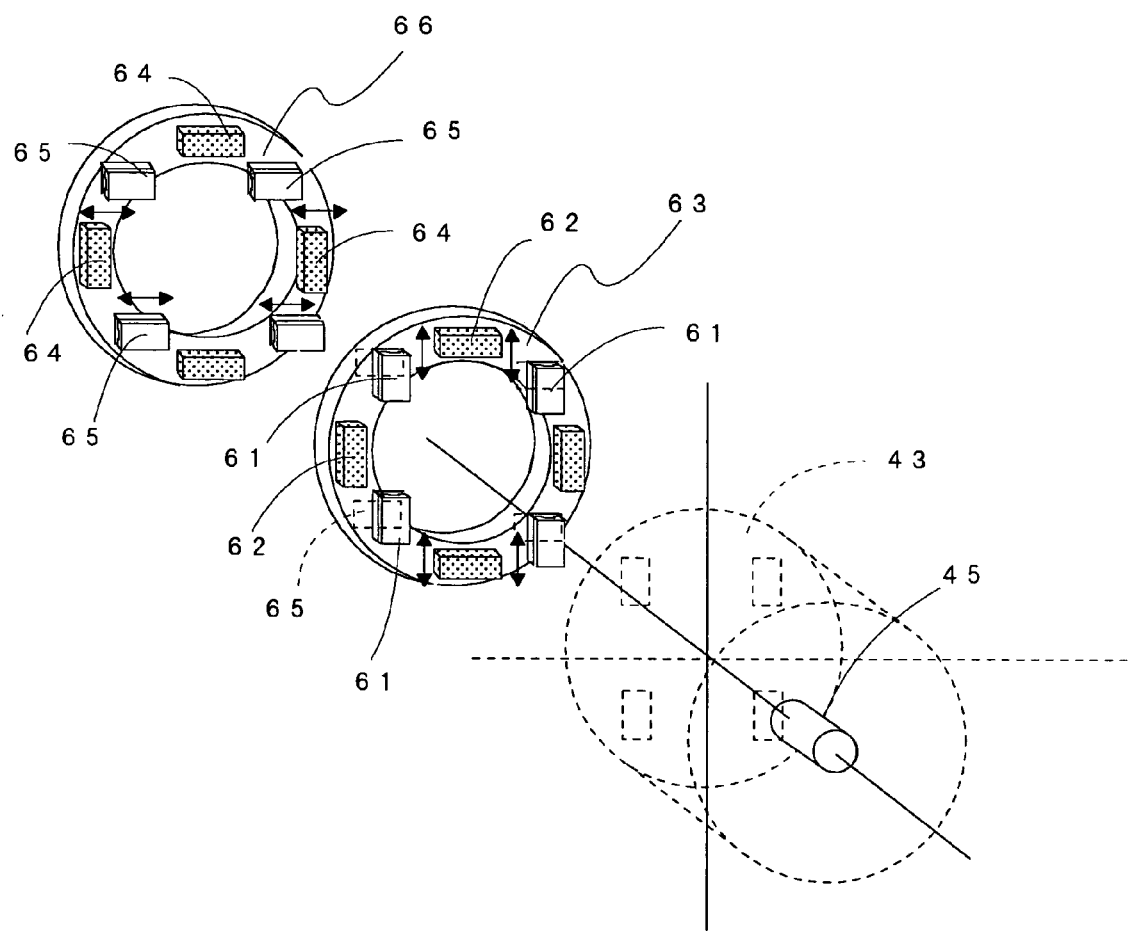
FIG. 70 is a diagram showing how to mount the inwheel motor system of Embodiment 15.
Figure 71A:
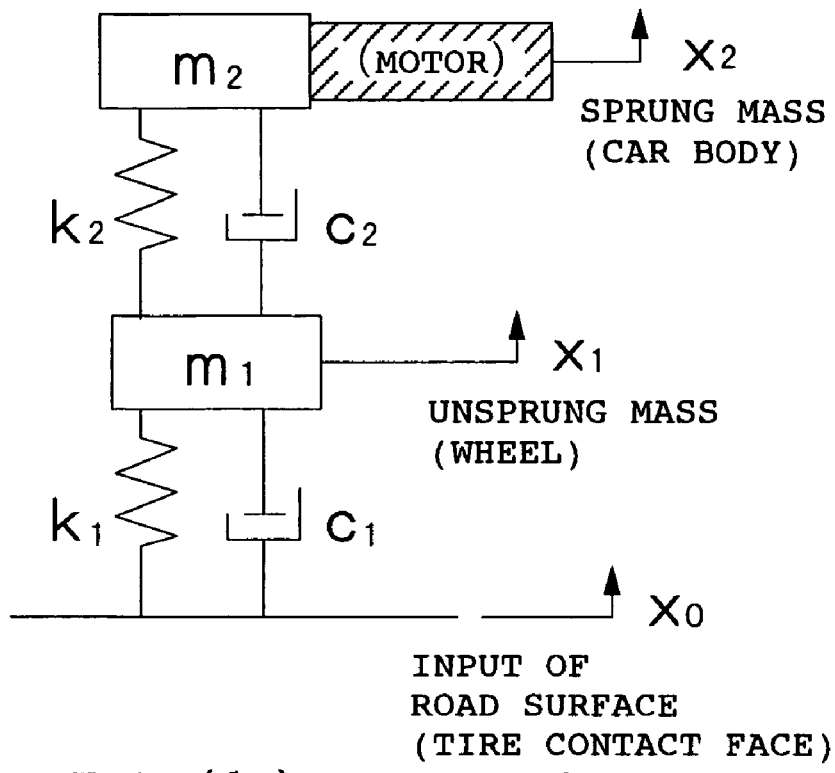
FIGS. 71(*a*) and 71(*b*) are diagrams showing car vibration models in the electric car system of the prior art.
Figure 71B:
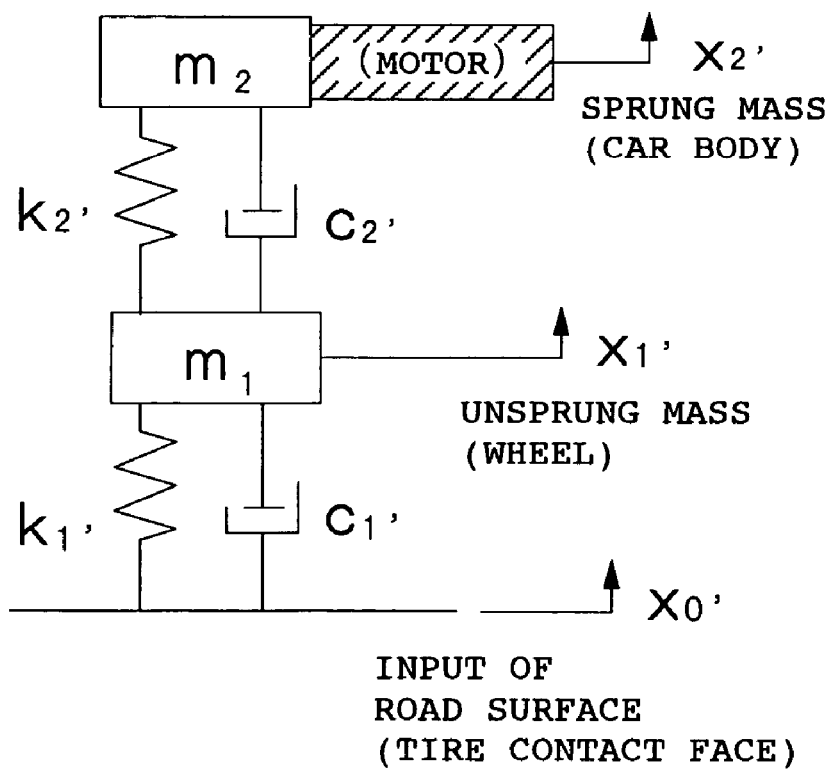

To mount the geared motor 40, as shown in FIG. 70, the non-rotary motor case 43 is mounted to a hollow disk-like motor attachment member 63 by direct-acting guides 61 for guiding in the vertical direction of the vehicle and elastic members 62, and this motor attachment member 63 is mounted to the knuckle 5 which is a fixed portion by a hollow disk-like knuckle attachment member 66 by elastic members 64 and direct-acting guides 65 for guiding in the longitudinal direction of the vehicle. Like the above Embodiment 13, the output shaft of the speed reducing gear 42 and wheel 2 are interconnected by a shaft 45 having a universal joint 45*j* (see FIG. 68 and FIG. 69).

The rotation speed of the rotor 41R is changed to a speed corresponding to the rotation speed of the planetary gear 42*b* which turns around a sun gear 42*a* to be reduced and transmitted to the wheel 2 by the above shaft 45 connected to the output shaft of the planetary speed reducer 42 from a carrier 42*c*.

In this embodiment, four direct-acting guides 61 and four elastic members 62 are arranged alternately and symmetrically in the circumferential direction to connect the above motor case 43 to the motor attachment member 63, and four elastic members 64 and four direct-acting guides 65 are arranged alternately and symmetrically in the circumferential direction to connect the above motor attachment member 63 to the knuckle attachment member 66.

Thereby, the geared motor 40 is supported by the direct-acting guides and the elastic members in the vertical direction of the vehicle, and the vertical direction support member and the knuckle which is a part around the wheel are supported by the direct-acting guides and the elastic members in the longitudinal direction of the vehicle. Therefore, the above geared motor 30 can be float mounted to an unsprung mass corresponding portion which is a part around the wheel of the vehicle, and the axis of the motor and the axis of the wheel can move separately in the radial direction and also in the longitudinal direction of the vehicle. As a result, TCFF can be reduced, the road holding properties of the vehicle can be improved, the tire longitudinal force fluctuation can be reduced, and accordingly, the performance of the tire can be stabilized.

Since the geared motor 40 is connected to the hub portion 4 by the shaft 45 having a universal joint 45j passing through the center thereof, even if the geared motor 40 moves relative to the part around the wheel, torque can be transmitted to the wheel 2 without fail.

EXAMPLE 4

Figure 76:
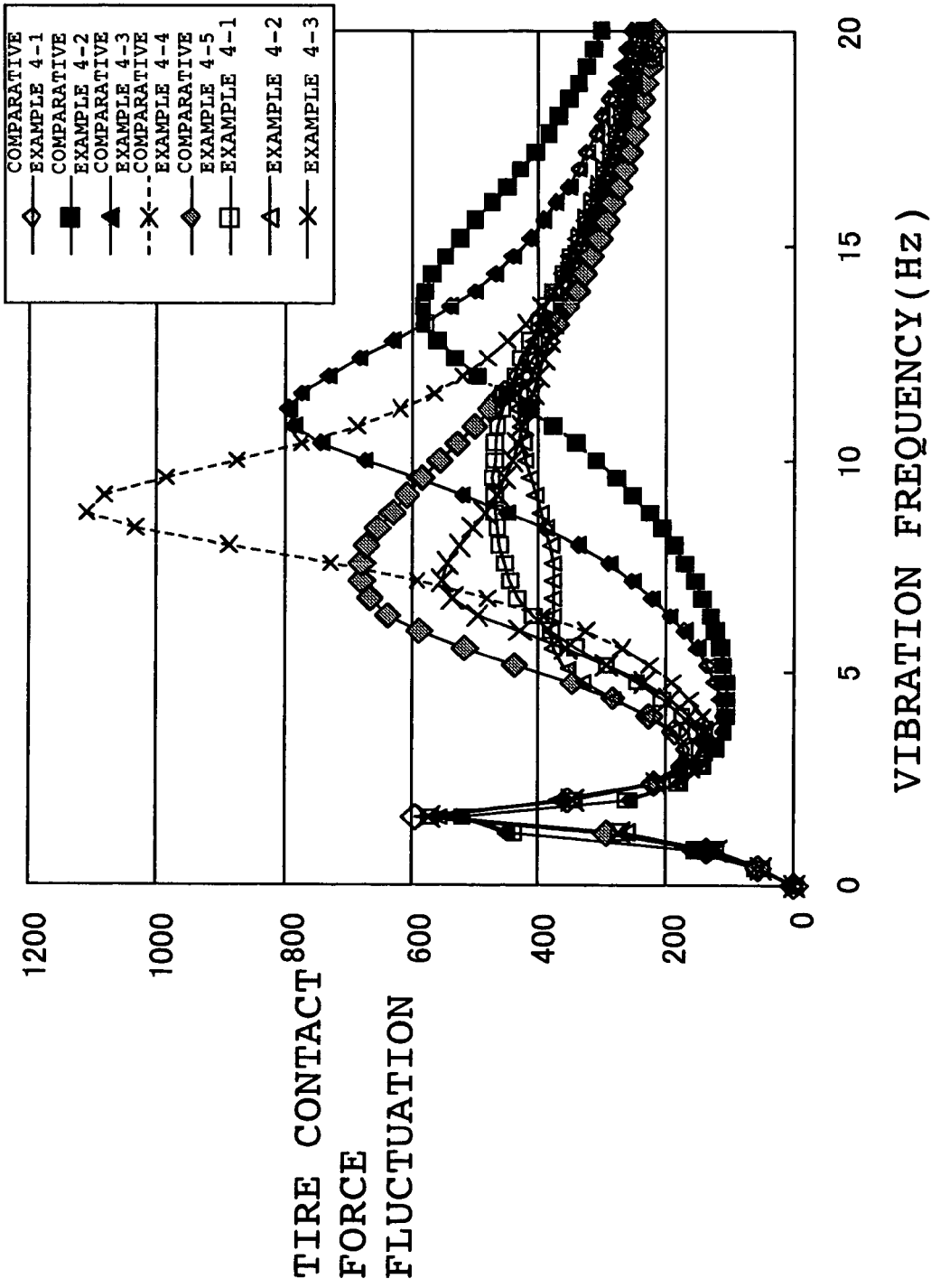
FIG. 76 is a graph showing the analytical results of car vibration models.
Figure 77:
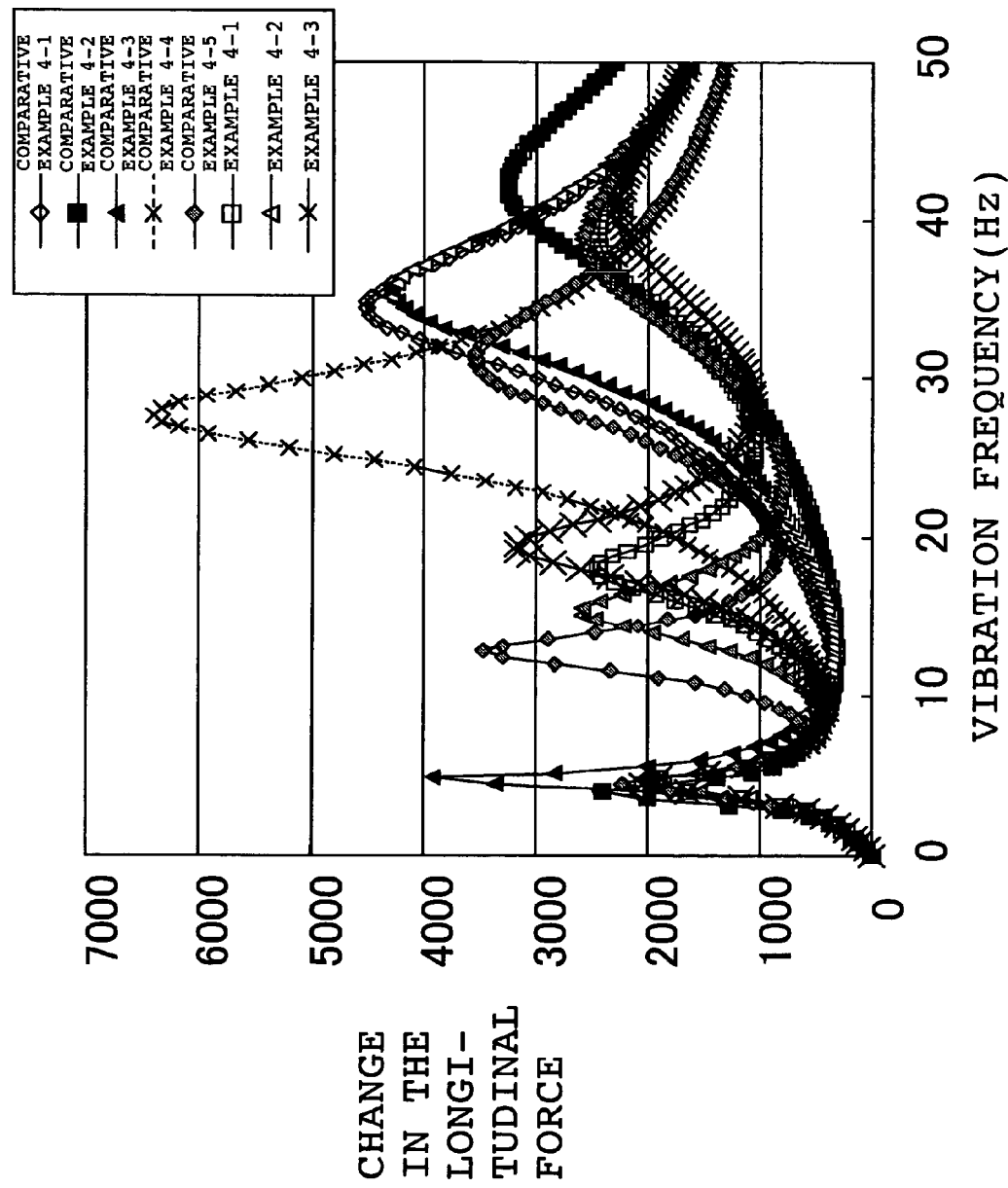
FIG. 77 is a graph showing the analytical results of car vibration models.

The graphs of FIG. 76 and FIG. 77 show the analytical results of fluctuations in tire contact force and longitudinal force in the inwheel motor system of the above Embodiment 15 and the system of the prior art using car vibration models at the time of running over an uneven road as shown in FIGS. 71 to 74 and the table of FIG. 75. FIGS. 71(a) to 74(b) show vertical direction vibration models and FIGS. 71(b) to 74(b) show longitudinal direction vibration models. In FIGS. 76 and 77, the horizontal axis shows vibration frequency (Hz) and the vertical axis shows the level of TCFF (N) and the level of tire longitudinal force fluctuation (N).

Comparative Examples 4-1 to 4-3 are ordinary suspension type electric vehicles (EV) in which the mass of the motor corresponds to the sprung mass as the motor is mounted on the car body side. Therefore, the car vibration models of the above examples are two-freedom unsprung vibration models shown in FIGS. 71(a) and 71(b). Describing in more detail, the vibration models are a model in which the mass of the electric motor is added to the unsprung mass $m_1$ in the vibration model in which the unsprung mass $m_1$ is connected to the contact face of the tire by the elastic member $k_1$ and the dash pot $c_1$, and the above unsprung mass $m_1$ and the sprung mass $m_2$ are interconnected by the elastic member $k_2$ and the dash pot $c_2$.

Figure 72A:
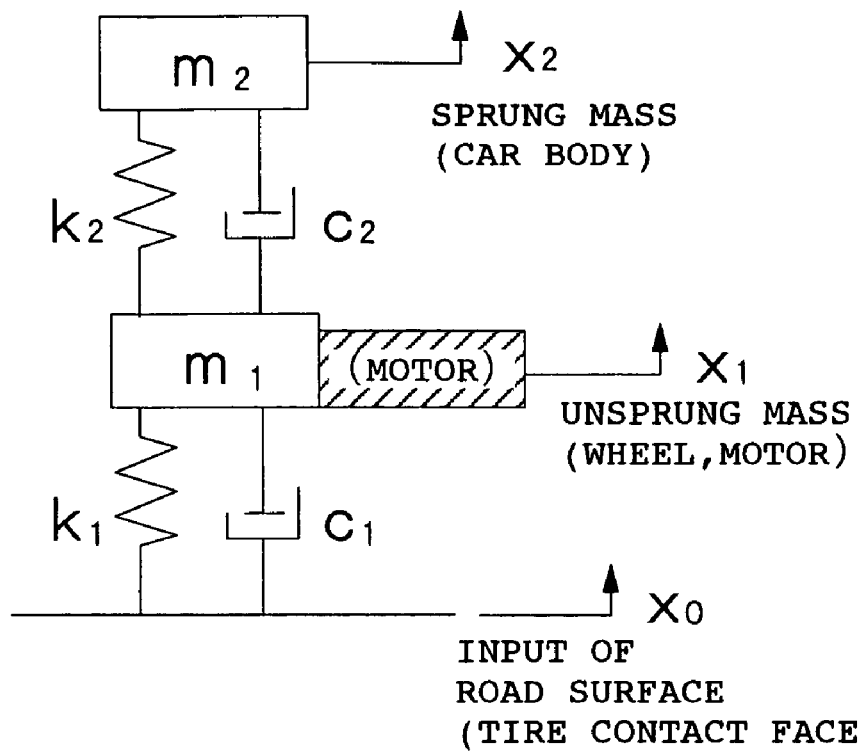
FIGS. 72(*a*) and 72(*b*) are diagrams showing car vibration models in the inwheel motor system of the prior art.
Figure 72B:
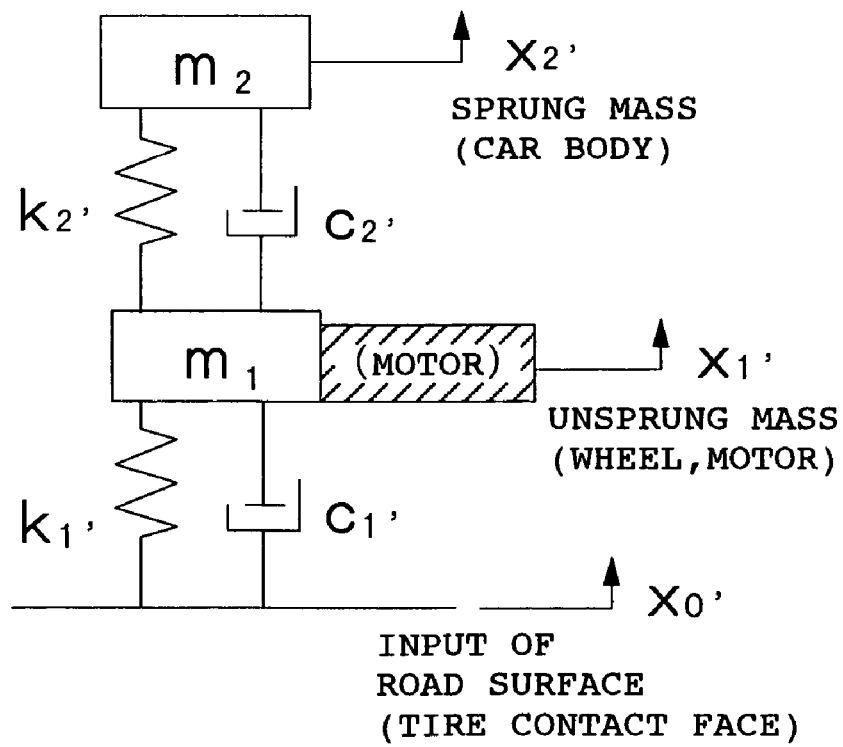
Figure 78:
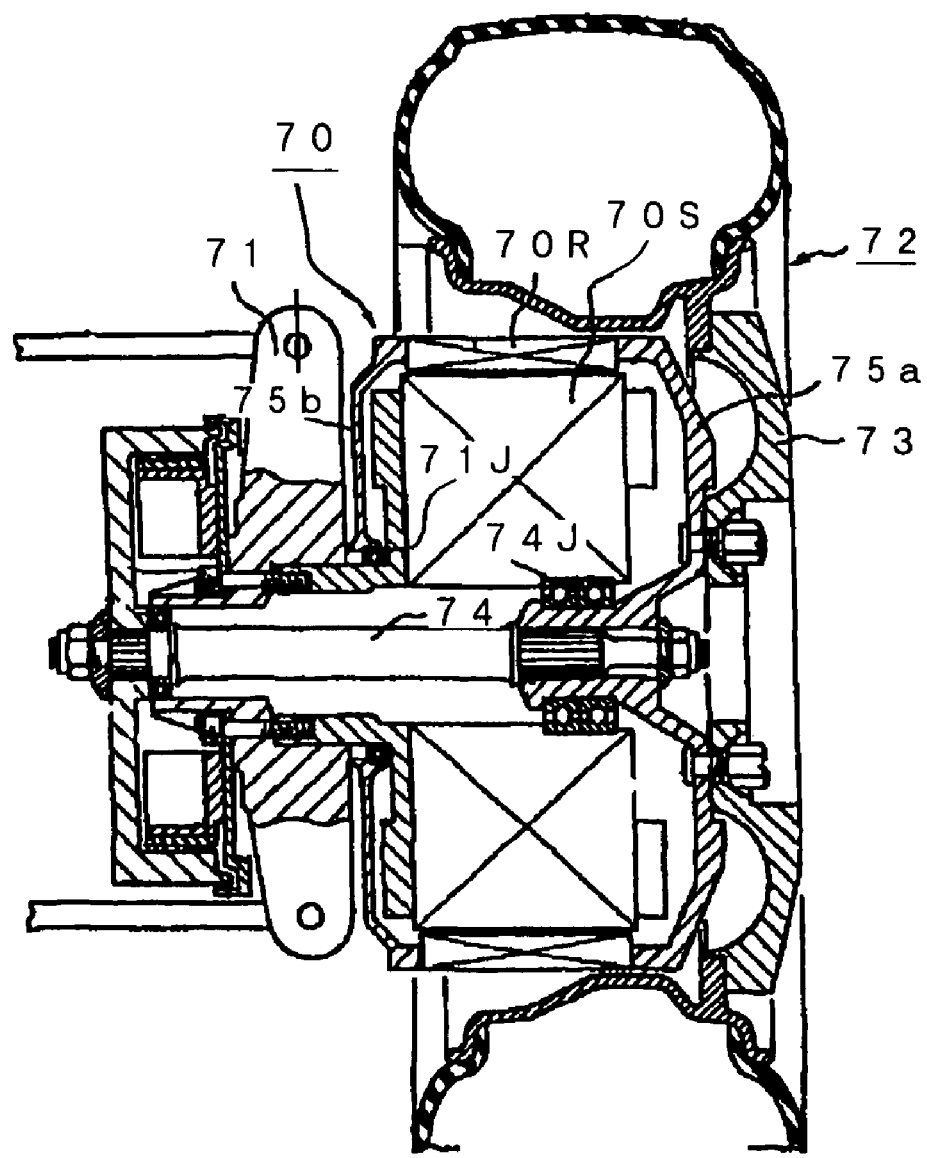
FIG. 78 is a diagram showing the constitution of the inwheel motor system of the prior art.
Figure 80:
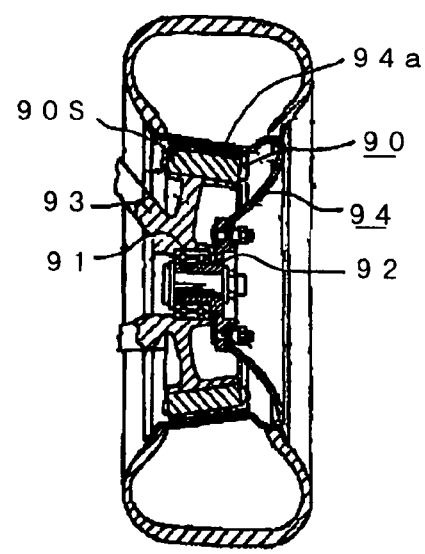
FIG. 80 is a diagram showing the constitution of the inwheel motor system of the prior art.

Since the motor is mounted to the wheel or the knuckle in a vehicle (IWM) which employs the inwheel motor system of the prior art shown in FIGS. 78 to 80, the mass of the motor corresponds to the unsprung mass. Therefore, the car vibration model is a two-freedom unsprung vibration model in which the mass of the inwheel motor is added to the unsprung mass $m_1$ as shown in FIGS. 72(a) and 72(b) (Comparative Example 4-4). When the motor is directly mounted to an unsprung mass corresponding portion like Comparative Example 4-4, the unsprung mass increases with the result that the level of TCFF rises and the road holding properties deteriorate as shown in FIG. 76. Also, as shown in FIG. 77, the level of tire longitudinal force fluctuation increases and the performance of the tire become unstable.

Then, when the unsprung mass is reduced in Comparative Example 4-1 like the above Comparative Example 4-2, or the stiffness in the longitudinal direction of the suspension is increased like the above Comparative Example 4-3, the level of tire longitudinal force fluctuation is reduced. Since the mass of the inwheel motor is added to the unsprung mass $m_1$ in this Comparative Example 4-4, the level of tire longitudinal force fluctuation rises.

Therefore, to maintain this level at the level of the above Comparative Example 4-1 in which the motor is not mounted, the total weight of the motor and a part around the wheel must be made equal to that of the prior art system. However, in order to greatly reduce the weight of the part around the wheel while the requirement for strength is satisfied, a serious cost rise is expected due to use of a large amount of a light alloy, which cannot be said to be practical.

Figure 73A:
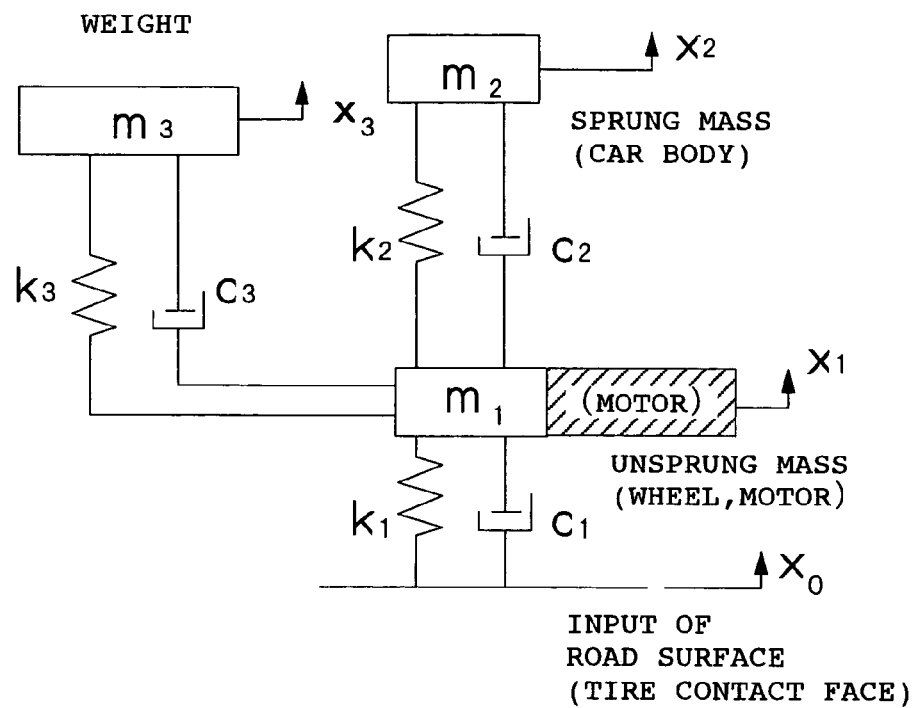
FIGS. 73(*a*) and 73(*b*) are diagrams showing car vibration models in which a dynamic damper is added to the inwheel motor system of the prior art.
Figure 73B:
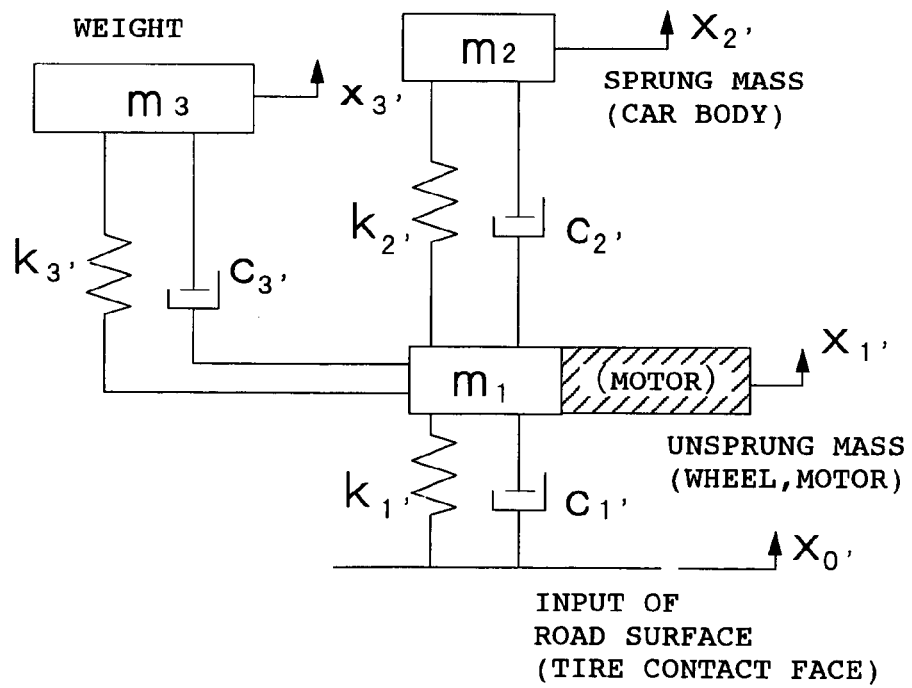
Figure 74:
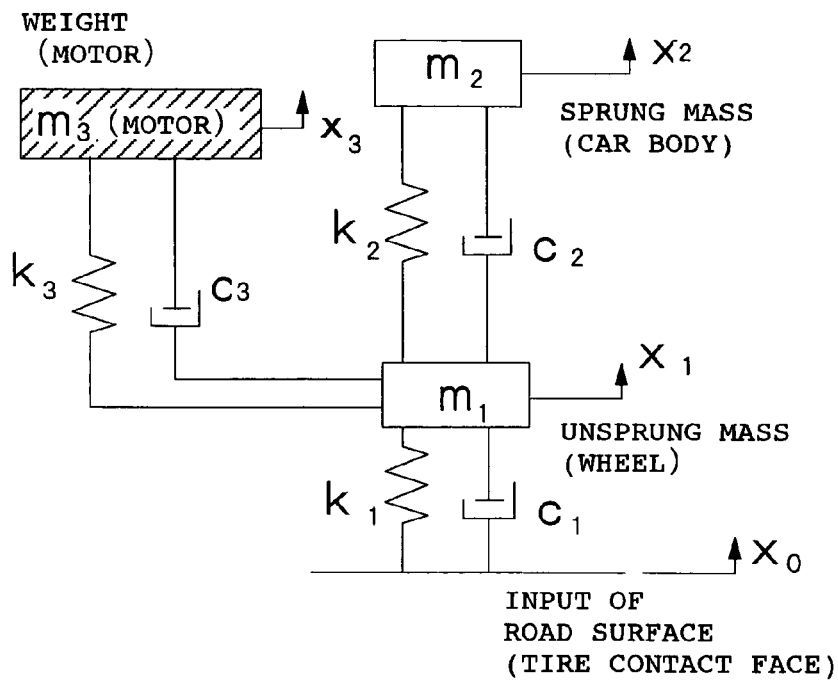
FIGS. 74(*a*) and 74(*b*) are diagrams showing car vibration models in the inwheel motor system of the present invention.
Figure 74:
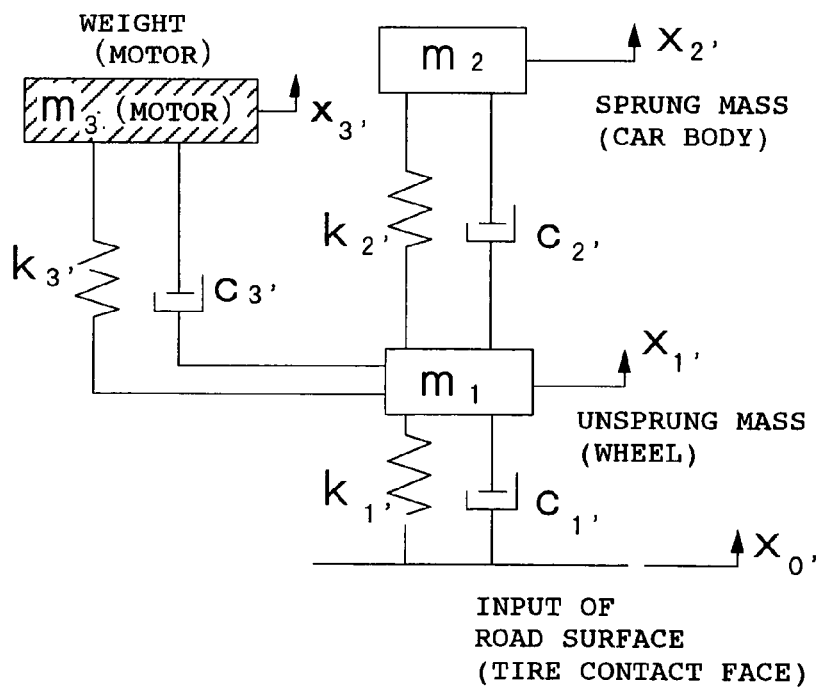

Meanwhile, as means of reducing TCFF at the time of running over an uneven road without reducing the above weight, there is a method called "dynamic damper" represented by models shown in FIGS. 73(a) and 73(b) (Comparative Example 4-5 in the table of FIG. 75). These are a three-freedom model in which new weight $m_3$ is added to the unsprung mass $m_1$ of the two-freedom models shown in FIGS. 72(a) and 72(b) by the elastic member $k_3$ and the dash pot $C_3$ and has the effect of reducing the level of TCFF and the level of tire longitudinal force fluctuation.

This method is more effective as the additional weight $m_3$ increases. As this additional weight merely serves to increase the weight of the vehicle besides to reduce the above change levels, it has a bad influence on the vehicle. Therefore, there is limitation to the increase of the above weight $m_3$.

In contrast to this, since the inwheel motor 3 (31, 40) is mounted on the car body side by the elastic members and/or attenuation unit as shown in FIG. 65, FIG. 67 or FIG. 68 in the inwheel motor system of the present invention, the car vibration model is a three-freedom model (Example 4-1 of FIG. 75) in which the mass of the motor is connected to the unsprung mass $m_1$ by the elastic member $k_3$ and the dash pot $C_3$ as shown in FIGS. 74(a) and 74(b). This model is obtained by removing the mass of the motor added to the unsprung mass $m_1$ and using this mass of the motor as additional weight $m_3$ for use in the dynamic damper in FIGS. 74(a) and 74(b). Therefore, as shown in the graphs of FIG. 76 and FIG. 77, the level of TCFF and the level of tire longitudinal force fluctuation can be made equal to those of an electric car which does not employ an ordinary inwheel motor system shown in the above Comparative Example 1 without increasing the weight of the vehicle excessively.

Since the weight of the dynamic damper increases when the motor is made heavy in the above Example 1 (Example 4-2 of FIG. 75), the level of TCFF and the level of tire longitudinal force fluctuation can be further reduced.

As the above change levels rise when the elastic coefficient of the elastic member is increased (Example 4-3), the elastic coefficient of the elastic member is preferably made small.

INDUSTRIAL FEASIBILITY

As described above, according to the present invention, when the inwheel motor is to be mounted to the direct drive wheel, the above motor is mounted to an unsprung mass corresponding portion of the vehicle by a buffer member or buffer unit to function as the weight of a dynamic damper for the unsprung mass. Therefore, the level of TCFF at the time of running over an uneven road can be reduced, the road holding properties of the vehicle can be improved, and further a load on the inwheel motor imposed by vibration can be reduced.

By employing the inwheel motor system of the present invention, an inwheel motor vehicle having excellent space efficiency and transmission efficiency of driving force and high road holding properties can be realized.

What is claimed is:

1. A method of mounting an inwheel motor for driving a wheel, to an unsprung portion of a vehicle suspending the vehicle body through a suspension member for suspending a vehicle body, said method comprising:

mounting said motor to said unsprung portion via a damping member dedicated only to said motor such that a mass of said motor serves as a mass in a dynamic damper.

2. The method of mounting an inwheel motor according to claim 1, wherein a non-rotary ease of the motor and a knuckle are interconnected by a first elastic member, and a rotary case of the motor and the wheel are interconnected by a second elastic member.

3. A method of mounting an inwheel motor for driving a wheel, to an unsprung portion of a vehicle suspending the vehicle body through a suspension member for suspending a vehicle body, said method comprising:

mounting said motor to a vehicle body side via a damping member dedicated to said motor such that a mass of said motor serves as a mass in a dynamic damper.

4. An inwheel motor system for driving a wheel using a electric motor, said system comprising:

a vehicle body, an unsprung portion of the vehicle suspending the vehicle body through a suspension member for suspending the vehicle body, said motor being mounted to the unsprung portion of a vehicle suspending the vehicle body through a suspension member for suspending a vehicle body, wherein said motor is mounted to at least one of said unsprung portion and the vehicle body side via a damping member that is dedicated to said motor such that a mass of said motor serves as the mass in a dynamic damper.

5. The inwheel motor system according to claim 4, wherein a buffer member is provided between the non-rotary case of the motor and a knuckle or/and between the rotary case and the wheel.

6. The inwheel motor system according to claim 4, wherein a non-rotary case of the motor for supporting the stator of the motor and a knuckle which is a part around the wheel of a vehicle are interconnected by a first elastic member, and a rotary case of the motor for supporting a rotor and the wheel are interconnected by a second elastic member.

7. The inwheel motor system according to claim 6, wherein at least one or both of the first and second elastic members are an air spring.

8. The inwheel motor system according to claim 6, wherein the second elastic member is cylindrical, one end of this cylinder is connected to the wheel, and the other end is connected to the rotary case.

9. The inwheel motor system according to claim 6, wherein the wheel and the rotary case are interconnected by 16 or less other elastic members disposed at equal intervals in parallel to a direction tangent to a circumference of the wheel.

10. The inwheel motor system according to claim 9, wherein rotary joint units whose axes are in the tangent direction of the motor are provided on both end faces in the width direction of the other elastic members.

11. The inwheel motor system according to claim 6, wherein ribs extending from the rotary case toward the wheel and ribs extending from the wheel toward the rotary case are interconnected by an elastic member at a plurality of sites.

12. The inwheel motor system according to claim 6, wherein the vertical elastic coefficient of a material constituting the first and second elastic members is 1 to 120 MPa.

13. The inwheel motor system according to claim 6, wherein the vertical elastic coefficient of a material constituting the first and second elastic members is 10 to 300 GPa.

14. The inwheel motor system according to claim 6, wherein the first elastic member has a lower elastic modulus in a vertical direction of the vehicle than an elastic modulus in a lengthwise direction of the vehicle.

* * * * *